(12) United States Patent
Kelly et al.

(10) Patent No.: US 8,641,507 B2
(45) Date of Patent: *Feb. 4, 2014

(54) TOURNAMENT QUALIFICATION AND CHARACTERISTICS IN A GAMING SYSTEM

(75) Inventors: Bryan M. Kelly, Alamo, CA (US); Matthew F. Kelly, Scottsdale, AZ (US); John G. Kroeckel, San Ramon, CA (US); John E. Link, Manteco, CA (US); Norman B. Petermeier, Pleasanton, CA (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,062

(22) Filed: Aug. 6, 2012

(65) Prior Publication Data

US 2012/0302310 A1     Nov. 29, 2012

Related U.S. Application Data

(63) Continuation of application No. 11/982,114, filed on Oct. 31, 2007, now Pat. No. 8,246,439, which is a continuation of application No. 10/751,006, filed on Dec. 31, 2003, now Pat. No. 7,762,885, which is a continuation of application No. 09/433,523, filed on Nov. 3, 1999, now Pat. No. 6,758,755, which is a continuation-in-part of application No. 09/040,654, filed on Mar. 17, 1998, now Pat. No. 6,007,426, which is a continuation of application No. 08/746,755, filed on Nov. 14, 1996, now Pat. No. 5,816,918.

(51) Int. Cl.
*A63F 9/24* (2006.01)
*A63F 13/00* (2006.01)
*G06F 17/00* (2006.01)
*G06F 19/00* (2011.01)
*G07F 17/32* (2006.01)

(52) U.S. Cl.
CPC ............ *G07F 17/32* (2013.01); *G07F 17/3276* (2013.01); *G07F 17/3297* (2013.01)
USPC .................................. 463/20; 463/16; 463/42

(58) Field of Classification Search
USPC .......................................................... 463/20
See application file for complete search history.

(56) References Cited

U.S. PATENT DOCUMENTS 941,194 A     11/1909   Hamilton
1,543,318 A    6/1925   Cardoza (Continued)

FOREIGN PATENT DOCUMENTS

GB     1087361      10/1967
JP     06-31060     2/1994

OTHER PUBLICATIONS

U.S. Appl. No. 60/008,873, (Continued)

*Primary Examiner* — Kevin Y Kim
(74) *Attorney, Agent, or Firm* — Steptoe & Johnson LLP

(57) ABSTRACT

A gaming system is disclosed that provides game play in a tournament in exchange for monetary input per game played. The gaming system includes: a game server, a plurality of game units, and a tournament administration controller. Each game unit is a game of chance or other game that does not rely primarily on the skill of the player. The casino-based game units enable the play of linked wheel games. The tournament administration controller enables an operator to designate tournament characteristics.

10 Claims, 30 Drawing Sheets

(56) References Cited

U.S. PATENT DOCUMENTS

| | | |
|---|---|---|
| 1,652,071 A | 12/1927 | Tsujing |
| 2,043,166 A | 6/1936 | Hart et al. |
| 2,141,580 A | 12/1938 | White |
| 2,660,434 A | 11/1953 | Durant |
| 2,799,500 A | 7/1957 | Zekowski |
| 2,926,915 A | 3/1960 | Johns |
| 3,796,433 A | 3/1974 | Fraley et al. |
| 3,975,022 A | 8/1976 | Figueroa |
| 4,191,376 A | 3/1980 | Goldman et al. |
| 4,240,635 A | 12/1980 | Brown |
| 4,339,798 A | 7/1982 | Hedges et al. |
| 4,398,708 A | 8/1983 | Goldman et al. |
| 4,448,417 A | 5/1984 | Clark et al. |
| 4,494,197 A | 1/1985 | Troy et al. |
| 4,501,422 A | 2/1985 | Leshik |
| 4,582,324 A | 4/1986 | Koza et al. |
| 4,586,707 A | 5/1986 | McNeight et al. |
| 4,636,951 A | 1/1987 | Harlick |
| 4,652,998 A | 3/1987 | Koza et al. |
| 4,685,677 A | 8/1987 | Demar et al. |
| 4,743,024 A | 5/1988 | Helm et al. |
| 4,760,527 A | 7/1988 | Sidley |
| 4,771,344 A | 9/1988 | Fallacaro et al. |
| 4,837,728 A | 6/1989 | Barrie et al. |
| 4,842,278 A | 6/1989 | Markowicz |
| 4,854,590 A | 8/1989 | Jolliff et al. |
| 4,880,237 A | 11/1989 | Kishishita |
| 4,926,327 A | 5/1990 | Sidley |
| 4,948,133 A | 8/1990 | Helm et al. |
| 4,964,638 A | 10/1990 | Ishida |
| 5,007,649 A | 4/1991 | Richardson |
| 5,016,880 A | 5/1991 | Berge |
| 5,034,807 A | 7/1991 | Von Kohorn |
| 5,038,022 A | 8/1991 | Lucero |
| 5,042,809 A | 8/1991 | Richardson |
| 5,042,810 A | 8/1991 | Williams |
| 5,044,956 A | 9/1991 | Behensky et al. |
| 5,048,833 A | 9/1991 | Lamle |
| 5,051,822 A | 9/1991 | Rhoades |
| 5,057,915 A | 10/1991 | Von Kohorn |
| 5,083,271 A | 1/1992 | Thacher et al. |
| 5,116,055 A | 5/1992 | Tracy |
| 5,118,109 A | 6/1992 | Gumina |
| 5,137,278 A | 8/1992 | Schilling et al. |
| 5,179,517 A | 1/1993 | Sarbin et al. |
| 5,184,821 A | 2/1993 | Korenek |
| 5,197,094 A | 3/1993 | Tillery et al. |
| 5,227,874 A | 7/1993 | Von Kohorn |
| 5,228,356 A | 7/1993 | Chuang |
| 5,231,568 A | 7/1993 | Cohen et al. |
| 5,235,509 A | 8/1993 | Mueller et al. |
| 5,249,044 A | 9/1993 | Von Kohorn |
| 5,249,800 A | 10/1993 | Hilgendorf et al. |
| 5,265,874 A | 11/1993 | Dickinson et al. |
| 5,265,877 A | 11/1993 | Boylan et al. |
| 5,280,909 A | 1/1994 | Tracy |
| 5,286,023 A | 2/1994 | Wood |
| 5,286,061 A | 2/1994 | Behm |
| 5,292,127 A | 3/1994 | Kelly et al. |
| 5,294,120 A | 3/1994 | Schultz |
| 5,318,298 A | 6/1994 | Kelly et al. |
| 5,324,035 A | 6/1994 | Morris et al. |
| 5,326,104 A | 7/1994 | Pease et al. |
| 5,342,047 A | 8/1994 | Heidel et al. |
| 5,342,049 A | 8/1994 | Wichinsky et al. |
| 5,344,144 A | 9/1994 | Canon |
| 5,351,970 A | 10/1994 | Fioretti |
| 5,359,510 A | 10/1994 | Sabaliauskas |
| 5,365,575 A | 11/1994 | Katz |
| 5,368,484 A | 11/1994 | Copperman et al. |
| 5,389,865 A | 2/1995 | Jacobus et al. |
| 5,397,134 A | 3/1995 | Fishman et al. |
| 5,405,152 A | 4/1995 | Katanics et al. |
| 5,410,691 A | 4/1995 | Taylor |
| 5,417,424 A | 5/1995 | Snowden et al. |
| 5,429,361 A | 7/1995 | Raven et al. |
| 5,429,507 A | 7/1995 | Kaplan |
| 5,462,275 A | 10/1995 | Lowe et al. |
| 5,470,079 A | 11/1995 | LeStrange et al. |
| 5,471,039 A | 11/1995 | Irwin, Jr. et al. |
| 5,472,196 A | 12/1995 | Rusnak |
| 5,475,205 A | 12/1995 | Behm et al. |
| 5,476,259 A | 12/1995 | Weingardt |
| 5,494,294 A | 2/1996 | Cappetta |
| 5,504,672 A | 4/1996 | Cragun et al. |
| 5,511,794 A | 4/1996 | Katamoto |
| 5,522,728 A | 6/1996 | Kaplan |
| 5,537,343 A | 7/1996 | Kikinis et al. |
| 5,544,892 A | 8/1996 | Breeding |
| 5,551,692 A | 9/1996 | Petit et al. |
| 5,555,497 A | 9/1996 | Helbling |
| 5,557,717 A | 9/1996 | Wayner |
| 5,559,312 A | 9/1996 | Lucero |
| 5,565,840 A | 10/1996 | Thorner et al. |
| 5,573,244 A | 11/1996 | Mindes |
| 5,593,349 A | 1/1997 | Miguel et al. |
| 5,618,232 A | 4/1997 | Martin |
| 5,629,594 A | 5/1997 | Jacobus et al. |
| 5,644,727 A | 7/1997 | Atkins |
| 5,655,961 A | 8/1997 | Acres et al. |
| 5,679,077 A | 10/1997 | Storey |
| 5,684,722 A | 11/1997 | Thorner et al. |
| 5,691,898 A | 11/1997 | Rosenberg et al. |
| 5,695,400 A | 12/1997 | Fennell et al. |
| 5,697,844 A | 12/1997 | Von Kohorn |
| 5,734,373 A | 3/1998 | Rosenberg et al. |
| 5,739,811 A | 4/1998 | Rosenberg et al. |
| 5,743,798 A | 4/1998 | Adams et al. |
| 5,751,707 A | 5/1998 | Voit et al. |
| 5,755,621 A | 5/1998 | Singer |
| 5,762,552 A | 6/1998 | Vuong et al. |
| 5,766,076 A | 6/1998 | Pease et al. |
| 5,768,382 A | 6/1998 | Schneier et al. |
| 5,774,870 A | 6/1998 | Storey |
| 5,779,549 A | 7/1998 | Walker et al. |
| 5,811,772 A | 9/1998 | Lucero |
| 5,812,668 A | 9/1998 | Weber |
| 5,816,823 A | 10/1998 | Naimark et al. |
| 5,816,918 A | 10/1998 | Kelly et al. |
| 5,822,523 A | 10/1998 | Rothschild et al. |
| 5,828,843 A | 10/1998 | Grimm et al. |
| 5,830,068 A | 11/1998 | Brenner et al. |
| 5,836,817 A | 11/1998 | Acres et al. |
| 5,851,148 A | 12/1998 | Brune et al. |
| 5,885,158 A | 3/1999 | Torange et al. |
| 5,890,963 A | 4/1999 | Yen |
| 5,919,091 A | 7/1999 | Bell et al. |
| 5,941,773 A | 8/1999 | Harlick |
| 5,948,061 A | 9/1999 | Merriman et al. |
| 5,952,640 A | 9/1999 | Lucero |
| 5,959,277 A | 9/1999 | Lucero |
| 5,970,143 A | 10/1999 | Schneier et al. |
| 5,983,196 A | 11/1999 | Wendkos |
| 5,999,808 A | 12/1999 | LaDue |
| 6,009,412 A | 12/1999 | Storey |
| 6,019,283 A | 2/2000 | Lucero |
| 6,019,374 A | 2/2000 | Breeding |
| 6,024,640 A | 2/2000 | Walker et al. |
| 6,048,269 A | 4/2000 | Burns et al. |
| 6,128,660 A | 10/2000 | Grimm et al. |
| 6,159,098 A | 12/2000 | Slomlany et al. |
| 6,162,121 A * | 12/2000 | Morro et al. .................... 463/16 |
| 6,183,366 B1 | 2/2001 | Goldberg et al. |
| 6,223,215 B1 | 4/2001 | Hunt et al. |
| 6,224,486 B1 | 5/2001 | Walker et al. |
| 6,247,643 B1 | 6/2001 | Lucero |
| 6,287,202 B1 | 9/2001 | Pascal et al. |
| 6,306,038 B1 | 10/2001 | Graves et al. |
| 6,345,297 B1 | 2/2002 | Grimm et al. |
| 6,425,828 B2 | 7/2002 | Walker et al. |
| 6,508,709 B1 | 1/2003 | Karmarkar |
| 6,527,638 B1 | 3/2003 | Walker et al. |
| 6,578,012 B1 | 6/2003 | Storey |
| 6,692,359 B1 | 2/2004 | Williams et al. |

(56) References Cited

U.S. PATENT DOCUMENTS

| | | |
|---|---|---|
| 7,192,352 B2 | 3/2007 | Walker et al. |
| 7,354,345 B2 * | 4/2008 | Bortnik et al. .................. 463/42 |
| 7,798,901 B2 * | 9/2010 | Nguyen et al. .................. 463/29 |
| 7,856,376 B2 | 12/2010 | Storey |
| 2002/0091833 A1 | 7/2002 | Grimm et al. |
| 2002/0092019 A1 | 7/2002 | Marcus |
| 2006/0143285 A1 | 6/2006 | St-Denis |
| 2006/0148565 A1 | 7/2006 | Gauselmann et al. |
| 2006/0160621 A1 | 7/2006 | Rowe et al. |
| 2007/0077995 A1 | 4/2007 | Oak et al. |
| 2007/0202955 A1 | 8/2007 | Frerking et al. |
| 2008/0274785 A1 | 11/2008 | Byng et al. |
| 2009/0062014 A1 | 3/2009 | Gift et al. |
| 2009/0082109 A1 | 3/2009 | Sepich et al. |
| 2009/0156282 A1 | 6/2009 | Mak |
| 2009/0305789 A1 | 12/2009 | Patil |
| 2010/0085983 A1 | 4/2010 | Antonucci |
| 2011/0029609 A1 | 2/2011 | Kavallierou et al. |

OTHER PUBLICATIONS

Trent C. Ward, Quake Review, www.gamespot.com (available at http://www.gamespot.com/quake/reviews/2532549/quake-review/platform/pc/) (Jun. 22, 1996).

http://www.webopedia.com/DidYouKnow/Internet/2002/Web_vs_Internet. Asp (1 of 3)[Jan. 28, 2008 6:58:17 PM].

Tyson, Jeff, "How Internet Infrastructure Works" Oct. 24, 2005 (http://computer.howstuffworks.com/internet-infrastructure.htm/printable).

GSA Overview: GLI Regulator Roundtable Feb. 2006.

* cited by examiner

TOURNAMENT SETUP SCREEN

| GAME | Tournament On/Off | Games Required | Cost/Game (coins) | % Applied to Tournament Prize | Seed Money | WINNING % FOR PLACES | | | | | Start Date | Start Time | End Date | End Time | Repeat Tourney |
|---|---|---|---|---|---|---|---|---|---|---|---|---|---|---|---|
| | | | | | | 1st Place | 2nd Place | 3rd Place | 4th Place | 5th Place | | | | | |
| SCUD ATTACK | ON | 3 | 1 | 50 % | $50 | 40 % | 25 % | 15 % | 10 % | 10 % | 2/1/97 | 8:00 | 2/14/97 | 23:00 | NO |
| SOLITAIRE | OFF | | | | | | | | | | | | | | |
| QUIZ | ON | 1 | 1 | 30 % | $30 | 60 % | 30 % | 10 % | 0 % | 0 % | 2/20/97 | 14:00 | 3/20/97 | 12:00 | YES |
| FUN 21 | NOT AVAIL. | | | | | | | | | | | | | | |

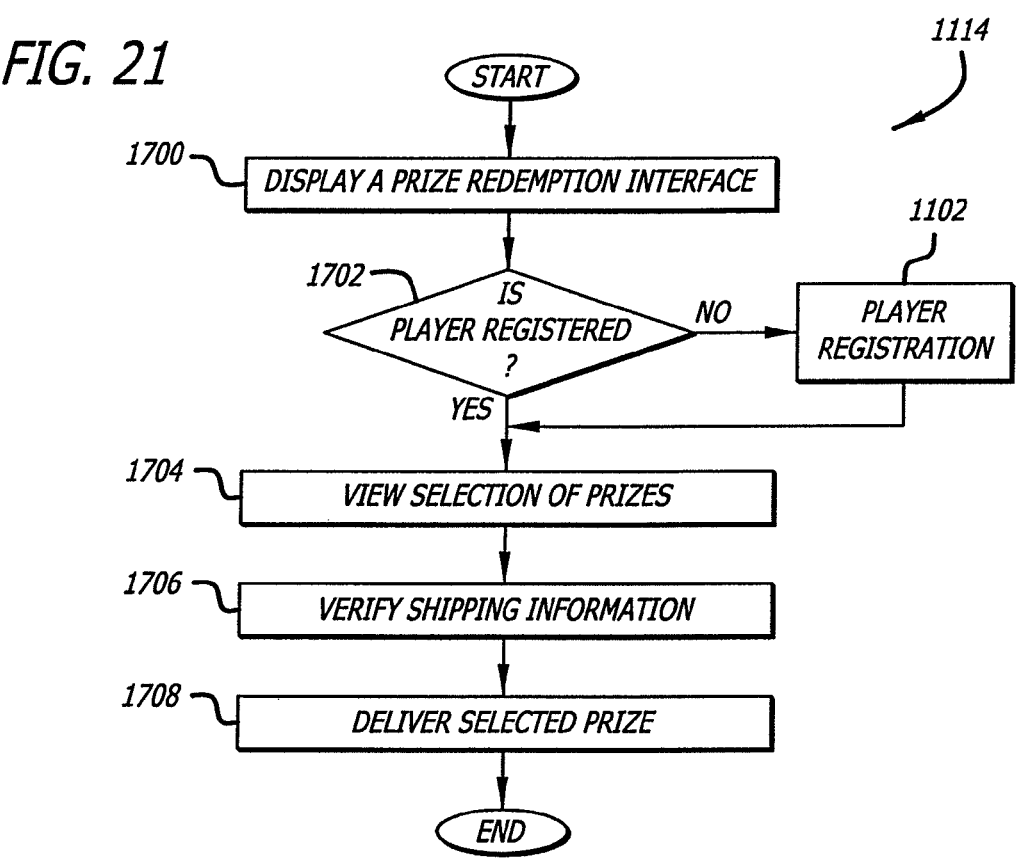
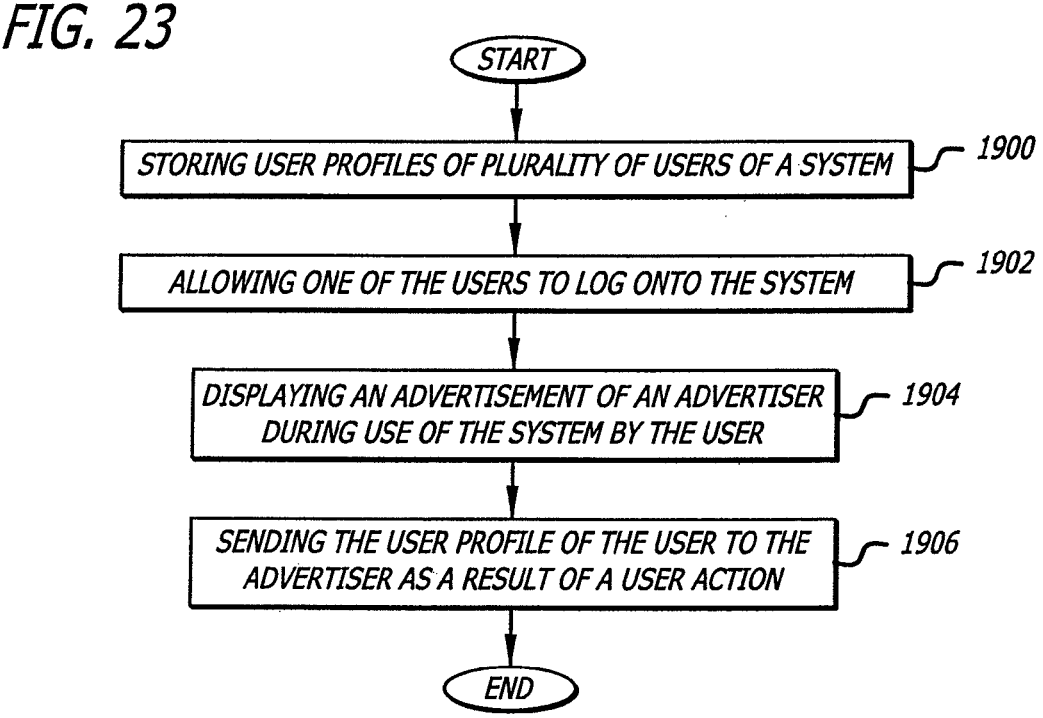

TOURNAMENT QUALIFICATION AND CHARACTERISTICS IN A GAMING SYSTEM

RELATED APPLICATIONS

This application is a continuation of U.S. patent application Ser. No. 11/982,114 filed Oct. 31, 2007, which is a continuation of U.S. patent application Ser. No. 10/751,006, filed Dec. 31, 2003, now U.S. Pat. No. 7,762,885, issued Jul. 7, 2010, which is a continuation of U.S. patent application Ser. No. 09/433,523, filed Nov. 3, 1999, now U.S. Pat. No. 6,758,755, issued Jul. 6, 2004, which is a continuation-in-part of U.S. patent application Ser. No. 09/040,654, filed Mar. 17, 1998, now U.S. Pat. No. 6,007,426, issued Dec. 28, 1999, which is a continuation of U.S. patent application Ser. No. 08/746,755, filed Nov. 14, 1996, now U.S. Pat. No. 5,816,918, issued Oct. 6, 1998, all of which are hereby incorporated by reference herein in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This disclosure relates to games normally played in arcades and other environments, and more particularly to redemption games allowing a player to receive one or more prizes in connection with playing the games.

BACKGROUND

Games of many types are played in bars, arcades, homes, and other public and private establishments. In bars, taverns, and like places, games can be provided on bar tops, side tables, and other areas. These games typically include a video screen and buttons or other controls for the player to influence objects and events portrayed on the video screen. Common "bar-top" games include card games (poker, blackjack, solitaire, and the like), quiz games, sports games, and the like. Bar-top games typically provide a score based on the player's performance during the game and may also provide a high score list, which provides incentives for players to perform well.

In game arcades, convenience stores, and the like, more involved games are often offered, such as stand-up arcade video games, pinball games, and mechanical or carnival games. Some of these types of games are offered as redemption games, which dispense redemption tickets to players based on player performance during the game and/or a game score that the player achieves. A player can exchange dispensed redemption tickets for prizes available at a prize display area, such as a prize booth or a prize vending machine, where such prizes as stuffed animals, models, other toys, small music devices, T-shirts, food, and the like are available. Each prize has an associated cost or "price" in terms of redemption tickets, which the player can pay to redeem the prize. A player may collect tickets over time to save up for larger prizes that may have higher ticket prices.

One problem with the redemption games in the prior art is that maintaining a redemption system can be very involved for the operator of the arcade, to the point of being burdensome. For example, operators must maintain a prize booth or vending machine, which displays all the prizes the operator wishes to make available. Requiring even greater maintenance is the setting and adjustment of ticket costs or prices of the prizes. The operator must determine how many tickets are paid, on average, by each game in the arcade and then determine the price of each prize in terms of tickets and in view of a desired profitability level. The operator knows the cost of the prizes that he or she paid, can come up with a crude estimate of average ticket payouts to players, and can thus estimate ticket costs with a rough profitability in mind. But the task can become overwhelming when a large variety of prizes are offered and many different types of games can be played, each game having a different ticket payout and difficulty level. Many arcade operators end up simply providing very gross estimates of what prizes should be worth in tickets, with no exact or global level of profitability in mind. This may lead to extra or unknown costs which can be magnified over time when large numbers of prizes are redeemed by players.

In addition, the prior art redemption games and redemption systems are not suitable for bars, taverns, and other, non-arcade public places, such as stores, hotels, food establishments, and the like. There is a very large potential pool of redemption game players in such places. This is because the games typically offered in bars and like places often have low appeal to players due to the absence of any sort of tangible award or prize that is received by playing the game. For example, the bar-top and other games typically found in bars may quickly get uninteresting if the only reward a player receives is to put his or her name on a high-score list.

However, non-traditional gaming environments such as bars are not very suitable for supporting redemption systems like those found in gaming arcades. The proprietor or bartender of the non-arcade environment often does not want to provide a booth or area to display available prizes for players due to the additional maintenance and staff needed for such a display area. More importantly, the proprietor typically does not have the knowledge to properly adjust payouts of redemption games and offer prizes with proper and profitable ticket costs. Even if the proprietor has such knowledge, the small numbers of games and/or the secondary role of games in non-traditional gaming environments does not warrant providing a prize display area. It does not warrant the abovementioned overhead by providing and counting the many tickets that players may accumulate and provide/maintain ticket costs for various prizes in view of a desired profitability of the games.

Other gaming environments for players include homes or other private places. Players have been able to play board games, computer games, video games, and the like, at home or other private environments for a long time. However, with the widespread use of standardized large-scale networks such as the Internet and World Wide Web in recent years, players of video and computer games at home are offered an environment to compete with each other which was not widely available to game players before. A player can connect a home computer, video game console, set top box, or other device to the Internet using telephone lines, cable TV lines, or other connections to the home. The player can thus play games offered to the player from a remote server or other source. The player can also compete or otherwise interact in a game with hundreds or even thousands of other players who are also connected to the Internet.

However, although a wide array of options is available for home game players, players typically cannot play games from home to receive prizes. Players may often desire to receive a prize after playing a game or participating in a tournament, but no standardized prize redemption system is provided to home players. Any administrator of such a prize redemption system faces the same problems and overhead as described above when attempting to organize ticket winnings and offer prizes at ticket costs adjusted for a desired profitability.

With the widespread use of standardized large-scale wide area networks, such as the Internet and World Wide Web in recent years, video and computer games that were previously limited to play at the location where they were located can now be offered in a new type of environment. Such environment allows a game provider to afford access to a network gaming system with numerous games of a tremendous variety to a vast number of remotely located players having diverse demographics and profiles.

There are many variables when implementing a network gaming system on the Internet and World Wide Web. In the past, providers have been restricted to a "one-size-fits-all" approach to implementing a network gaming system, which has made it very difficult when attempting to tailor many variables in order to satisfy a multitude of diverse players located in a large number of different locations.

One variable that network gaming system providers encounter includes the choice of games provided to players of the system. Games can come in a variety of forms including games with different theme genres, games of skill and chance, and even games targeted to particular ages and genders of players. Many issues arise when choosing games to suit a diverse pool of players. Some games featuring violence, nudity, or certain types of adult themes may not be suitable to players under a certain age. Further, playing games of chance may also be illegal for underage players and for players residing at particular locations. Because of these factors, network gaming providers are challenged to find good ways for controlling access to such games by players of certain ages and in certain locations.

Selecting and presenting advertising for a wide range of products and services is another set of variables that providers may encounter when implementing a network gaming system. In the past, it has been very difficult for providers of network gaming systems offering a large number of games and having a diverse selection of users to effectively target advertising to particular segments of their users.

In order to better attract users to a network gaming system, a provider may wish to offer prizes to users for playing games on their system. However, a provider is forced to overcome several more difficulties when trying to implement an effective prize awarding and redemption scheme for a network gaming system having a large number of games and a diverse selection of users. Now, for example, the provider must manage a multitude of other variables including the types of prizes to be awarded, the number of prizes to awarded, the value of the prizes to be awarded, and the amount of prizes awarded, the criteria for awarding prizes, and the procedures for redeeming prizes awarded through play on the system.

With respect to prize redemption, providers encounter several problems in satisfying a large, diverse, user base and providing a sufficient impetus to prompt users to continue purchasing games. Decisions as to which types and amounts of prizes to award can become very problematic when trying to provide incentives, which entice players to continue to play. For example, a middle-age male may not be enticed to play a game when available prizes are limited to toys. In a similar fashion, a teenager may not continue to purchase games when what is at stake is an electric razor or cufflinks.

Decisions relating to prize rewards are not limited to the types of prizes that are awarded. Distribution of prize rewards also plays a role in maintaining a large satisfied user base. It is in the best interest of the game provider to maintain an even distribution so that as many players as possible reap a reward for continued play.

SUMMARY

Briefly, and in general terms, disclosed herein are systems and methods for that provide game play in a tournament in exchange for monetary input per game played. In one embodiment, the gaming system includes: a game server, a plurality of game units, and a tournament administration controller. Each game unit is a game of chance or other game that does not rely primarily on the skill of the player. The casino-based game units enable the play of linked wheel games. The tournament administration controller enables an operator to designate tournament characteristics.

In another embodiment, a method is disclosed for managing a tournament game in a gaming system having a tournament server in direct communication with a player interface unit associated with one of a plurality of gaming devices. The gaming device presents a base game. Each player interface unit has a display and an embedded processor. The method includes: identifying a player at the gaming device; receiving player-related and tournament-related data at the player interface unit from the tournament server, wherein the player interface unit and the tournament server are in communication via a web service protocol; incrementing a tournament counter in response to play of the base game; and initiating play of the tournament game when the tournament counter reaches a predetermined value.

In still another embodiment, the gaming method is disclosed for managing a tournament game in a gaming system having a tournament server in direct communication with a player interface unit associated with one of a plurality of gaming devices. The method includes: identifying a player at the gaming device; receiving player-related and tournament-related data at the player interface unit from the tournament server; incrementing a tournament counter in response to play of the base game based on one or more accrual rules specifying an event, an increment value, and an occurrence counter, wherein the occurrence counter specifies the number of times the event must occur before the tournament counter is incremented by the increment value; and initiating play of the tournament game when the tournament counter reaches a predetermined value.

BRIEF DESCRIPTION OF THE DRAWINGS

FIG. 9b is a diagram of a tournament table suitable for use with the process of FIG. 9.

FIG. 21 illustrates the process by which the awarding prizes operation of FIG. 6 is executed;

FIG. 23 is a flowchart illustrating the acts involved with an advertisement feedback aspect.

DETAILED DESCRIPTION OF THE PREFERRED EMBODIMENTS

Figure 1:
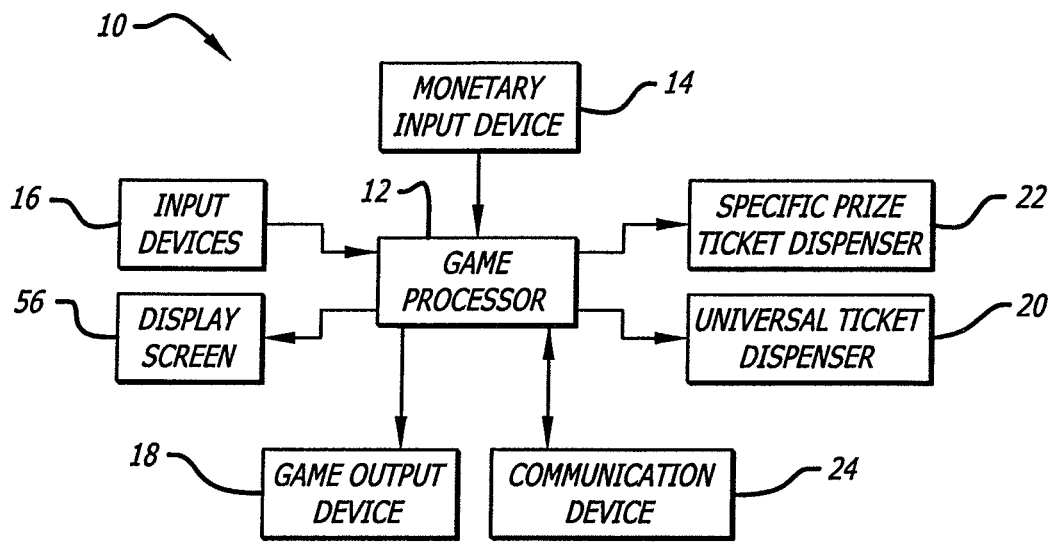
FIG. 1 is a diagrammatic illustration of a game apparatus.

FIG. 1 is a block diagram of a generic game apparatus or "game unit" 10 suitable for use with the prize redemption system. It should be noted that a variety of game architectures can be used to provide game play functions as well as access to other game units and servers through networks, as described below. The particular architecture shown is a generic architecture using components typical to game apparatuses suitable for use with the disclosed embodiments. Game unit 10 can take a variety of forms, including a video game apparatus having one or more display screens; a mechanical game having playing pieces and/or other moving mechanical parts; a personal computer system; a "network computer;" a television including or connected to a microprocessor (e.g. a "set top box") for the Internet or other information access, or another apparatus.

As described herein, the game unit 10 is used by a player in a "gaming environment." This term is intended to refer to any location, public or private, in which games can be used. For example, public gaming environments include such places as arcades, stores, restaurants, bars, casinos, bowling alleys, stations, hotels, airports, airplanes, cruise ships, gymnasiums, health clubs, or other public places that can offer the game unit for use by players and which can provide prizes to players of the game apparatus. A "gaming environment" need not ordinarily provide games to the public. In other embodiments, a "gaming environment" can be a private place, such as a player's home or personal residence, office or other place of employment, private club, and the like.

Game unit 10 in accordance with the disclosed embodiments may include a game processor 12, monetary input device 14, player input device(s) 16, game output device(s) 18, a universal ticket dispenser 20, a specific prize ticket dispenser 22, and a communication device 24.

Game processor 12 implements (e.g., controls, influences, coordinates, monitors, calculates, and the like) the functions of the game unit 10 during a game process and includes several input and output functions. The game processor controls the game apparatus by receiving inputs from a player, from other game apparatuses, from a server (described below), from a progressive bonus apparatus, and from other sources. The game processor also controls output signals to update the game process when appropriate. In addition, the game processor controls the redemption system by calculating when prizes are awarded, calculating and updating prize lists and prize costs, and other functions, as described below. Game processor 12 preferably includes a digital microprocessor or a similar controller device, and other electronic components, which are described in further detail with respect to FIG. 1a. The operation of game processor 12 is described in greater detail below. The game processor is preferably provided within a housing of game unit 10.

Monetary input device 14 is used to receive the monetary input that is inserted by a player into the game apparatus in the gaming environment. For example, coins can be received in return for the player's use of the game apparatus. A coin deposit slot can accept standard currency coins, bills, or game tokens that may be available in the gaming environment, and also typically includes a coin return button and coin return slot. Once one or more coins are accepted, the coins are routed to a cash box and a signal is sent to game processor 12 to increase the player's game credits, i.e., to indicate to that one or more game plays have been paid. Coin slots and boxes suitable for use in game unit 10 are readily available on the commercial market. Alternatively, other monetary input devices can be used, such as debit card or credit card readers well known to those skilled in the art, or "smart card" readers which can read and write electronic information to and from the card. For example, "E-cash", "cybercash" or other electronic monetary forms can be used. In other embodiments, user verification or validation can be input by the player, such as a player identification and/or password that, for example, allows a monetary value to be billed to a player or deducted from a player's monetary account at a bank or other institution. Herein, the term, "monetary input," is intended to also refer to other types of player validation for use of a game in addition to those forms mentioned above. In alternate embodiments located in non-public gaming environments (e.g., at a user's home), or for other applications, such as promotional uses of game apparatus 10, monetary input may not be necessary for the player to use game apparatus 10.

Input devices 16 are used by a player or user to provide input to the game unit 10 to influence game events during a game process and to achieve one or more predetermined goals or tasks for scoring points and winning prizes or other types of awards. The input devices 16 can also be used to select prizes within the redemption system. Alternatively, separate input controls can be used for the prize functions of the game unit. Player input typically includes game commands provided by controlling devices 16 such as buttons, a keyboard, dials, joystick controls, a touch screen, a track ball, a mouse, a gun device, a steering wheel, foot pedals, speech input through a microphone, or any other input used in playing a game and providing selections. For example, the player can press a button to tilt a playing surface to guide a playing piece, move a joystick to control a graphical object displayed on a video screen, or toss a playing piece into a target aperture having sensors to detect the present playing piece. Each type of user input can provide a particular game command to the game processor 12, and the game processor interprets the commands and influences game states and game events in the game process accordingly.

Preferably, game unit 10 implements, a "game of skill," i.e., as referred to herein, a predetermined goal, task, or objective for a game should be accomplished in a skillful manner such that an outcome of the game is determined primarily by the amount of skill of the player. The greater the player's skill, the closer or more easily a desired goal in the game can be reached by the player. Points associated with the predetermined goals or objectives can be added to a game score such that a higher game score, on average, indicates a greater amount of skill by the player. For instance, a displayed object can be skillfully aimed or directed using input devices 16 such as a joystick, buttons, a steering wheel, and the like, or to avoid other objects using skill or dexterity involving hand-eye coordination.

Alternatively, a "game of chance" or other game that does not rely primarily on the skill of the player can be offered on game apparatus 10. For example, such games as slot machines, substantially random card games, roulette, and the like, may offer a player a chance to win large numbers of tickets or prize credits or other prizes of high value without requiring a high degree of skill.

Various other types of devices can also be included in game unit 10 as input devices 16 to allow the processor 12 to monitor the game. For example, sensors of various types can be employed to detect the paths of playing pieces directed by the player, detect when playing pieces have been dispensed, detect when a game is over, detect cheating actions by the player, and the like. Also, input devices such as buttons, switches, and the like allow the player of the game to make various selections concerning game play. For example, a player could select a one- or two-player game, a preferred award type, a progressive option, and the like, using additional controls on a front panel of the game unit 10.

Game output devices 18 may influence the game and/or provide feedback to the player about the current state of the game process. For example, motors or solenoids can influence mechanical components of the game in response to player commands, such as tilting a playing surface, dispensing a playing piece, spinning a wheel, and the like. Feedback is perceived by the player preferably in the form of visual, auditory, and/or tactile feedback. A video display screen can provide visual feedback such as images to the player during the game process. Other visual output devices can include one or more score displays, lamps or other light sources positioned on or surrounding a "game space" (e.g., a play field or area of game action). Game output devices such as speakers, buzzers, alarms, and other devices provide auditory feedback, such as sound effects during a game process, synthesized or recorded speech, and the like. Game output devices, such as motors, solenoids, or other actuators can provide forces on the game apparatus or on controls handled by the player to provide tactile feedback in the form of vibration, jolts, and the like. One or more of the game output devices can also be used to display information related to specific prizes that can be won by the player when using the game unit 10, as described below. Game output devices 18 can also include a coin return slot for returning coins or tokens or providing other cash prizes after a game is played. Game processor 12 preferably commands such feedback to the player by sending out control signals to the various output devices in game unit 10 when appropriate.

A preferred output device is a display screen 56. Game processor 12 utilizes appropriate display drivers, graphics chips, and/or other well-known components to display and update images on the display screen for implementing a game and providing information for the redemption system, as described below.

In a typical game process of game unit 10, a series of game states occur until a game conclusion is reached. The player can influence game states with game commands, but game states will often also change without any user input, such as when a time limit expires. The game conclusion can be triggered by a particular game state or other condition. At the game's conclusion, the player's performance and/or skill in the game is preferably related back to the player using one or more output devices 20 in a form such as game score and/or prize credits. For example, the player's performance in the game can be determined by checking if the player achieved a predetermined goal or task during the game.

Universal ticket dispenser 20 can be included in game unit 10 used to dispense universal tickets or other universal vouchers to a player. The universal vouchers are used to redeem prizes available in the gaming environment. For example, tickets can be dispensed from ticket dispensing mechanisms, which is well-known to those skilled in the art.

The universal tickets and other vouchers dispensed by dispenser 20 are referred to herein as "tickets" or "universal tickets." These types of vouchers are generic and not specific to any prize, and can be accumulated by a player and used to redeem one or more of several prizes available to the player. For example, in a standard redemption game arcade, players of games in the arcade receive all the same type of universal tickets from the various games at that arcade. The operator of the arcade provides a separate prize display booth or prize vending machine, which accepts the universal tickets as currency in exchange for one or more prizes. In some embodiments, each of the tickets dispensed by dispenser 20 is equal to one prize credit accumulated by the player during a game. Some gaming environments provide universal tickets which may be exchanged for prizes only at one or more limited locations.

The term "prize", as used herein, is intended to generically refer to any merchandise, souvenir, food item, or other physical goods or services which can be offered to players of redemption games and which has value other than as a medium of exchange for use in the gaming environment. A can of soda, slice of pizza, radio, stuffed certificate, cash, and free games to be played on game unit 10 are all examples of "prizes." A prize might also be a promotional coupon, which can encourage players to return to the current gaming environment or location more quickly in the future. For example, a promotional coupon can be dispensed as a specific prize ticket (see below), which offers a player a free pitcher of beer if the player returns and redeems the coupon within one week (or whatever free item the operator desires). Redemption tickets or specific prize tickets would not be considered a "prize" since these tickets can be used in the gaming environment (such as an arcade) to redeem other types of prizes. In arcade-type gaming environments, each prize typically has a cost or value associated with it, specified as an amount of universal redemption tickets (or prize credits). The more valuable the prize, the greater number of tickets is typically required to redeem that prize.

For example, a small toy car prize might have a requirement of 20 tickets, while a large stuffed animal prize might require 1,000 tickets for exchange. Since a player can view the prizes and their associated costs in universal tickets, the player can play various games in the arcade until the desired number of universal tickets have been accumulated. The use of a universal ticket allows the operator to provide a specialized "currency" which the players must use to exchange for prizes at the arcade. Other types of objects or items can also be dispensed and used as universal vouchers, such as plastic or cardboard chips, tokens, and the like, or even coins or other currency.

The amount of universal tickets dispensed to the player is typically based upon a game score or other result of a game process. In addition, special or progressive goals may be achieved by the player to win an additional or specified number of universal tickets. In the preferred embodiment of the redemption system, "tickets" or "prize credits" are used as a medium of conversion from game score to prize value. Actual physical universal tickets may never be dispensed to a player if the player uses his or her ticket winnings to directly purchase a prize within the redemption system. The selection of prizes in the disclosed embodiments is described in greater detail with respect to FIGS. 5 and 6.

The game processor 12 can issue commands to start the dispensing of tickets, dispense a particular number of tickets, and stop dispensing tickets. The tickets are stored in a storage area, such as a receptacle behind a front panel of the game unit 10, as is well known to those skilled in the art. In other embodiments, no universal dispenser 22 is included in game unit 10, and prizes are redeemed solely by the use of specific prize tickets (described below) or other means.

Specific prize ticket dispenser 22 is optionally included in game unit 10 to dispense special tickets, coupons, or other vouchers for specific prizes to the player of the game unit. Specific prize tickets are to be distinguished from the universal tickets described above. A "specific prize" or "instant prize", as referred to herein, is a particular prize or type of prize that a player can be directly and immediately awarded and, in most cases, can immediately receive due to a particular winning result on game unit 10. Preferably, the player redeems the specific prize by paying an appropriate specific prize ticket to an operator, vending machine, and the like, that the player received from ticket dispenser 22 based on a particular winning result on the game unit. A "specific prize ticket," "specific prize coupon," or "specific prize voucher," as referred to herein, is a ticket, coupon, or other physical or electronic voucher that can be exchanged for the specific prize only, and cannot be exchanged for other types of prizes or accumulated to purchase several types of prizes. For example, paper or cardboard tickets, special metal, plastic, or cardboard coins or tokens, smart cards, and the like, can be used as "specific prize tickets" and dispensed or output from specific prize ticket dispenser 22.

In the preferred embodiment, a specific prize ticket refers to an associated specific prize in some way and has a standardized format that is recognizable and verifiable by the prize supplier or operator. The specific prize ticket thus verifies that the player legitimately won a prize from a game unit 10 within an operator's control or knowledge. For example, a specific prize ticket can include on its face a text description and/or a pictorial description of the particular prize won, such as a slice of pizza or a stuffed animal. The player can turn in the specific prize ticket to a display booth, other prize area, attendant, bartender, waiter, and the like and receive the specific prize referred to on the specific prize ticket. In other embodiments, the player who won a specific prize can send in the specific prize ticket or other voucher to a prize distributor or seller and receive a prize by mail or other delivery service. In still other embodiments, the specific prize ticket can be provided in electronic form as, for example, bits or other data to be stored on a storage device or medium. Alternatively, the specific prize ticket can simply designate that it is a specific prize ticket and not a universal ticket, and other operator-determined factors can determine which particular prize can be redeemed by the specific prize ticket. Specific prizes and specific prize tickets offer a player greater excitement and involvement in a game by allowing large prizes to be won instantly without accumulating tickets, and also provide the game operator with promotional opportunities and simple verification that players have won particular prizes.

Specific prize ticket dispenser 22 is preferably a separate dispenser from universal ticket dispenser 20, although in alternative embodiments the two dispensers 20 and 22 can be implemented as a single dispenser. In a preferred embodiment, specific prize ticket dispenser 22 includes a printing device, such as a laser printer, an ink printer, or a thermal printer, that outputs a slip of paper including a text description and/or pictorial representation of the specific prize, which can be redeemed for the ticket. This same printing device can also be used to print either universal tickets with markings/indicia or specific prize tickets with indicia specific to a specific prize that has been won by a player. Since players may try to produce counterfeit-specific prize tickets/vouchers, the specific prize vouchers can be provided on specialized paper, cardboard, or other material and/or include special identifying marks, a code or a password not easily reproduced. In some embodiments, the specific prize ticket dispenser can print a value or a description on the specific prize ticket in standardized bar code format, which can be read by standard bar code readers. For example, a specific prize ticket awarding $1.00 off the price of a product can be printed with the appropriate bar code and thus can be accepted by any retail establishment able to read bar codes on products. The specific prize ticket dispenser 22 is controlled by game processor 12 similarly to dispenser 20 described above.

In alternate embodiments, no universal ticket dispenser 20 is included in game unit 10 so that only specific prize tickets can be dispensed and exchanged for prizes. This embodiment offers the operator the advantage in that a whole price structure for prizes need not be maintained in a prize booth or other display area. These features reduce the operating and maintenance costs of implementing a redemption system. Alternatively, the specific prize ticket dispenser 22 can be used in place of universal tickets and the universal dispenser by dispensing a single ticket "receipt" that has a universal ticket value printed on it. Players can thus save receipts indicating how many tickets they have accumulated rather than saving large numbers of universal tickets.

In still other embodiments, game unit 10 does not include a specific prize ticket dispenser 22. Specific prizes can still be won by a player using the game unit 10, but the prizes are claimed and received in some other manner than by ticket redemption. For example, when a player achieves a predetermined task on game unit 10 to win a specific prize, a message is displayed on a display screen or other output device indicating that the specific prize has been won. That message can be "frozen" or displayed until an operator or prize supplier gets a chance to see the message and personally verify that the prize has been won. The specific prize can then be given to the winning player. The operator can then reset the game to remove the prize message so that players can continue to play the game. Alternatively, the operator can have access to a central computer or game that is linked to game unit 10 through communication device 24 (described below), such as the computer that implements a tournament score, and remotely verifies that the a specific prize has been won and reset the game apparatus from the central computer. In yet other embodiments, the dispenser 22 is provided separately from game unit 10 and is linked through communication device 24 to receive prize information through electrical connections. In this way, a small number of centralized prize dispensers 22 can service a larger number of game units 10 all linked to the central dispensers.

In other embodiments, a player can insert a card or other medium, which stores electronic data into a suitable output device 18. The game unit 10 then can write electronic data on the medium indicating the specific prize that was won by the player, and/or indicating a number of tickets or prize credits which the player has won. The player can then take the card and insert the card into a suitable card reader connected to a prize selection apparatus (prize selection is described in greater detail below). The prize selection apparatus can be a game unit 10, or a separate "prize center" which can be used solely for prize selection.

Communication device or link 24 can optionally be included to allow game unit 10 to communicate with other game apparatuses or with other computing, storage, and/or processing devices, such as a progressive bonus apparatus or server, described below. For example, a separate, progressive, bonus apparatus can be provided which is connected to multiple game units 10 through communication devices 24. Each individual game unit 10 contributes to a collective progressive score that is stored and displayed by the bonus apparatus. The progressive score, for example, can be incremented with every coin inserted in input device 14 of any linked game unit, or automatically incremented over time at regular or random intervals, manually incremented by an operator of the progressive apparatus, and the like. The progressive score is accumulated from the current and previous games that have been played on the linked game units 10. The first player that achieves a predetermined progressive goal on any of the linked game apparatuses wins the progressive bonus score, where the progressive score is added to that player's game score and thus allows that player to win a greater number of universal tickets and/or specific prize tickets that may be associated with the progressive score. Alternatively, an individual progressive score can be accumulated on a single, individual game apparatus 10 and displayed on a progressive score display separate from a game score display. For example, the individual progressive score can be incremented by a predetermined amount each time a player inserts a coin in a coin slot. Progressive goals, scores, and bonus apparatuses are described in greater detail in U.S. Pat. No. 5,292,127, by Kelly et al., and co-pending patent application Ser. No. 08/374,490, by Kelly et al., both of which are hereby incorporated by reference herein in their entirety.

Communication device 24 can also be used to communicate directly or indirectly with other game units 10 and other processing devices to allow multiple players to participate in a game process. For example, one game unit 10 can allow a player to control one player-controlled object in a video game, while a different game apparatus linked through communication device 24 can allow a different player to control his or her own object in the same video game. Such linked apparatuses can also be used in quiz-type games, for example, in which players simultaneously or successively compete to hit a button to answer a question, score points, and the like.

Communication device 24 can also be used to allow game unit 10 to communicate with an operator, server, or other central controller that regulates and coordinates prize distribution to game apparatuses linked to the controller in the current redemption system. For example, an operator in a game arcade can input a desired prize that will be associated with a specific prize ticket. This input information is communicated to the linked game apparatuses, allowing those linked game apparatuses to dispense a specific prize ticket that displays the prize that the operator entered. Similarly, the linked game apparatuses can communicate information to a tournament server, for example, that assists the operator or the server in operating the games or tournaments. For example, a linked game unit can inform the operator or server when specific prizes are won and the type of prize won, how many specific prize tickets have been dispensed over a predefined time period, how many universal tickets have been dispensed, how many progressive bonus awards have been won, and the like.

Communication device 24 can be implemented as any one of many devices well known to those skilled in the art. For example, device 24 can be a network interface card coupled to a main bus of the system, a telephone modem, a cable modem, a direct network connection, or another device for communicating information according to standard network or modem protocols. Alternatively, device 24 can be a wireless transmitter/receiver for communicating without the use of cables or wires, e.g., using infrared emitters and detectors, broadband RF communication, and the like.

Figure 1A:
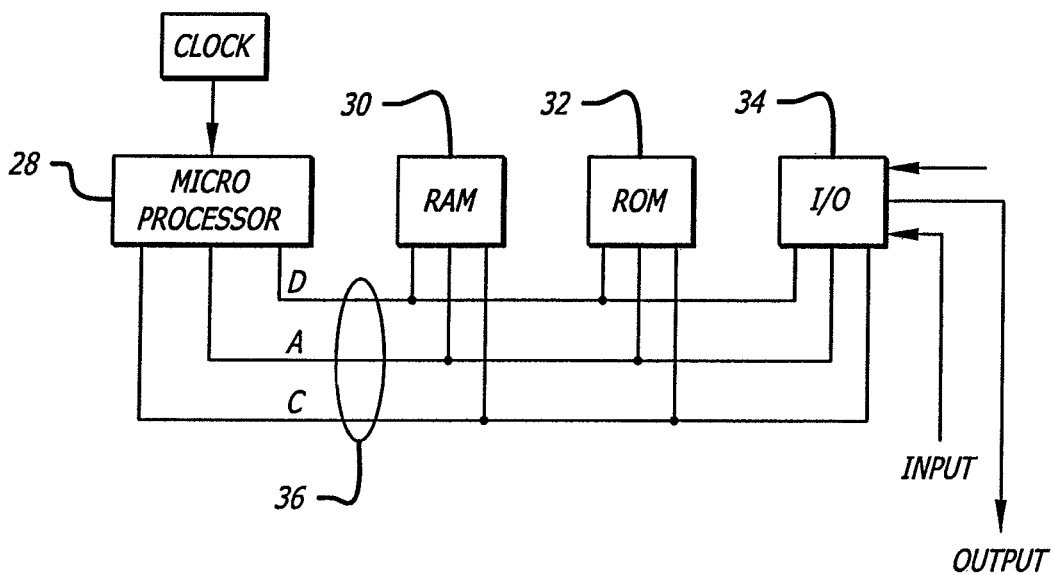
FIG. 1a is a block diagram of a game processor used in the game apparatus of FIG. 1.

FIG. 1a is a block diagram of a preferred game processor 12 of FIG. 1. Game processor 12 receives signals and commands from the player input devices 16 and translates/interprets those signals and commands so that the game process can be updated. Game processor 12 preferably includes a microprocessor 28, random access memory (RAM) 30, read-only memory (ROM) 32, and input/output (I/O) 34. Microprocessor 28 can be any processor or controller with features sufficient to control the game apparatus. For example, a suitable microprocessor for many mechanical game applications is the Intel 8031 8-bit microprocessor, which includes eight data lines and sixteen address lines. Alternatively, more powerful microprocessors, such as Pentium-class/power PC class microprocessors, or specialized graphical or digital signal processors, can be used. Microprocessor 28 executes a process, described by software instructions stored in memory, which recognizes a game command from player input devices 16. The software instructions can be stored in a "computer readable medium", which, by way of example, includes memory such as RAM and ROM, magnetic disks, magnetic tape, optically readable media such as CD ROMs, semiconductor memory such as memory chips or PCMCIA cards, and the like. In each case, the medium may take the form of a portable item such as a small disk, diskette, cassette, memory module, and the like, or it may take the form of a relatively larger or immobile item such as a hard disk drive.

Microprocessor 28 is coupled to RAM 30 by a data (D)/address (A)/control (C) bus 36 to permit the use of RAM for scratch-pad memory and other functions during a game process. ROM 32 is preferably an erasable, programmable read-only memory (EPROM) that contains the start-up instructions and operating system for the microprocessor 28. Much of the instructions to implement the process of FIGS. 5 and/or 9 can be stored in ROM 32. Methods for coupling RAM 30 and ROM 32 to the microprocessor 28 by bus 36 including data, address, and control lines are well-known to those skilled in the art.

I/O 34 includes buffers, drivers, ports, registers, and other analog and/or digital circuitry to interface inputs and outputs with the bus 36. Game output devices 18 and input devices 16 can be coupled to I/O 34. For example, a display screen can be coupled to I/O 34 so that the microprocessor or another video processor can control the display of images on the display screen, as is well known to those skilled in the art.

Game processor 12 can be implemented as part of a control system including other electronic components (not shown). Besides the components of game processor 12, the control system can include operator-configurable controls to provide selectable game functions such as the amount the score is incremented for certain player actions or commands, the amount of prize credits awarded based on the score, the speed and/or difficulty of game play, the conditions required to add to the game score and/or receive universal or specific prize tickets, the conditions required for a player to win a progressive bonus award or enter a tournament, and the like. These factors can affect the difficulty of the game and the amount of tickets/vouchers received by players. Other functions selectable by such controls can include sound effects, a test mode, the type of game, and so on. The game processor can also include other components, such as a sound chip, audio amplifier, and speaker.

The game processor 12 can also be implemented within a standard personal computer, workstation, network computer, or similar device. The computer can include plug-in interface cards such as video cards, 3-D graphics cards, sound cards, controller cards, and the like. Standard peripherals can be coupled to the I/O 34 as input devices 16 and output devices 18, such as a CD-ROM drive, a storage device (a floppy disk drive, a hard disk drive, and the like), a PCMCIA card, a printer, a stylus and tablet, a microphone for voice recognition, a camera, or communication device 24.

Figure 2:
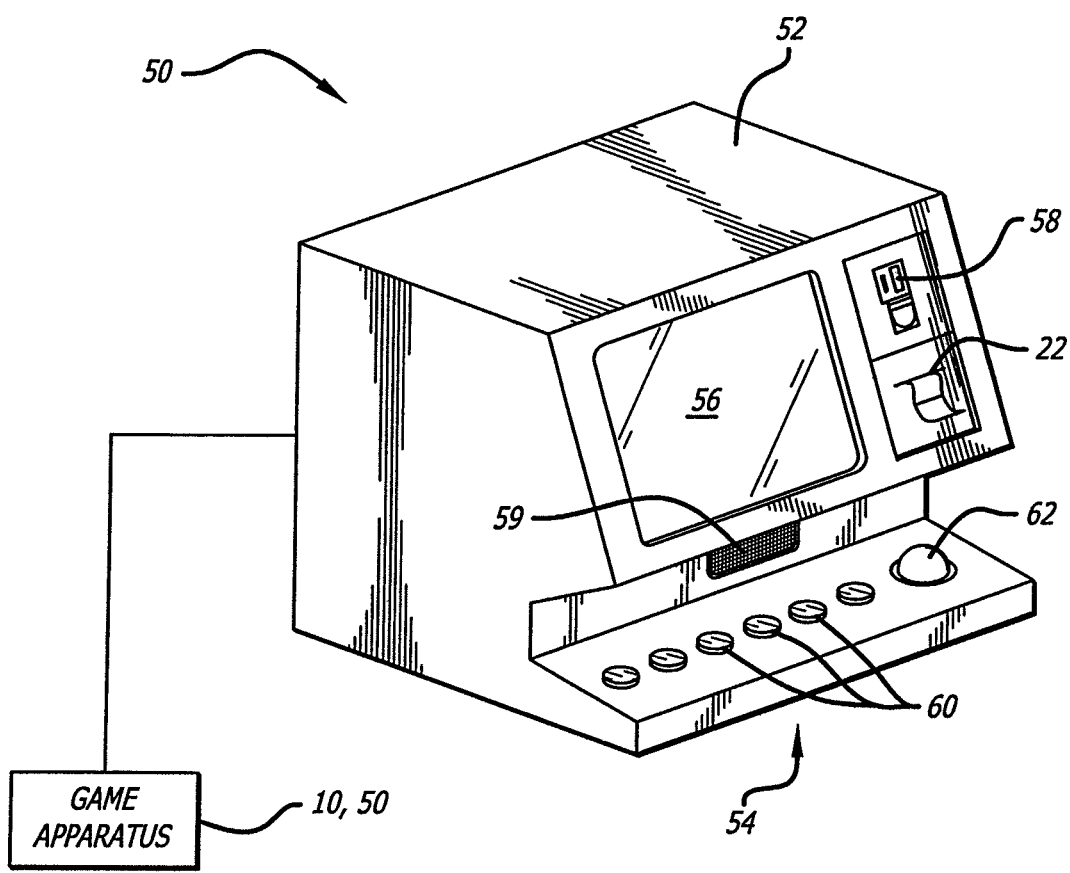
FIG. 2 is a perspective view of a preferred embodiment of the game apparatus of FIG. 1.

FIG. 2 is a perspective view of one embodiment 50 of game unit 10 which can include the features to implement games and a redemption system. Game unit 50 is a multi-function game station or game console, which is intended to implement multiple types of games using one apparatus, as described below. Game station 50 includes a housing 52, player controls 54, display screen 56, coin slot 58, speaker 59, and specific prize ticket dispenser 22 (a universal ticket dispenser 20 can also be included in other embodiments).

Housing 52 encloses and supports the components of the game unit 50. Player controls 54 allow a player to provide player input as described with reference to FIG. 1. The player controls preferably include a number of buttons 60 and a track ball 62. Buttons 60 can be used by a player to input selections or actions offered during games. For example, during a poker-style game showing a hand of cards, each button 60 can be associated with a particular card and the player can hold or discard a card by pressing or not pressing the associated button. Track ball 62 allows a variety of control options in several types of games. For example, the track ball allows a player to easily select certain areas displayed on display screen 56 with a player-controlled cursor. Alternatively, many other types of player controls can be used. For example, display screen 56 can be provided as a touch screen for reading the positions of objects that contact the screen. This allows players to select objects displayed on the touch screen by pressing a finger directly on the screen at the positions of the displayed objects, as is well known to those skilled in the art.

Images can be displayed and updated on display screen 56 by game processor 12 or other controllers by methods well known to those skilled in the art. Coin slot 58 is provided for the player to insert one or more coins before starting a game and can be implemented as described above. Other monetary input devices, such as card readers, can be provided in other embodiments. Specific prize ticket dispenser 22 is implemented as described above. Depending on the location of the game unit 10, a universal-ticket dispenser 20 may or may not be included. In standard redemption game environments, the dispenser 20 can be provided as described above. In some non-standard gaming environments, such as bars, restaurants, stores, and the like, it may be more appropriate to have only a specific prize ticket dispenser in game unit 10 since a prize display area may not be present in the non-standard gaming environments.

Alternately, other input and output devices can also be included in game unit 50. For example, a card reading/writing device, a video scanner, a video camera, a microphone, a dollar bill acceptor, a personal digital assistant interface port, or other devices can be provided to allow a player to input data from various sources and to allow the game unit to output prize information in a variety of forms.

Multi-use game unit 50 can be used in a variety of gaming environments. For example, game unit 50 is small enough to be easily located, thus allowing the game unit to be provided as a "bar top" game in a bar, restaurant, or similar environments and locales. The redemption system can thus be used in these non-traditional environments, where redemption games that do not have unit 50 can also be used in environments such as a gaming arcade. Also, environments such as casinos can use game unit 50 as shown in FIG. 2 or in modified form.

The bar top game 50 can offer one of several different types of video games utilizing images displayed on display screen 56. Some examples of games are described in greater detail below. Players can select buttons 60 to pick cards in a hand or displayed cards, for example. Likewise, trivia or quiz-type games are popular in bar type environments, where trivia from a range of subjects can be posed as questions for players and where players can select specific buttons 60, which correspond to displayed multiple choice answers; or players might speak an answer in a microphone if the game apparatus includes a speech recognition device. In addition, video games, which allow high-player involvement can be implemented on game unit 50. Memory games, timed games, knowledge games, and sports games such as basketball, golf, and the like can be provided, as well as other types of video games.

In one embodiment, game processor 14 can include a well-known microprocessor such as a Pentium-based microprocessor, as well as additional components necessary to implement popular computer platforms. Software that can be implemented on the Pentium microprocessor can thus be provided on multi-use game unit 50. This allows a wide variety of available games to be provided on game unit 50. Preferably, the player can select one of several offered games to play using player controls 54; the monetary amount required to play a certain game can vary depending on the type of game selected.

Multi-use game unit 50 is also ideally suited for linked or networked game play utilizing a communication device 24 as described with reference to FIG. 1 to create a multi-apparatus game system. A single game unit 50 can be linked with one or more other game units 50 to allow multiplayer games, as described in greater detail below. For example, game unit 50 can include a "network computer" which typically includes lower cost components than stand-alone PC's and which can utilize processors and software over a network to do many of computing tasks for the user of the computer. When provided as a network computer, game unit 50 can be initially provided as a stand-alone device which is not networked, and then eventually can be easily upgraded to intra-site and inter-site gaming systems, as described with reference to FIG. 3.

Figure 6:
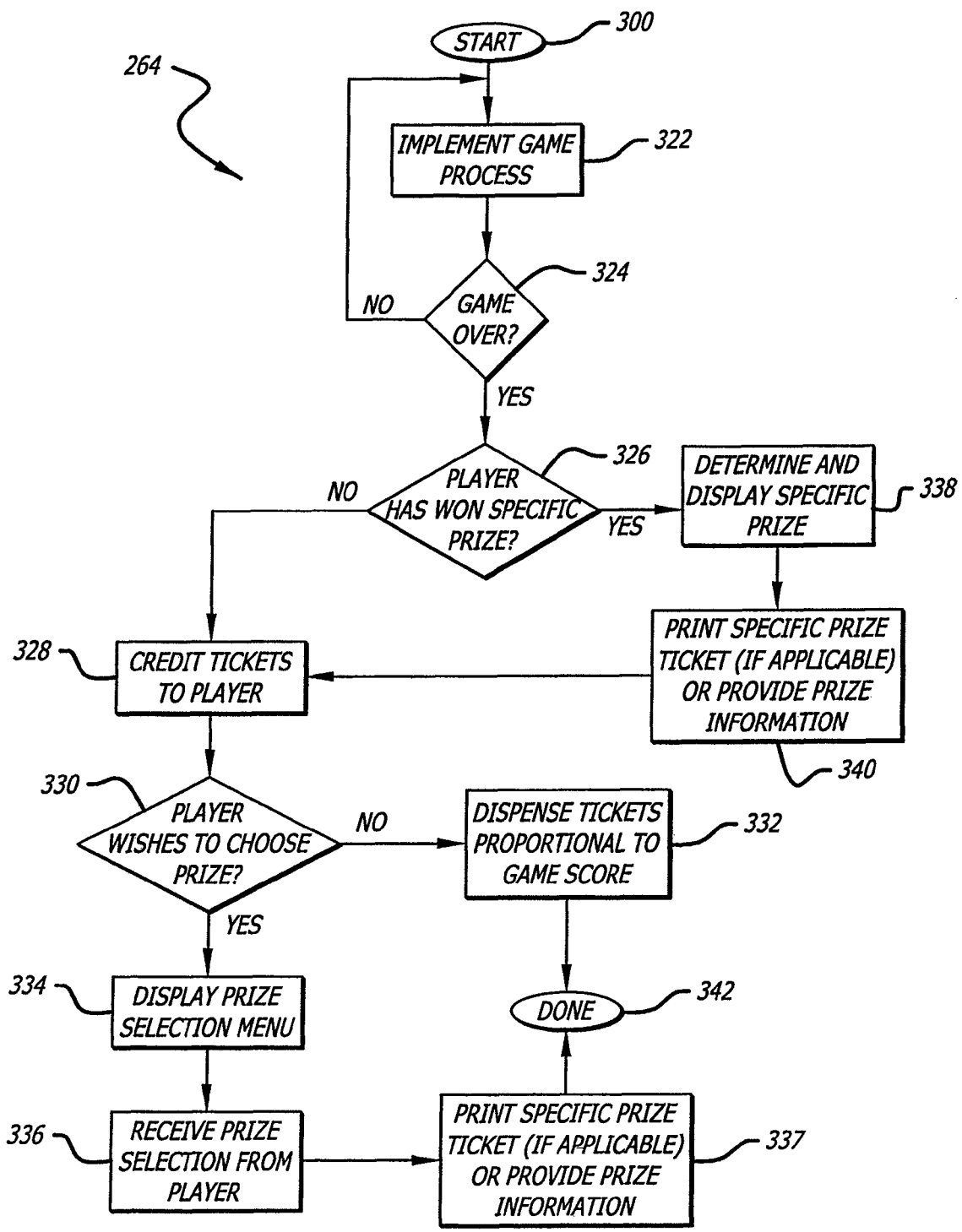
FIG. 6 is a flow diagram illustrating a method of implementing a non-tournament prize game in the process of FIG. 5.

In addition, universal tickets can be won and dispensed from game unit 50 similar to the embodiments described above. A prize selection menu, as described below with reference to FIG. 6, is also well suited for game unit 50 since the player can easily select a desired prize from available lists or menus displayed on screen 56 using track ball 62.

Figure 3:
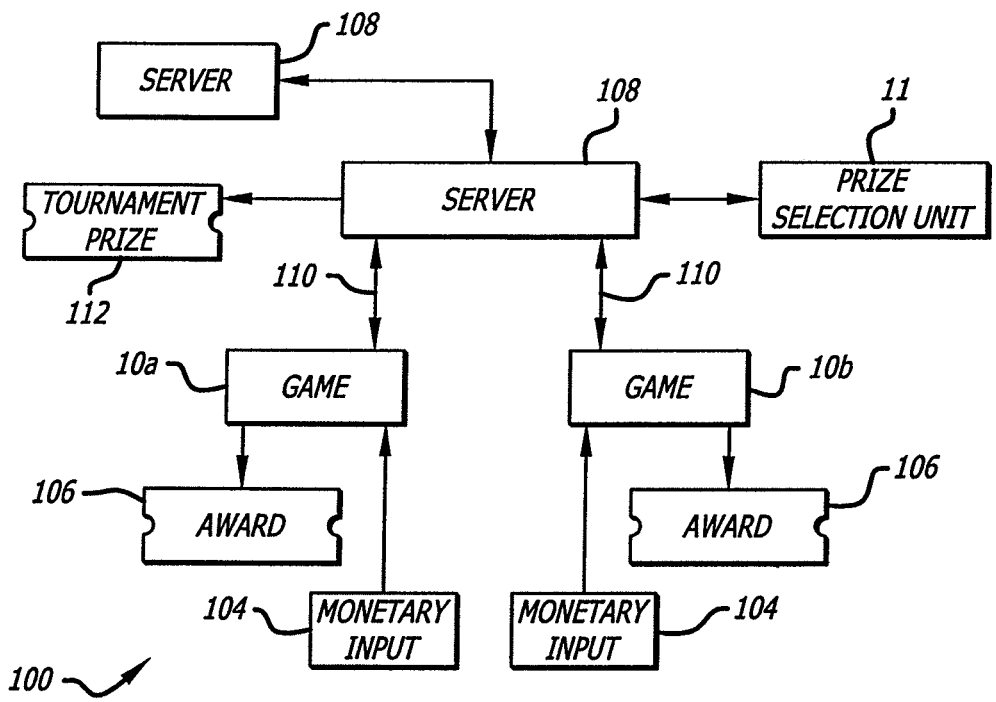
FIG. 3 is a block diagram showing an embodiment for implementing networked game apparatuses.

FIG. 3 is a block diagram showing an embodiment 100 for implementing networked game units with the redemption system. Individual game units 10a and 10b are described above with reference to FIG. 1, and may take the form of game unit 50 of FIG. 2 in appropriate embodiments. Each game unit 10a and 10b accepts monetary input 104, such as coins, tokens, a debit card, a credit card, a smart card, or other forms of monetary or validated input. Each game unit 10a and 10b allows a player to participate in a game of skill implemented on the game unit after the monetary input is received. Each game unit 10a and 10b is also preferably capable of dispensing an award 106 to a player in accordance with his or her performance in the game. This performance is typically indicated by a game score. Such award can be a specific prize ticket or coupon, universal tickets, smart card electronic data, and the like. Alternatively, awards can be provided in other ways as described herein.

Each game unit 10a and 10b may be coupled to a server 108 by a bus 110. The server 108 can be a separate device or apparatus which includes a controller, such as a microprocessor, and/or a storage device, such as a hard disk drive, memory devices, and the like. Server 108 can include a microprocessor similar to game unit 10 described above, and may also include input and output devices. For example, the server can be one or more personal computers, "workstations," mainframe computers, or other types of computers or processors. The game units can be electrically coupled by cables or wires and otherwise be physically separated from the server, or the game units can be physically coupled to the server. The game units can include appropriate network software to implement required communication protocols, as is well known to those skilled in the art.

Alternatively, the server 108 can be provided in one of the game units 10, or a server can be included in each game unit 10 and linked to each other by busses 110. Additional game units 10 can also be coupled to the server similar to game units 10a and 10b. Game units 10a and 10b can alternatively be directly coupled to each other without the use of a server 108.

In addition, one or more separate prize selection units 11 can also be coupled to server 108 and/or to game units 10a and 10b in the game system 100. Unit 11 allows a player to select a prize in the redemption system using prize credits won from playing a game in the redemption system. Unit 11 can be an apparatus similar to game unit 10 or 50 except that it need not offer any games for players to play. The prize selection unit 11 can receive a player's prize credit information from server 108 or a game unit 10a or 10b and display a prize selection menu on a display screen as described with reference to FIG. 6. The player can select one or more prizes using input controls of the prize selection unit, such as a track ball, a mouse, buttons, a keyboard, and the like. The prize selection unit can then dispense a specific prize ticket, order a prize from a prize distributor, dispense a prize from its own storage area, and the like. Alternatively, the unit 11 can include a reading apparatus that accepts a storage medium from a player, such as a smart card. The unit can thus read a player's prize credits from the storage medium and allow a player to select a prize.

In one embodiment of FIG. 3, the game units 10a and 10b and server 108 are an "intra-site" gaming system, i.e., the units and server are provided at a single location or gaming environment. For example, a local area network (LAN) can be implemented at the particular site to link only those game units at that site, and where the server 108 is a central computer or game apparatus that stores central data and coordinates prize information, networked game processes and/or tournaments. Or, existing phone lines or other network lines can be used to connect to a dedicated server that is used only to implement the games and tournaments at the single site. For example, a server 108 can be accessed by game units 10a and 10b using a modem and phone lines or TV cable lines, but the server 108 need not be connected to a large scale network (such as the Internet). Also, the game units and server can be networked at a single site using an "Intranet" that utilizes the same well-known protocols of the Internet, which is discussed in greater detail below. This allows Intranets to use the same or similar server machine software and client machine software as are used in Internet applications.

Server 108 is used to coordinate games among one or more individual game units and/or provide information to linked game units. For example, the server can be used to control a networked game, where players on separate game units are simultaneously competing. For instance, a first player that is playing a first person, point-of-view, virtual reality video game on one game unit 10a can interact in "real time" with a second player of a second game unit 10b who is also playing the same game. The first player can view a computer-generated object that is controlled by the second player, and vice-versa. Alternatively, "non-real-time" games with players taking turns can be provided. The implementation of such networked games is well known to those skilled in the art. Many players can be included in such a networked game, from 2 to hundreds or even thousands of players. Players can simultaneously compete to first achieve a goal or a predetermined task in the game that will win them a specific prize ticket or universal tickets from dispensers 20 or 22. Server 108 can also be used to store a variety of games in electronic form and to download a game to a game unit 10a or 10b when that game is selected by a player of the game unit. The game would then typically be executed locally to the game unit 10a or 10b by game processor 12. Alternatively, if the network transmits data quickly enough, the server 108 can execute a game and send and receive appropriate data between the server and game units.

Alternatively, game system 100 can be provided as an "inter-site" system, where one gaming environment or "site" can be linked to game units 10 at other gaming environments or sites (such as a bar down the street, or a bar across the world) to allow additional numbers of players to interact and/or compete in networked games, tournaments, and the like. Thus, for example, server 108 with game units 10a and 10b at one site can be linked to a different server 108 and game units at another site. For example, game units 10 or 50 at different sites can be conveniently linked through a private wide area network (WAN) or an existing global network such as the Internet and/or the World Wide Web (described below), where the communication between different game apparatuses is accomplished using telephone lines, ISDN lines, direct-connect data lines, fiber optic lines, cellular phone or pager wireless receiver/transmitter devices, and/or other types of communication devices and channels. The network can be a standardized network, such as Ethernet, and the game apparatuses can communicate using well-known network protocols, such as TCP/IP, IPX, or other standards. Each site may include its own server 108, which is linked to servers 108 at other sites. Also, each server may be linked to one or more centralized servers at "central sites" which can coordinate information, rules, and the like between sites. Alternatively, each site may include only game units that are connected to one or more centralized servers located external to the game environments at different sites.

For example, a server 108 can be provided at each site and additional sites where games are desired to participate in the present prize redemption system, networked game, or tournament. Each server can send periodic update signals to other linked servers so that each server has the most current information regarding prizes, the state of a game, the number of participants in a tournament, the current tournament score, or other related information.

Game units 10a and 10b can likewise be linked to other types of computing and electrical devices through communication devices 24. Centralized servers 108 can monitor and coordinate games for several game units. A network connection to an existing large-scale network allows the game units 10 to be additionally used as terminals for players or other members of the public to access information over the network. For example, track ball 62 of game unit 50 can conveniently be used by a player to move a cursor displayed on screen 54 to select different links to the World Wide Web, to either play a game or access information-related services.

The networked game units 10a and 10b and server 108 can be used to implement a centralized prize distribution system in the redemption system. A list of available prizes and their prize costs can be stored on a server 108 or a centralized server 108 as described above, and this information and be accessed by game units 10a and 10b when needed. A prize selection menu can be retrieved by game units in the redemption system, as described in greater detail below.

The game system 100 can also be used to provide networked games between players of different game units 10, such as the real-time and non-real time games described above. In one embodiment, a new player might approach a particular game unit 10 and view a list of players displayed by game processor 12, which are currently playing games on game apparatuses that are linked to the particular game apparatus. The new player can select a game in that list to join that networked game or start up a new, networked game of his own and wait for additional players to join.

Game system 100 is also well suited to implement tournament games. In one embodiment, a tournament can be implemented on a single game unit 10, where players successively play games on the single game unit 10, and where each player's score or performance is stored, for example, in memory such as RAM 30 or on a different storage device coupled to the single game unit. Servers 108 are also well-suited for tournament game embodiments. The single game unit 10 can be coupled to a separate tournament server 108, or the tournament server can be physically included within the game unit 10.

In another embodiment, linked or networked game units 10a and 10b provide a much larger base of participants in a tournament. A player may participate in the tournament from any game unit 10a or 10b that is connected to other game units in the tournament. Game units 10a and 10b in a tournament can be provided and linked together at one site as described above, and can also be linked to server 108. Similarly, other game units at different sites can also be linked together and/or to a server 108. Server 108 may coordinate prizes between game units, or determine a tournament prize 112 at the conclusion of a tournament, similar to the embodiment 100 described above.

The tournament is over after predetermined conditions have occurred, which is described in greater detail below with respect to FIG. 7. A tournament prize 112 is provided to winning players of the tournament who are determined according to predetermined rules or methods as described with respect to FIG. 8. The tournament prize can be cash, physical prizes, tickets or other vouchers (such as specific prize tickets), or other types of awards. The tournament prize can be dispensed to the player through an award-dispensing device of an individual game unit 10, or provided to the player externally. For example, an operator of the game tournament can manually provide the tournament award to the winning players. Alternatively, a player may be remotely awarded the tournament prize from a prize distributor, e.g., the player can be sent prizes through the mail or delivery service, a player's bank account can be credited, and the like.

Figure 4:
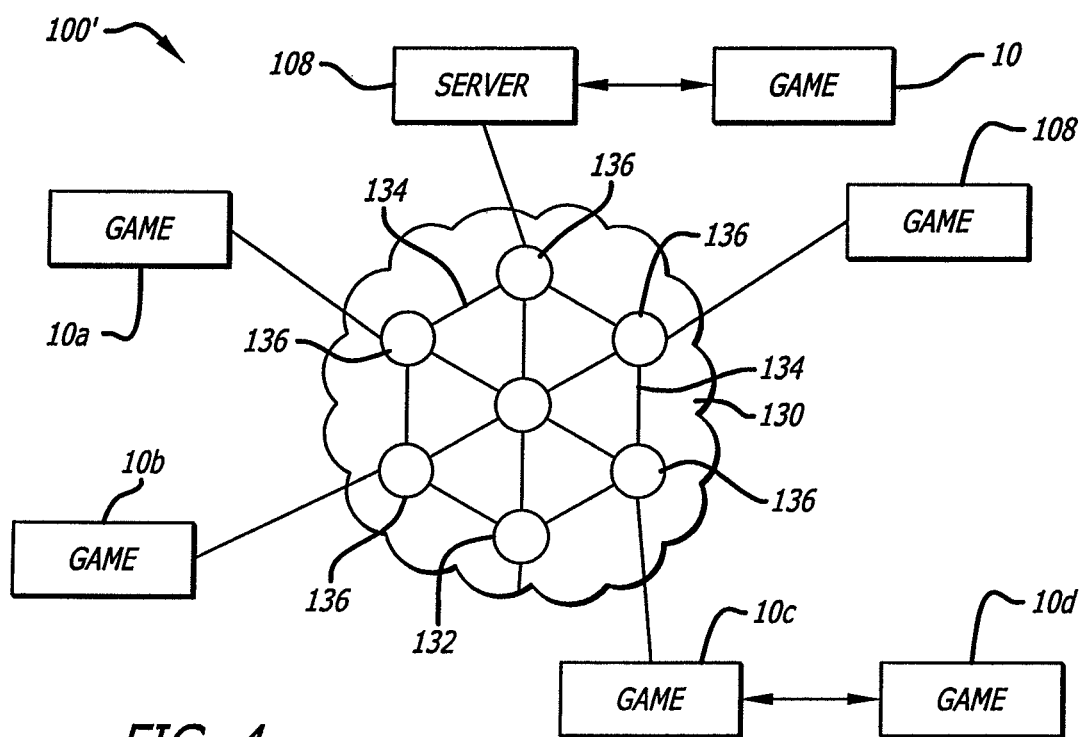
FIG. 4 is a block diagram of game units networked using a wide area network, such as the Internet.

FIG. 4 shows a second embodiment 100 of networked game system 100. System 100 includes a wide-area network (WAN) such as the Internet 130, and a number of game units 10 coupled to the Internet 130. For example, a first game unit 10a, a second game unit 10b, and a server 108, are coupled to the Internet 130. Multiple servers 108 can also be provided with access to Internet 130, which are accessible by other computers and components connected to the Internet.

The Internet 130 includes a number of nodes 132 that are interconnected by data transmission media 134. These nodes are typically routers, switches, and other intelligent data transmission apparatus, which route "packets" of TCP/IP information to the desired destination. In some instances, the nodes 132 can comprise an Internet service provider (ISP) 136, which allows a client machine to access the "backbone" of the Internet. Alternatively, client machines and web servers can be coupled directly into the backbone of the Internet. The nodes 132 are most commonly routers built, for example, by Cisco Systems of San Jose, Calif. The Internet service providers 136 are typically computers such as workstations.

Game units 10a and 10b can be coupled to the Internet 130 with a suitable communication device, such as a network interface, a telephone modem, a cable modem, and the like. The game units 10a and 10b can be considered, in the language of the Internet, to be "resources," and game unit can include its own unique Uniform Resource Locator or "URL." In one embodiment, a client machine, such as game unit 10a or 10b, sends a request for information, such as current prize costs, tournament score and the like, residing on, for example, server 108. In some embodiments, the information on a server 108 or game unit 10 can be publicly available to anyone with Internet and World Wide Web access; for example, the current tournament standings or prizes provided by a game provider or operator can be posted on a "web page" on the World Wide Web. A game unit or other requesting machine can send a connection request and a URL, which specifies the address of the web page to the server 108. The server 108 then sends a web page written in, for example, HTML format back to the requesting game unit or client machine, where it is "cached" in the memory (typically the RAM, hard disk, or a combination of the two) of the game unit or a client machine. In this embodiment of the invention, the image on a video display of the game unit or client machine can be generated from the HTML web page file cached on the client machine. For example, a client machine can use a web browser such as Netscape from Netscape Communications or Internet Explorer from Microsoft Corp.

A game unit 10a or 10b may also request information such as a prize selection menu, as described below with respect to FIGS. 6b and 6c. The prize selection menu can be implemented as a "web page" in HTML, or other standard formats. The most recently-updated prizes and their prize costs would be downloaded to client game units with the web page so that players could select desired prizes using prize credits won during previous games. This embodiment is suitable for game units 10a and 10b that are situated in public places as well as non-public places, such as the homes of players. In addition, game unit 10c can be coupled to Internet 130 similar to game units 10a and 10b. Game unit 10c can be coupled to another game unit 10d by a LAN or another communication network.

In other embodiments, other well-known Internet protocols or languages can be implemented on servers 108, game units 10 and client machines. For example, information can be sent in Java from Sun Microsystems, ActiveX from Microsoft, and/or the Virtual Reality Modeling Language (VRML) in addition to HTML.

Using Internet 130 or a similar WAN, players at home can participate and interact in network games, prize redemption systems, and tournaments with players that are playing a game unit at a particular gaming environment such as a bar or arcade. In another aspect, a first game unit, such as game unit 10a, and a second game unit, such as game unit 10b, may directly communicate with each other in standard TCP/IP protocol over the Internet 130. More particularly, game unit 10a can send information to the URL of the game unit 10b, and the game unit 10b can send information in standard TCP/IP packets to the URL of the game unit 10a. In this way, players of game unit 10a and game unit 10b can directly interact in games over the Internet 130. Of course, a server 108 can likewise directly communicate information to a game unit 10a or 10b, or both units and the server can all interact.

Figure 5:
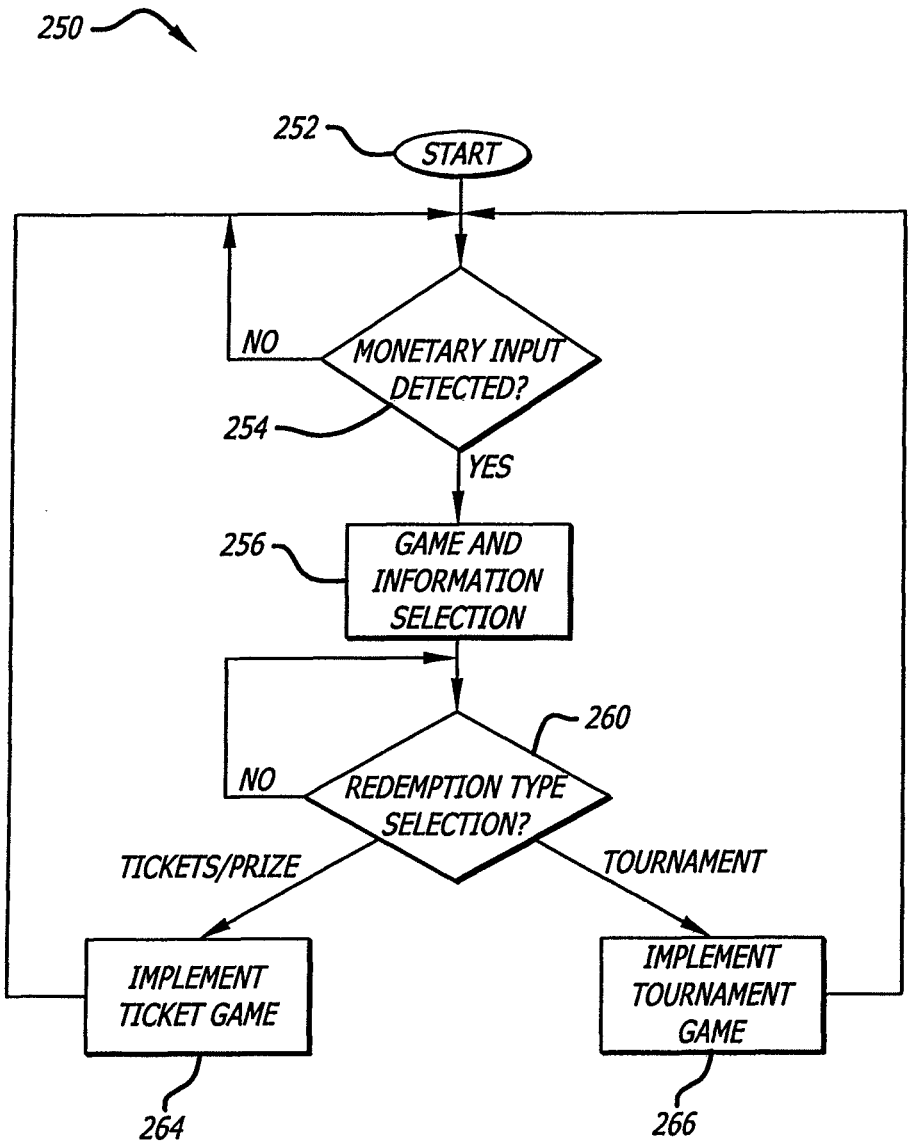
FIG. 5 is a flow diagram illustrating a process for implementing a redemption system on one or more individual game units.

FIG. 5 is a flow diagram illustrating a preferred process 250 for implementing a redemption system on one or more individual game units 10 in the process of playing a game. The present process is also suitable for the embodiments of the game system 10 described with reference to FIGS. 3 and 4, and can also be applied to other embodiments as desired. Process 250 can be implemented by game processor 12 or other processors coupled to the game unit.

The process begins at 252, and, in a step 254, the process checks whether monetary input has been detected, such as coins, tokens, credit cards, debit cards, and the like. Game processor 12 preferably stores monetary input in various categories so the operator can determine the amount of money earned by different games in particular time periods, and whether tournaments or single games earned more money. If no monetary input is detected, the process continues to check for monetary input. Once monetary input is detected in step 254, the process continues to step 256, where a game and/or information selection from the player is received and the appropriate selected game is selected from memory by the game unit 10. For example, in one preferred embodiment, the game console 50 as shown in FIG. 2 offers several types of games that can all be played on the same console 50. In other embodiments, only one type of game is offered per game unit. Information can also be selected about the offered games, prizes, events, and the like.

Figure 5A:
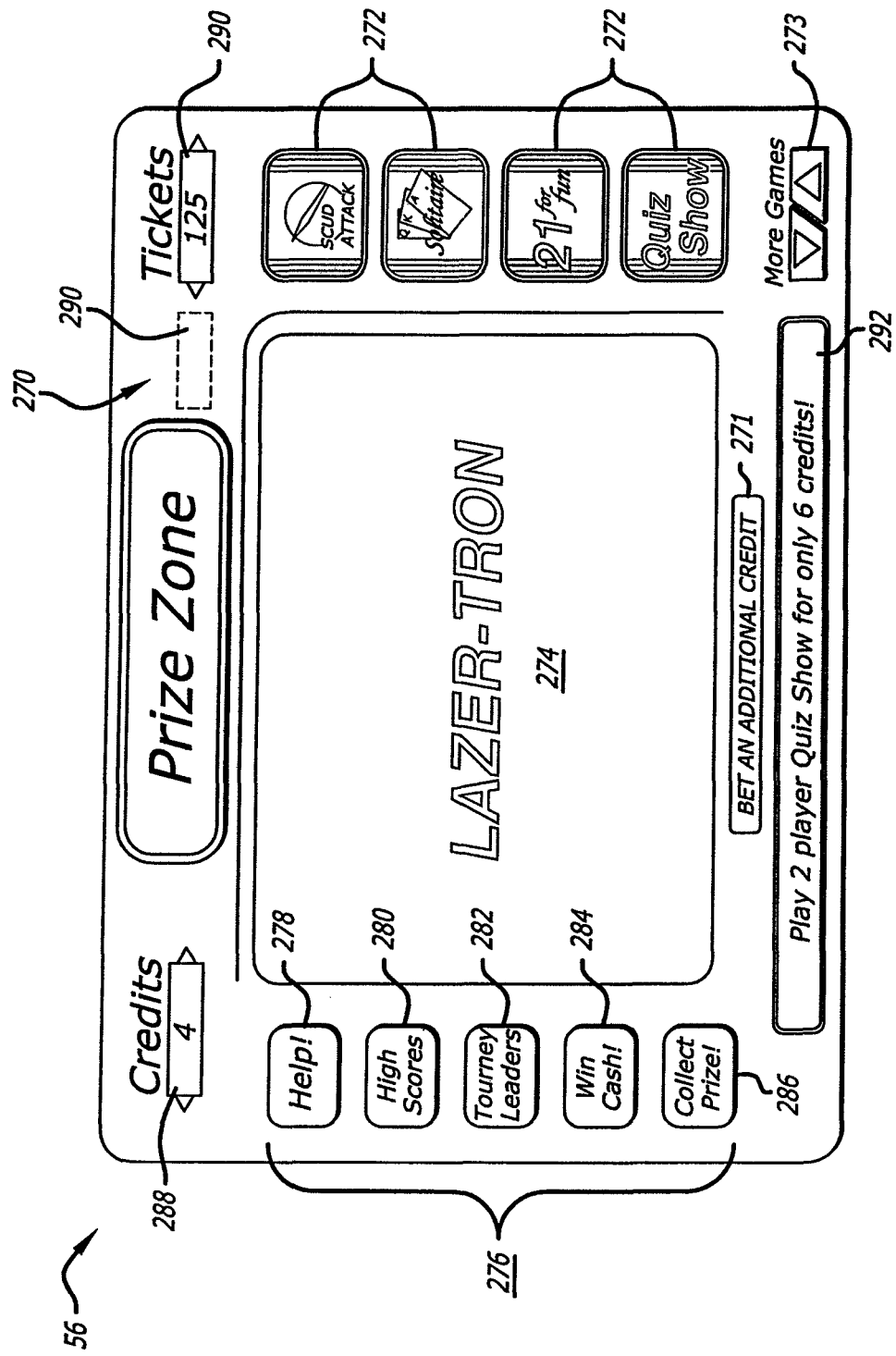
FIG. 5a is a diagram illustrating a display shell on a display screen of the game apparatus for use with the redemption system.

One example of a display shell 270 on display screen 56 of the game console is shown in FIG. 5a. A number of options and displays are provided for a player, including game selections 272, a main display window 274, and other information options 276. A player can select a game by pressing a touch-sensitive screen at the location of the game buttons 272, or by moving a pointer over a game selection with track ball 62 or other control and pressing a button 60, for example, to select the desired game. Available games of the described embodiment include arcade action type games, in which a player's dexterity may influence the outcome of the game and thus may influence the game score; card games, in which cards can be provided randomly and a player can select and arrange cards according to game strategies; and quiz games, in which a player is typically provided questions to answer. Combinations of these types of games and a variety of other types of games can also be provided. Other available games can be displayed and selected using arrows 273. Visual feedback from a selected game is preferably displayed in main display window 274 and can also be displayed in other windows or areas of display screen 56. In other embodiments, electromechanical games can be provided, in which game action is implemented with moving mechanical parts or components such as directed playing pieces (balls, rings, coins, and the like), tilting surfaces, moving targets, and the like, and may or may not include a display screen 56 with a display shell 270. Such electromechanical games can include coin or ball roll down games, basketball games, rotating pointer games, and the like.

Initial display 270 also shows a number of other controls 276 which a player may similarly select to obtain information about other aspects of the redemption system. Help button 278 provides information to the player about how to win and choose prizes, how to accumulate prize credits, how to play the various offered games, and the like. High scores button 280 provides the high scores of players for each type of game that has played on the displaying game console 50. Tourney leaders button 282 displays a screen of the current tournaments being provided and the current leaders in those tournaments. The tourney leaders screen is described with reference to FIG. 8a. Win cash button 284 provides the player with instructions and options on how to win money playing games. Other win and prize information can be similarly provided. The collect prize button 286, when selected, provides a player with a prize, such as a specific prize ticket, universal redemption tickets, or an actual prize. A prize display screen in connection with button 286 is described in greater detail with respect to FIG. 6a.

Other displays are also provided on initial display screen 270. Game credits display 288 displays how many game credits the player has left, which typically corresponds to how much monetary input the player has provided (e.g., number of coins). Each game credit is equal to a fixed monetary value, such as 25 cents. Typically, each game offered on game unit 10 requires a predetermined number of game credits to play, and this number can vary depending on the type of game played and the options selected for a game. In some embodiments, a player can store game credits and retrieve/use game credits from previous game sessions if a "game credit account" is implemented for the player, similar to the prize credit account described subsequently. Also, bonus or free game credits can be provided in a variety of circumstances, such as inserting a $5 bill into the game unit, previously winning a game credit prize, as a promotional exercise, and the like.

Prize credits display 290 shows the number of tickets (also referred to as "prize credits" or "ticket credits" herein) that the player has won. These prize credits may have been won by the player after the most recent game or during the current game session, and/or can include prize credits stored up over previous game sessions. A "game session" is a continuous use of the game unit by the player and may include one or more games played; for public game units, the game session may end when the player leaves the game unit. For implementations on a single game unit 10, prize credits may have been won by the player during previous game sessions when playing the game unit and the player did not exchange them for a prize (i.e., the player is "saving up" prize credits). In some embodiments, the individual game unit can store these previously won prize credits in a "credit account" with a player ID (name, address, ID number, and the like). In networked embodiments, such as shown in FIGS. 3 and 4, the server 108 can store the prize credits won by a player over previous game sessions and can send this information to an individual game unit when requested by the game unit, e.g., when the player associated with a credit account plays a game on the game unit. Thus, a player can access his or her credit account by playing any individual game unit connected to the server that stores that player's credit account information. In multi-server embodiments, the multiple servers can communicate the credit account information to each other so that the player can access his or her prize credits from any linked game unit.

Two or more players can also play games simultaneously, alternating, and the like on a game unit 10. In such a case, each player can be provided with a separate prize credit display 290 to indicate that player's winnings (and also a separate game credits display 288, if desired). Alternatively, the multiple players can compete for a single prize credit amount shown in display 290.

Initial display 270 also includes a display window 292 which can provide the player with messages concerning prizes, options, tournament information, and the like. For example, a message can scroll through the window in a right-to-left direction. Specific prizes winnable during a particular game can also be advertised or displayed in window 292. Main window 274 can also display game or prize related information, advertisements, promotions, and the like when no games are being played (or during game play, if desired).

A credit betting selector 271 allows a player to "bet" additional game credits for a game to potentially increase the number of prize credits won for a game. For example, each time the player selects selector 271, the game credits applied to a particular game can be increased by one. Preferably, the more game credits a player applies towards a game, the greater the potential award. For example, two game credits applied to a game that normally only requires one will double the player's prize credits won for a particular game score. In other embodiments, the second applied game credit might triple, quadruple, and the like, the prize credits won.

In alternate embodiments, the player may also be required to input some form of identification to access certain features of the game unit 10, such as a credit account storing previously-accumulated prize credits, a tournament, prizes to be sent to the player's address, and the like. One convenient way to receive the player's identification is to require that players provide monetary input in the form of a credit card, a debit card, an ATM card and PIN number, a smart card, and the like, which includes an electronic form of identification. Alternatively, a player can enter a password or other ID using input controls 16.

Referring back to FIG. 5, once the game and information selection is made by the player in step 256, the process continues to step 260, where the process checks for a redemption-type selection from the player. In the described embodiment, the player is offered a choice as to prize options when playing a game. The player can either choose to play a prize credit game (i.e., non-tournament game), where the player receives prize credits and/or specific prizes based on the score and other outcomes of the game; or, the player can choose to participate in a tournament when playing the selected game. In the described embodiment, a tournament player does not receive any prize credits based on game score but instead competes for a tournament prize with other players in the tournament, i.e., the player's score is placed on a tournament list of scores. If the player chooses the prize credit game, the process continues to step 264 to implement the credit game. This is described in greater detail with respect to FIG. 6. If the player chooses the tournament game, the process continues to step 266, where the tournament game is implemented. The tournament game is described in greater detail with respect to FIG. 7. The availability of specific prizes and tournament play on the game unit 10 tends to cause greater player interest and involvement and thus increases the game's earnings. In other embodiments, a player can win prize credits and specific prizes during a tournament game as well as a prize credit game. After step 264 or 266, the process returns to step 254.

In some embodiments, players can also be required to meet certain conditions before participating in a credit game or a tournament. For example, a player can be required to play a predetermined number of games (e.g., five) on a game unit 10 before being allowed to participate in a tournament. A certain percentage of the money received from this predetermined number of games can be allocated to purchasing prizes for the winners or top players of the tournament. The number of times the player has played can be stored with a player identification on a storage device or in memory or at a central database accessible by game apparatus 100. Alternatively, the player must play the required number of games at one sitting before being allowed to participate in the tournament. Or, the player might be simply required to input a minimum amount of game credits (equivalent to playing a predetermined number of non-tournament games) to participate in a tournament.

Figure 5B:
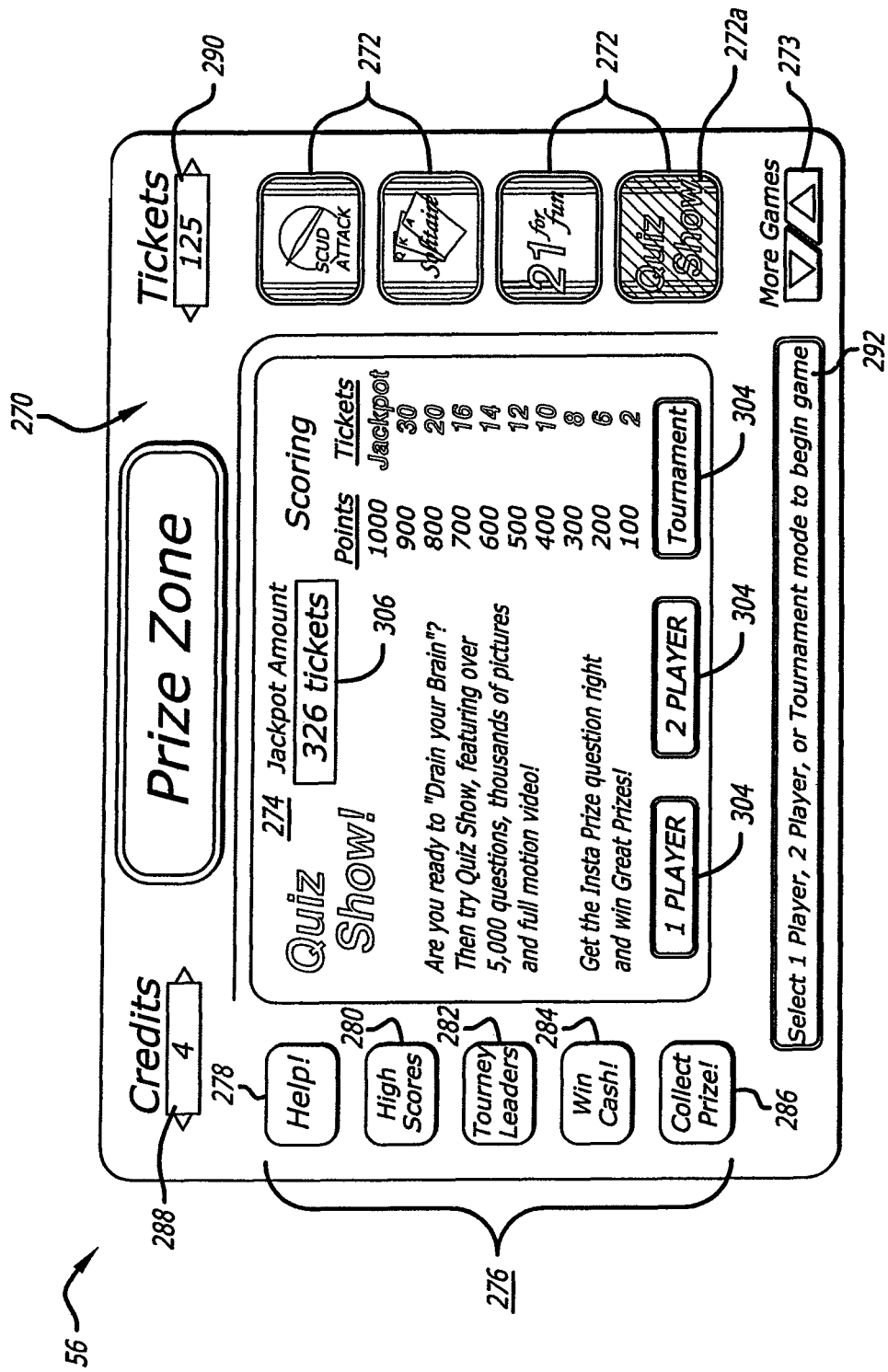
FIG. 5b is a diagram illustrating a selection screen of the game apparatus.

An example of a selection screen allowing the player to choose the type of redemption game is shown in FIG. 5b. Main window 274 displays information about the selected game, which in this example is "Quiz Show." By selecting one of the buttons 304, the player can select a prize credit game or a tournament game (the 1 and 2 player buttons preferably both select credit games). Other information can also be provided, such as a jackpot amount 306. As described in U.S. Pat. No. 5,292,127, a progressive bonus jackpot can be available to a player who achieves a progressive goal during a game. The jackpot amount 306 informs the player how many prize credits would be won as a progressive bonus award when a progressive goal is achieved during the game. The progressive bonus award was contributed to by previous players of game unit 10 and/or other linked game units. In some embodiments, the player can choose an option whether to play a game having a progressive bonus award available, or play a game not having a progressive award. The information displayed on main window 274 about a game, such as shown in FIG. 5b, can also be provided when the player selects the help button 278.

Figure 5C:
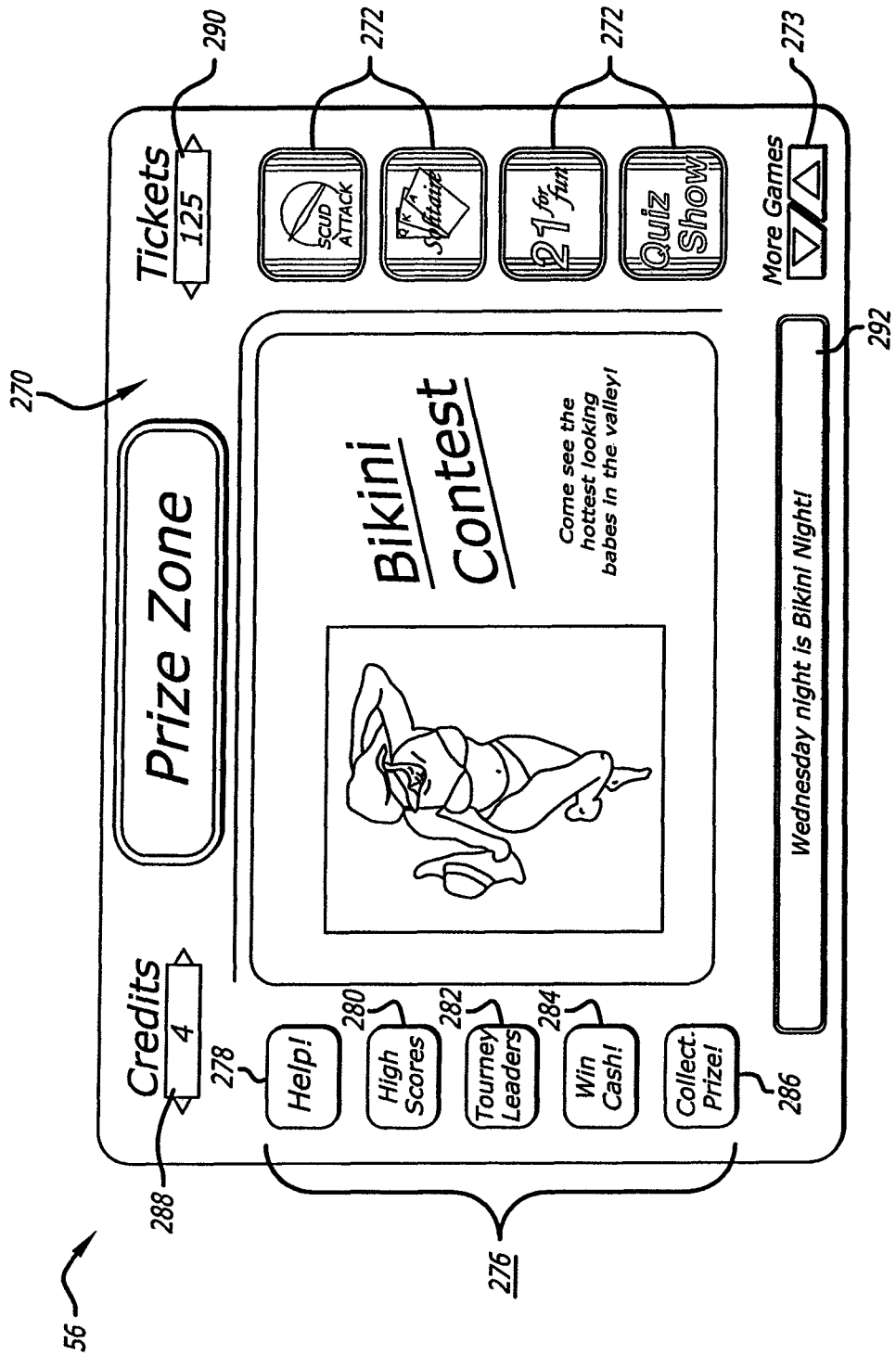
FIG. 5c is a diagram illustrating a promotion on the display screen of the game apparatus.

Between or during games, game units 10 such as game console 50 can display other information, such as promotions or advertisements. Such advertisements can include still shots, animation, movies, sound, and the like. For example, FIG. 5c shows a promotion for a bar advertising a particular future event at a bar to promote further interest from players. Other similar promotions can include, for example, a "happy hour" when products are free or reduced in price, a sporting event such as a football game, and the like. Preferably, the game unit 10 provides a simple interface to allow the operator to easily input promotional information.

Figure 5D:
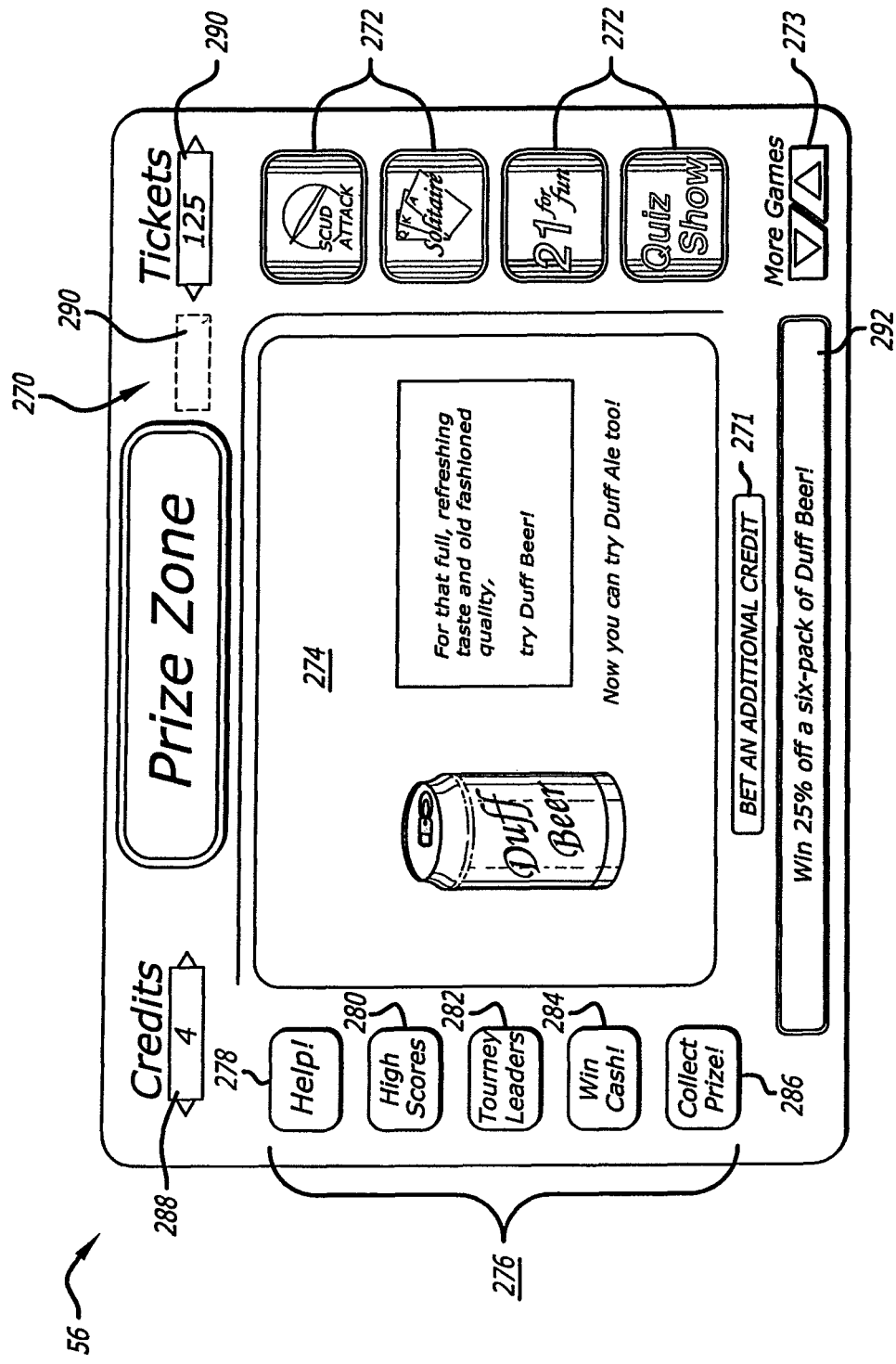
FIG. 5d is a diagram illustrating an advertisement on the display screen of the game apparatus.

Advertisements sponsored by companies, prize providers, or other sources can also be displayed and, in another aspect of the disclosed embodiments, can be directly related to prize or game information. For example, FIG. 5d shows a beer advertisement for a particular sponsor. This sponsor may have contributed to prizes available to players on the advertising game unit 10, so that the advertisement has a direct relation to prizes and can thus increase the effectiveness of such advertising. For example, windows 274 and/or 292 can display promotions such as "Win 25% off a six pack of beer" which might be won as a specific prize during a game on game unit 10. A dispensed specific prize ticket can include a bar code, which the player can exchange as a coupon in a store to receive the stated discount on that particular brand of beer. A sponsor might also supply free games for players in exchange for displaying advertisements, or may simply pay the game operator for advertising time. Thus, using the linked advertising and prize redemption system disclosed herein, multiple revenue streams from advertisers are offered to a game operator and also offer the sponsors more effective advertising.

FIG. 6 is a flow diagram illustrating the prize credit (non-tournament) game implementation of step 264 of FIG. 5. The process begins at a step 320, and in step 322, a game process is implemented. Once the player selects a start control, the game begins and proceeds according to a standard game process as modified by player input. For example, in a "Scud Attack" game, oncoming missiles are displayed on display screen 56, which the player attempts to destroy using track ball 62 and buttons 60, as is well known to those skilled in the art. In a solitaire game, cards are displayed on the display screen 56 and the player selects cards to place over other cards according to the rules of the game. In a quiz game, the player answers displayed questions using buttons 60 or other input controls. Many other types of games can also be provided as game unit 10 for use with the redemption system, such as mechanical roll down games, target games, and the like In step 324, the process checks if the game is over; if not, the game process is continued in step 322.

Once the game is over, the process checks in step 326 whether the player has won a specific prize (the process can also check for specific prize winnings during the game). If no specific prizes have been won, the process continues to step 328 to credit tickets (or prize credits) to the player or to the player's account, if such is implemented. The amount of prize credits already in the player's account was accumulated during previous games played by the player. The prize credits won from the current game are added to any existing credit balance, and the total is displayed to the player. As described above, the credit account can be implemented on storage devices such as memory, hard disk, and the like, either local to the individual game unit, or on a connected server that links multiple game units. In some embodiments, a connected server 108 can be used only for credit account functionality, or it may also be a tournament server having tournament functionality. In the examples of FIGS. 5a and 5b, the total prize credits available to the player are displayed in window 290. In other embodiments, the player only accumulates prize credits during a single play session that continues as long as the player has additional credits to play (e.g., the player can insert additional monetary input during or between games to continue accumulating prize credits during a single play session).

Figure 6A:
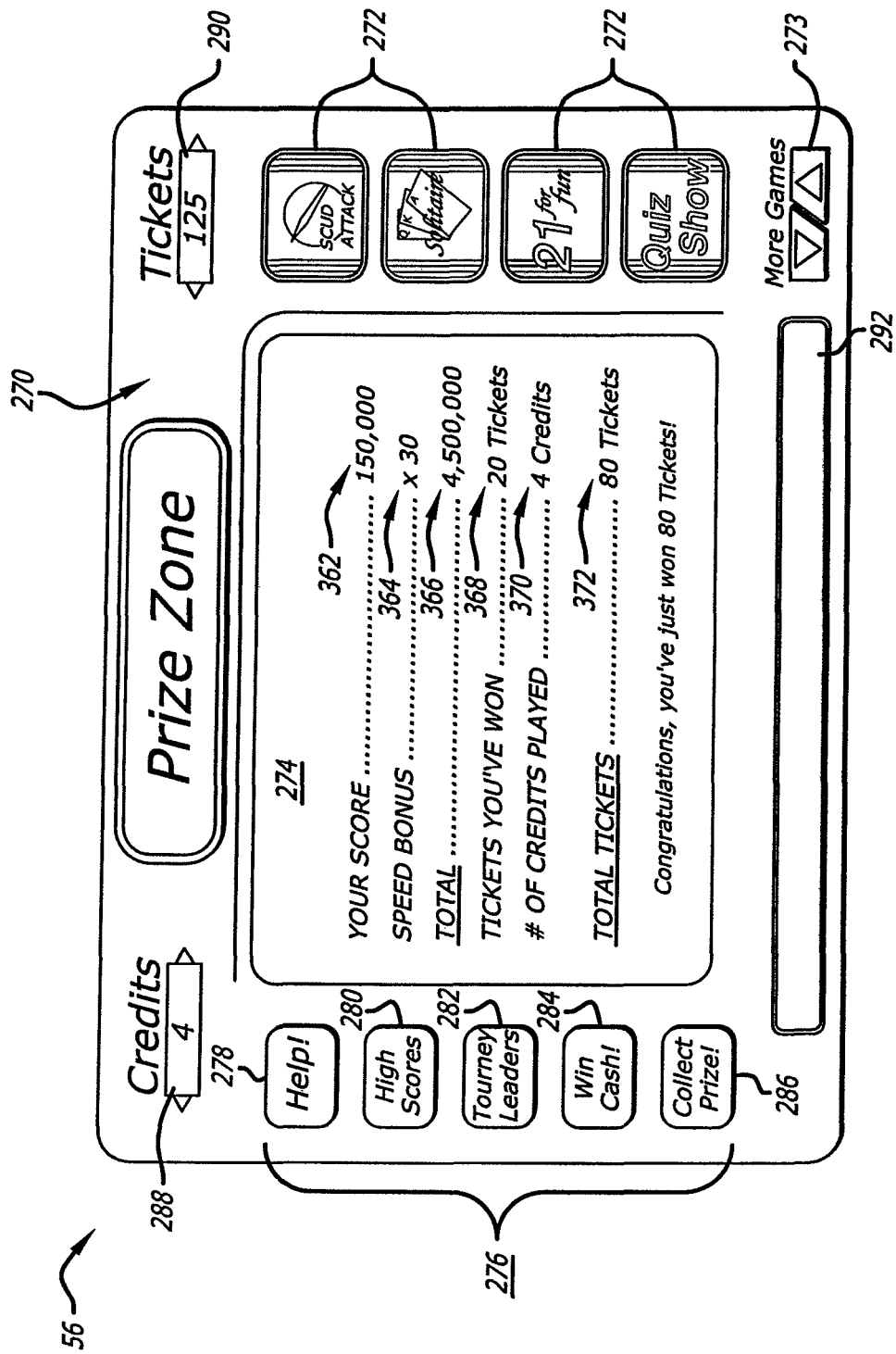
FIG. 6a is a diagram illustrating an example of game score and prize credits won by a player as displayed on the display screen of the game apparatus.

FIG. 6a illustrates an example display of score and prize credits (shows as "tickets") won by a player after a game is over. The score 362 of the game is displayed, followed by an optional speed bonus 364, which provides a modification to game score based on the time taken to play the game. For example, in some types of games, the shorter the time taken to complete a goal, the greater is the skill of the player. A score of higher value is awarded to reflect this necessary higher skill. In the described embodiment, a multiplier is applied to the score to achieve a total score 366. The total score is converted to a number of prize credits or tickets 347 that the player won; for example, a predetermined number can be divided into the total score to achieve a number of tickets that is about equivalent to the player's score in terms of prize value in the scale of prizes offered by the redemption system. The number of game credits played 370 is the amount of monetary input provided by the player to play a single game; in the described embodiment, the number of game credits inserted for a game acts as a multiplier for the tickets won from that game. Thus, the total number of tickets 372 is the number of game credits 348 multiplied by the won tickets 347. The total number of tickets 372 can be added to any preexisting ticket balance of the player, if appropriate. In alternate embodiments, there need not be a conversion of score points to prize credits; a game can simply have a game score in terms of prize credits or tickets.

In next step 330, the process checks whether the player wishes to choose a prize with his or her prize credits. If not, the player can simply end his or her game, with the newly-won prize credits added to his or her credit account that is stored on the game unit or a server (if applicable). Alternatively, the player can be dispensed a record, medium, or physical token in step 332 which allows them to retain their winnings externally to the game unit and redemption system. For example, as in traditional redemption game arcades, the player can be dispensed a number of paper tickets proportional to the game score and/or proportional to the total prize credits won. Alternatively, the player can be dispensed a printed form, a receipt or a stub by a printer, which indicates the amount of prize credits won. In yet other embodiments, the player can insert some form of electronic, optical or magnetic storage medium, such as a debit card, magnetic disk, and the like, into an appropriate reading device on the game unit. The amount of prize credits can then be written on the storage medium by the game unit, and the player would retrieve the medium. Once the player received a record of their prize credit winnings, the game unit would no longer have any record of those winnings. These latter methods may be the only way for a player to save up prize credits in embodiments that do not provide a stored credit account for each player. The process is then complete at 342.

If, in step 330, the player wishes to choose one or more prizes with his or her prize credits, then the process continues to step 334, where a prize selection screen is displayed. This screen provides a list of prizes that are available to players within the redemption system. The prizes are defined and organized completely within the system of the game unit so that the operator does not have to display physical prizes to players in the gaming environment in a separate booth or dispenser. In gaming systems that incorporate both game units 10 and servers 108, the prizes are organized within the system of game units and any connected servers. After the player has won prize credits, the player can conveniently select one or more prizes from a list presented on the screen, where all the information necessary is provided to the player. Thus, all redemption of prize credits for prizes is performed electronically. This allows an operator to have much greater influence and control over the prizes that are available and the desired profitability of the redemption games. For example, the redemption system of the disclosed embodiments allows players to select their prizes on the same game apparatus which the player played the game, and thus allows the system to automatically and continuously update prize costs and specific prize win ratios according to monitored player performance to maintain a desired profitability of the game units. The prize system is described from the system's and operator's point of view with respect to FIG. 9.

The prize selection menu is preferably displayed on the display screen of the game unit 10 or 50, but may also be displayed on output devices of other apparatuses, such as prize selection unit 11, server 108, client machines to the Internet, and the like. When game unit 10 is an electromechanical game or other game typically not including a display screen, then a player will typically be required to select prizes from a separate unit 11 or similar device.

In step 336, the player inputs a selection of one or more prizes from the displayed list. Preferably, the player can select a desired prize using a touch screen, track ball 62, a pointer, or other an input device. Once the prize selection is received, step 337 is implemented, in which a specific prize ticket is printed and provided to the player, and the process is then completed at 342. The specific prize ticket preferably includes a depiction of the prize or prizes selected by the player. Multiple prizes can be depicted on a single specific prize ticket, or a separate specific prize ticket can be dispensed for each prize selected. Thus, in effect, the prize selected by the player through prize credits can be considered a specific prize or "instant prize" at this point in the process. Specific prizes are described in greater detail with reference to co-pending parent application Ser. No. 08/628,490. The specific prize ticket may be redeemed at an appropriate exchange center for the actual prize. For example, a prize exchange booth can be provided at a gaming environment such as an arcade or bar, where an operator keeps an inventory of prizes and exchanges appropriate prizes for specific prize tickets. In other embodiments, the player can insert a card having the specific prize ticket information into a vending machine. In still other embodiments, the player can mail the specific prize ticket to a prize distributor.

Alternatively, the prize information describing which prize the player has selected is not printed on a specific prize ticket but is instead electronically routed to a distributor or to a dispenser directly over a network or other communication link. For example, in some embodiments, prizes can be delivered to a player from a central prize location, such as a warehouse. The selected prize information could thus be sent out via a network from the game unit to eventually be accessed by the prize distributors, who would send the desired prize to the player's address or would send the prize to the location where the player played the individual game unit so that the player could pick up the prize. Alternatively, the specific prize information can be written in electronic form to a medium such as a card, disk, and the like, where the player can remove the medium and claim prizes at a different apparatus able to read the medium.

If the player has won a specific prize or "instant prize" in step 326, then the process continues to step 338, where the specific prize won is determined and displayed. Specific prizes can be provided in a variety of different ways. Specific prize goals during a game can be offered to allow the player to win a specific prize (rather than prize credits) by achieving a goal requiring skill (dexterity, experience, and the like) of the player, such as moving a controlled object to a specific target, choosing a particular combination of cards, and the like. Alternatively, a specific prize goal can be met based partially or wholly on random or statistical chance. The specific prizes that can be won during a game are preferably displayed to the player so that the player knows how to win the specific prizes. Also, once the player has achieved a specific prize goal, the actual specific prize won can be determined in predetermined fashion or randomly from a prize table or other list of multiple, possible, specific prizes. The determination of a specific prize from a table is described in greater detail with respect to FIGS. 9 and 9a.

After or as the "won specific prize" is displayed in step 338, a specific prize ticket is dispensed to the player in step 340, which is described above with reference to step 337. The specific prize ticket includes a designation, such as a written description and/or picture of the prize won, so that the player may redeem the specific prize ticket for the desired prize. The process then continues to step 328, as described above.

It should be noted that a player may win both a specific prize ticket and may also win prize credits during a game of FIG. 6. For example, the player can achieve a specific prize goal during a game and win the specific prize, as well as scoring points and adding to a game score to win prize credits. Thus, after (or during) a game, the player can receive a specific prize in steps 337, 338 and 340, and also choose a prize in steps 334 and 336 based on prize credits won.

In alternate embodiments, actual prizes can be dispensed from the game unit 10 or from a dispensing apparatus that is located in the gaming environment. If available prizes are all small toys, cards, or the like, then the prizes can be stored in the dispenser, and an appropriate prize corresponding to the player's selection can be dispensed.

Figure 6B:
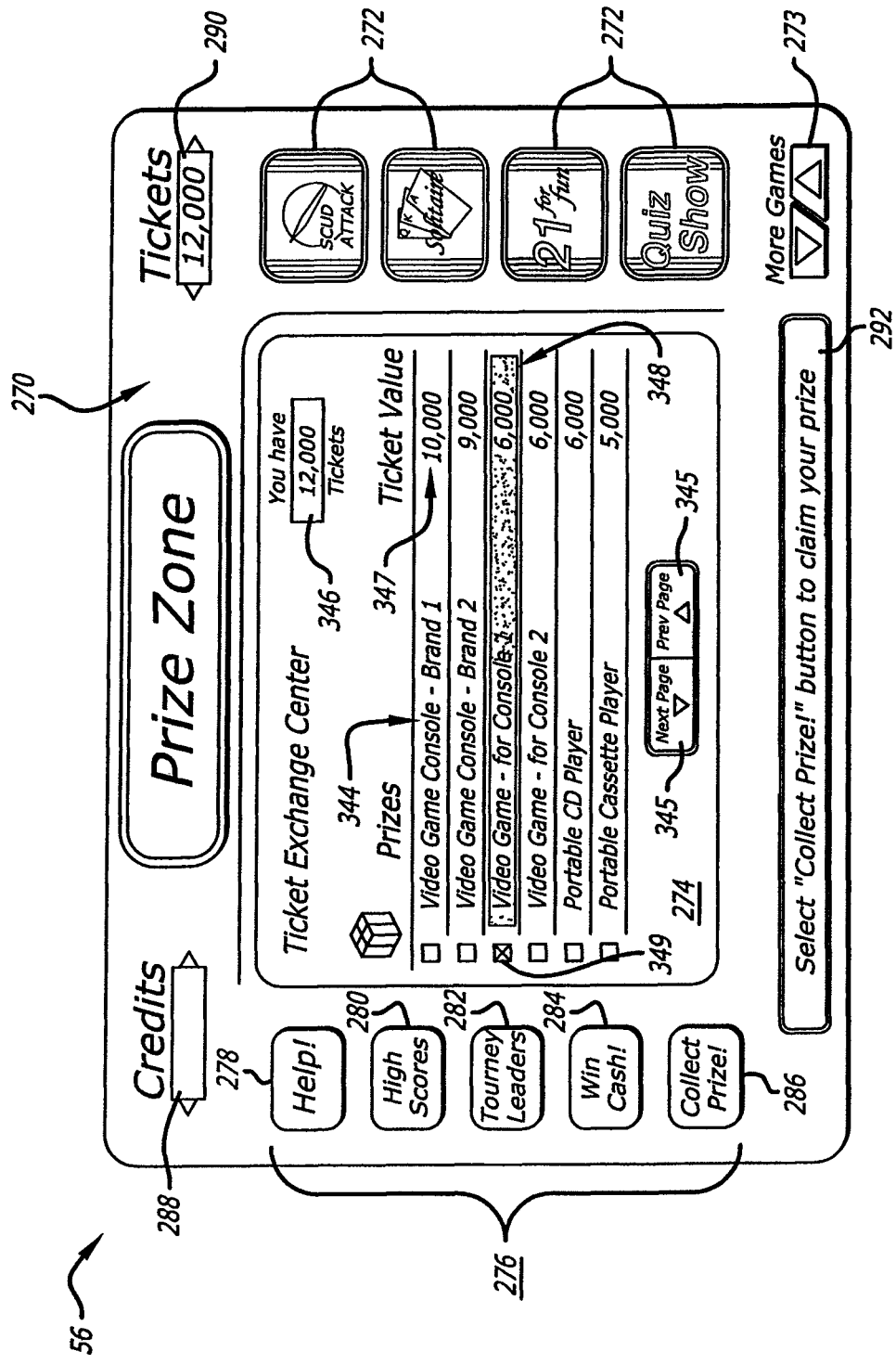
FIG. 6b is a diagram illustrating a prize selection menu on the display screen of the game apparatus.

FIG. 6b illustrates an example of a prize selection menu used in step 334 of FIG. 6. Main display window 274 provides a list 344 of prizes and also includes a prize cost or value 347 for each displayed prize. Additional prizes that may not fit within the dimensions of the display screen 56 can be viewed by selecting page controls 345. In the described embodiment, a prize is identified by a text name/description in a table format. In other embodiments, other text information related to the prize can also be provided, as well as pictorial descriptions of prizes, as shown in FIG. 6c.

A player can select any of the prizes for which he or she has enough prize credits as shown by window 346. Preferably, indicators 343 are provided to indicate which prizes can be "purchased" by the player with his or her current prize credit balance. Indicators 343 can take a wide variety of forms in alternate embodiments. A player selects a prize item using an input device, after which the selected prize is highlighted or marked to distinguish it from the other prizes in the list, as shown by highlighted prize 348 and check box 349. The player indicates to the game unit that a selection is finalized by selecting the collect prize button 286.

In the preferred embodiment, the entire list of available prizes is displayed regardless of whether the player can afford the prizes with his or her current prize credits. This allows the player to view the whole range of prizes and decide whether to redeem a prize at the present time or to save prize credits and, after playing additional games, redeeming a prize of greater worth with a greater number of prize credits. In another embodiment, only the prizes which the player can afford with his or her current prize credit balance are displayed by the game unit.

In other embodiments, a hierarchical prize menu system is implemented, in which categories of prizes are initially displayed and allow a player to select categories and sub-categories within the categories to narrow the choice of available prizes. For example, a player might select a "sporting goods" category to have a choice of sports prizes such as basketballs or other balls, athletic shoes, sporting goods equipment, and the like, and then select a sub-category of "baseball" to narrow the choices to baseball-related prizes. This is useful when a large number of prizes are offered by the redemption system.

In response to the selection of a prize by the player, the game processor 12 in a preferred embodiment commands the dispenser 22 to print out a specific prize ticket 62 that may be exchanged for the selected prize (and, preferably, no other prize). Thus, by allowing a player to select prizes using the game unit 50, no physical universal tickets 60 need be dispensed to the player. The only physical ticket needed by the player is the specific prize ticket 62 that can be exchanged for the actual prize. Alternatively, if the player does not want any of the displayed prizes, the player can opt to receive an amount of physical tickets from dispenser 22 or 20 equivalent to the prize credits won by the player. Or, the player might decide to use prize credits to "buy" additional games on a game unit 10, e.g., convert prize credits to game credits. Those bought game credits can then be stored in a "game credit account", if desired.

In addition, the operator can easily reconfigure the prize list 344 as required. For example, if a particular type of prize is out of stock, the operator can remove that prize from the list 344 so it is not offered to players. If a new type of prize is being offered, the operator can add prize items to the list 344. Adjustment of prizes is described in greater detail with respect to FIG. 9.

The prize list 344 offers advertisers a way to link available prizes to advertisements displayed on the game unit. For example, a particular brand of fast food might be advertised on display screen 54 between games and promoted by informing players that that brand of food is available as a prize for playing the game. When prize list 344 is displayed after a game, items of the advertised brand of food, such as "McDonald's Big Mac" or "Burger King Whopper," are presented as selectable prizes, thus enhancing the advertising effect on the player.

In some embodiments, the player can optionally select a "save tickets" option in the prize selection screen (or the prize credits are saved in the player's account automatically), which will store the amount of prize credits won on a local or a remote storage device as well as identification information to associate the winnings with that player (name, address, and the like). For example, the prize credit information can be stored in a special account for the player that is kept by the operator of the gaming environment, by a more centralized service, or by the player himself on a writeable medium such as a smart card or a printed ticket. When the player next plays a game apparatus that has access to the amount of prize credits previously won, the player can add any present winnings to previously stored winnings in the account and thus be able to exchange the combined amount of prize credits for a more valuable prize.

Figure 6C:
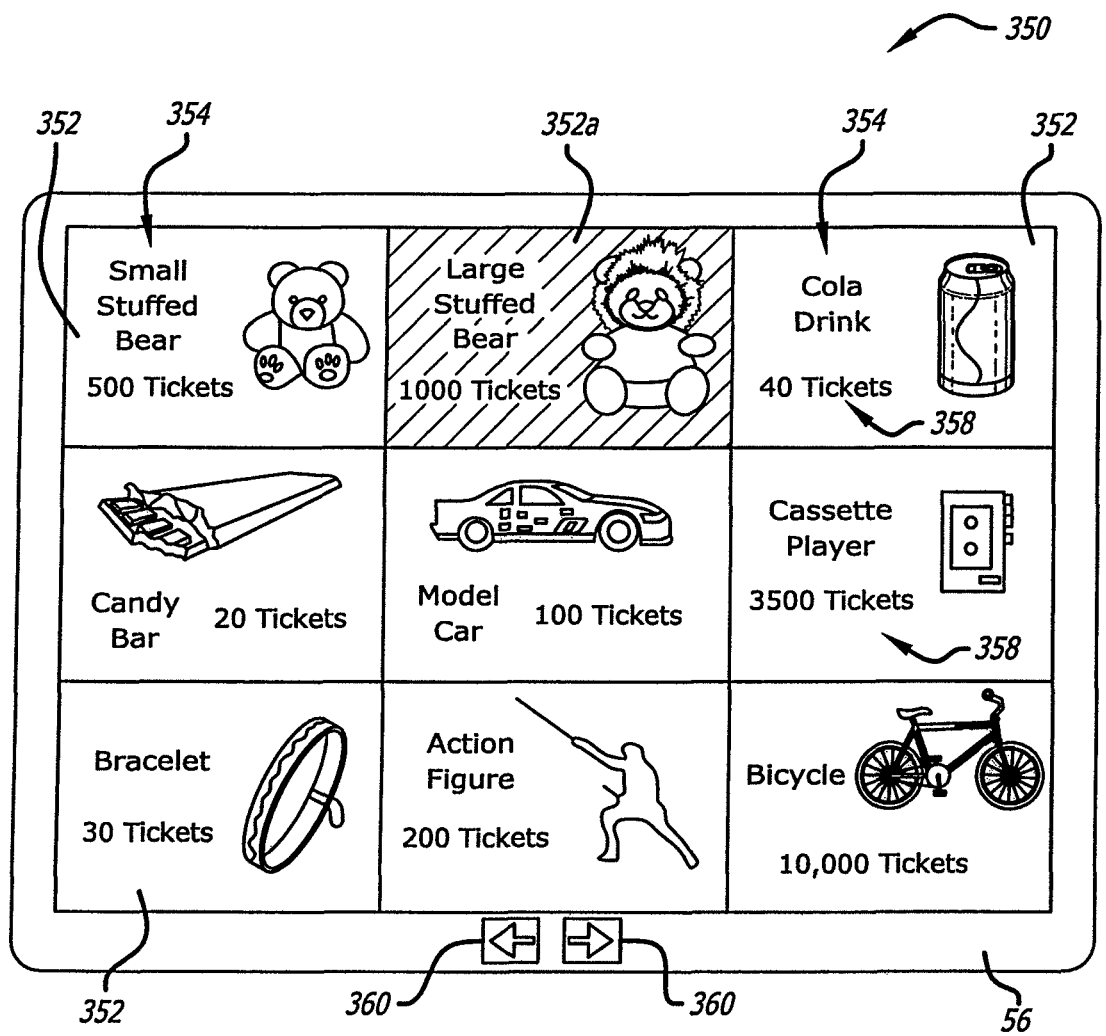
FIG. 6c is a diagram illustrating a graphical prize selection menu alternative to the menu shown in FIG. 6b.

FIG. 6c shows an example graphical prize selection menu 350 for an alternate embodiment that allows a player to select prizes from game unit 50, 10, or other embodiments disclosed herein. Menu 350 can be displayed on display screen 56 or a different output device of the game unit.

Menu 350 portrays various prizes that are available to be exchanged for prize credits. Each prize can be displayed in its own selection box 352. A description 354 of each prize can include the name of the prize and/or any other information related to the prize. Pictorial information 356 preferably portrays each prize accurately and realistically to the player. Prize costs 358 preferably indicate the required number of prize credits to be redeemed for the player to receive the prize. The player can preferably select a displayed prize by moving a cursor or indicator onto a box 352 or otherwise marking a specific box 352. For example, a currently-selected box 352a can be shown highlighted, in a different color, in inverse video, and the like. The player can press a button 60 or other controls to select the desired prize. Or, the player might select a control such as arrows 360 to display a different "page" of prizes on the display screen 56. The menu 350 can be displayed in a variety of formats and layouts in other embodiments.

In other embodiments of graphical prize menu 350, a 3-D environment can be simulated for the player to "explore." For example, a menu implemented in VRML over the Internet can allow a player to enter 3-D "rooms" and view 3-D visual representations of prizes, as they would realistically appear.

Figure 7:
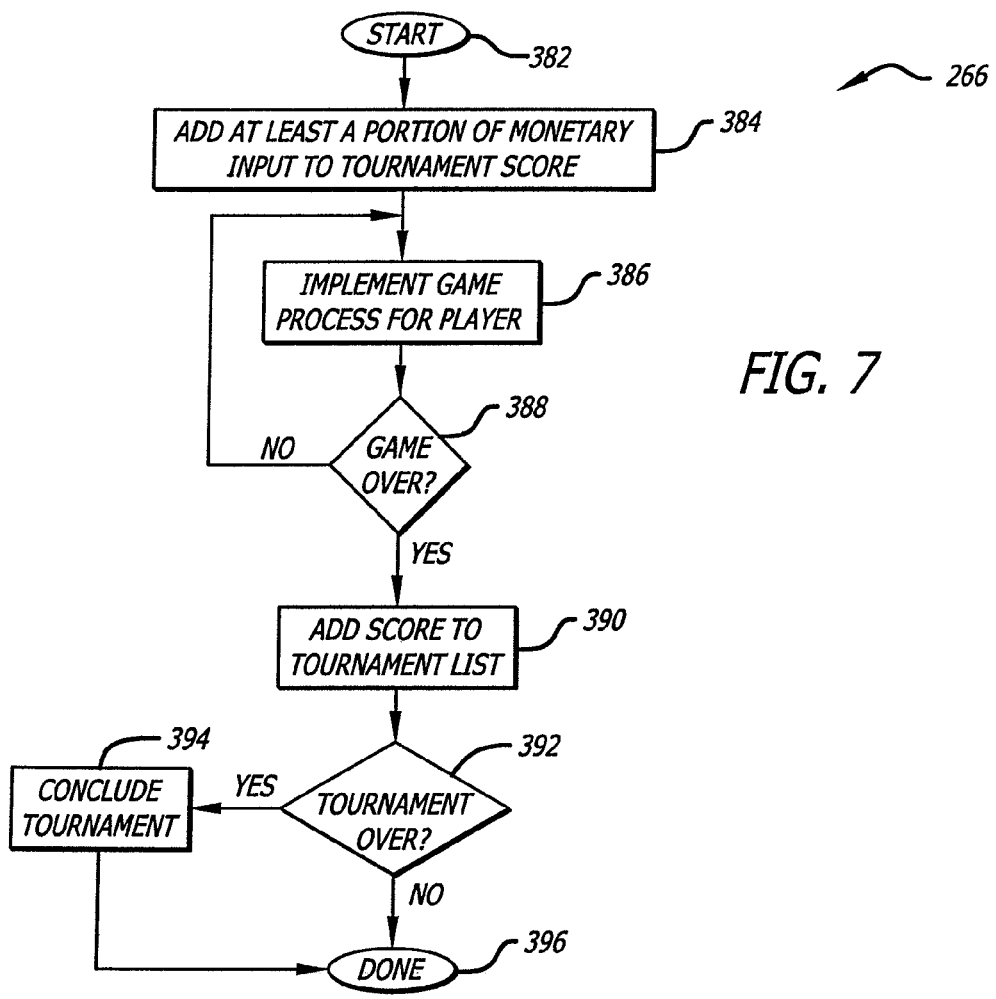
FIG. 7 is a flow diagram illustrating a method of implementing a tournament game of the process of FIG. 5.

FIG. 7 is a flow diagram illustrating step 266 of FIG. 5, in which a tournament game is implemented. Tournaments can be implemented using a single game unit 10 or using networked game units as described above. Players from gaming environments in several different locations can thus interact or compete simultaneously in offered games, or over a predetermined time period during which the tournament is open to players. Such large-scale, networked tournaments can be administered and provided by services completely independent of the local gaming environment operator. For example, an independent tournament organizing service can implement a tournament from a central server computer that is linked to the participating game apparatuses. The local operator might get a percentage of the proceeds from the tournament for allowing game units 10 at his location to participate. The various options concerning tournaments, as discussed below, can be adjusted by the operator or prize provider, preferably by using a tournament table as shown with respect to FIG. 9a.

The process begins at step 382. In step 384, at least a portion of the monetary input from the player is directed to a tournament prize. The tournament prize is contributed to by all of the players in the tournament. Thus, since it represents multiple contributions, the tournament prize can be worth much more than any specific prize a player might win from a single game, similarly to a progressive bonus score described above. For example, a game may cost $1 that the player inputs into the game. A portion of this monetary input, such as 50 cents, is applied as a fee to play the game, like a normal redemption or arcade game. The other portion, 50 cents in this example, is applied to the tournament prize. Thus, each time this particular game is played in the tournament by any player, 50 cents is contributed to the tournament prize. This type of apportioning of the cost of the game allows part of the earnings of the game to be provided to the owner of the arcade or other location where the games are made available to the public, and also lets part of the earnings be apportioned to a tournament prize provider, who can be a separate entity from the arcade owner or operator.

In yet other embodiments, the tournament prize value can be increased or determined using other or additional criteria besides monetary input. For example, the tournament score's value might be based on the number of players in the tournament, the duration of the tournament, a predetermined number, the number of goals achieved during the tournament, and the like.

The tournament prize can be an actual physical prize, such as a computer, stereo, and the like; or the tournament prize can be in a form of currency, such as prize credits, vouchers, or cash that are exchangeable for other prizes. For example, the tournament prize can be indicated in terms of monetary units, such as dollars and cents. In other embodiments, the tournament prize can be expressed as a number of points that have a correspondence to the amount of monetary value contributed to the tournament score by the game unit 10a or 10b. For example, every dollar of monetary value contributed by a game unit can be expressed as 10 points of a tournament prize. Or, a tournament prize can be expressed in terms prize credits used on the individual game units 10a and 10b, allowing a winning player to select prizes using a game unit's usual prize selecting mechanism, described above with reference to FIGS. 6a, 6b and 6c.

Since the tournament prize may be continually growing, its value must continually be updated so that players will know the most current prize value for which they are competing is displayed by the game unit. For tournaments implemented on one game unit, the only contributions in the tournament are received on that game unit, so the tournament prize is simply increased when a player on that game unit joins the tournament. On multi-game systems, the current tournament prize information is sent out to all the individual game units able to participate in the tournament. One or more servers can be used as described above, or game units can be interconnected and relay any updates to the tournament prize to each other.

In next step 386, a game process is implemented by the game unit, similar to step 322 of FIG. 6. In step 388, the process checks whether the game is over. If not, step 386 is implemented until the game is over. In next step 390, the results of the game and any other necessary information are added to a tournament list. The tournament list preferably includes all the players in the tournament by name or other identification and their associated game scores. In other embodiments, additional information can also be stored in the tournament list, which can be used to help determine a winner or to provide statistical information for the operator of the tournament. For example, the time the player took to play a game, the number of times a player has participated in similar previous tournaments, and the like.

If a server 108 is being implemented, then the tournament list is typically stored on the tournament server. The game unit thus sends the game score to the tournament server over a network link. If the tournament is being implemented on a single game unit, the tournament list can be stored locally on that game unit.

In some tournament embodiments, a player's identification need not be known. Each game score can be stored in the tournament list with an associated ID verifier that is assigned to the game score by the game unit or linked server. The ID verifier can be a number, a word, a symbol, and the like that is randomly generated or determined according to a predetermined pattern. Once the ID verifier is determined, it is displayed to the player so that the player can later claim their game score. For example, a ticket can be dispensed to the player with the ID verifier on it. Once the tournament is over, the ID verifiers of the tournament-winning scores can be advertised, and the winning players can claim the tournament prize by presenting their ticket or by otherwise providing their winning ID verifier to the prize provider.

In other tournament embodiments, the tournament list of scores may only include the top "n" game scores, where "n" is a predetermined number of winners. In such an embodiment, a game score is not stored on the tournament list unless it is greater than (or equal to) the lowest winning game score already on the tournament list. Thus, the player need not provide any identification if his or her game score is too low. If a player's game score currently qualifies to be on the tournament list, the player can provide identification. For example, the player might then enter his or her name, initials, and the like using an input device. Of course, later player's scores might cause previously-qualifying scores to be removed from the list when the previous scores are no longer high enough.

In step 392, the process checks whether the tournament is over. An individual game unit 10 can check for tournament conclusion by, for example, sending a request to a tournament server 108, which checks the tournament conditions and can send a response back to the individual game unit. Or, tournament conditions can be checked by a game unit implementing a tournament solely on that game unit.

There are several conditions, which can be set by the tournament operator to cause a tournament to conclude. A tournament can conclude based on time duration, number of players that have entered the tournament, amount or worth of the tournament prize, when a predetermined game score has been reached by one or more players; when a predetermined number of goals have been reached in participating games; when players/game units from predetermined locations have participated; when an event outside the tournament occurs (e.g., a football season ends, a world series concludes, and the like); when a predetermined number of minimum scores are achieved by participants in the tournament, or other conditions; or, a combination of two or more of these conditions can be applied.

For example, in a tournament server embodiment, a predetermined number, "n", of players can be allowed to participate in a tournament. When the last allowed player has finished a game, the tournament can be concluded. The tournament server 108 can store the number of tournament participants who have already completed their games and thus can easily determine when the "nth" player has participated. Other conditions can also be checked; for example, a tournament might conclude based on a condition of time duration of the tournament, where the expired time since the tournament began can be checked in step 392 (such a check can also be made periodically by the game unit regardless of player activity on the game unit). For example, a tournament might last one week, and then automatically end.

Figure 8:
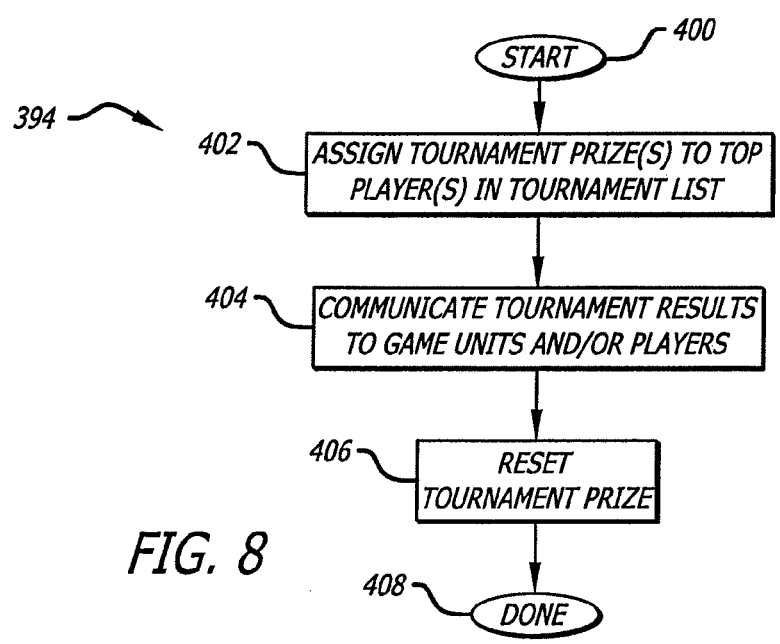
FIG. 8 is a flow diagram illustrating a method of concluding a tournament game of FIG. 7.

If the tournament is over in step 392, then the process performs step 394, where the tournament is concluded as detailed with respect to FIG. 8. The process is then complete at step 396. If the tournament is not over, then the process 380 is complete at step 396.

FIG. 8 is a flow diagram illustrating step 394 of FIG. 7, in which a tournament is concluded. The process begins at step 400, and in a step 402, the tournament score is assigned to the top player or players in the tournament list. Preferably, a predetermined number of the players with highest score in the list have "won" the tournament. For example, the top three players, as shown below in FIG. 8b, can be awarded portions of the tournament prize.

The tournament prize can be divided among the top tournament players in a variety of ways. In one embodiment, a predetermined proportion of the tournament prize is provided to the top players; for example, first place receives 60%, second place receives 30%, and third place receives 10% of the tournament prize. The operator or tournament organizer can preferably alter these percentages as desired, as shown in FIG. 9b below. Alternatively, the proportion can be determined by the difference between the top players' scores. For example, if the second place player's score is very close to the first place player's score, the tournament prize can be divided almost equally between these two players.

In step 404, the tournament results are communicated to individual game units that participated in the tournament. These tournament results can be viewed by players to see who has won the tournament. Game operators and/or tournament prize providers are also informed which players receive the tournament prize. Players may be required to return to the game unit 10 on which they played to see the tournament results and to determine if they have won the tournament. Alternatively, the player might check any game unit (or computing device) that was linked to the tournament information through network connections.

Winning players can actually receive their portion of the tournament prize in several ways discussed above. For example, the prizes can be sent to the winners, collecting the prize at the location where the game was played, receiving prize credits to select a prize using the prize menu, and the like. A player that wins a tournament can also receive a specific prize ticket that can be exchanged for a valuable prize, such as a bicycle or $200 worth of merchandise at a related retailer. The tournament prize offers another way for advertisers on game units 10 to provide brand-related prizes to players and to enhance the advertising effect on players. For example, a bicycle company might advertise their particular brand of bicycle as a tournament prize.

In step 406, the tournament prize or score is reset. The process is then complete at step 408.

In other embodiments, after a tournament is concluded, a player may be required to play additional games to determine a winner as, for example, in elimination-type tournaments where players compete in successive rounds and are eliminated from the tournament after losing a predetermined number of games.

Figure 8A:
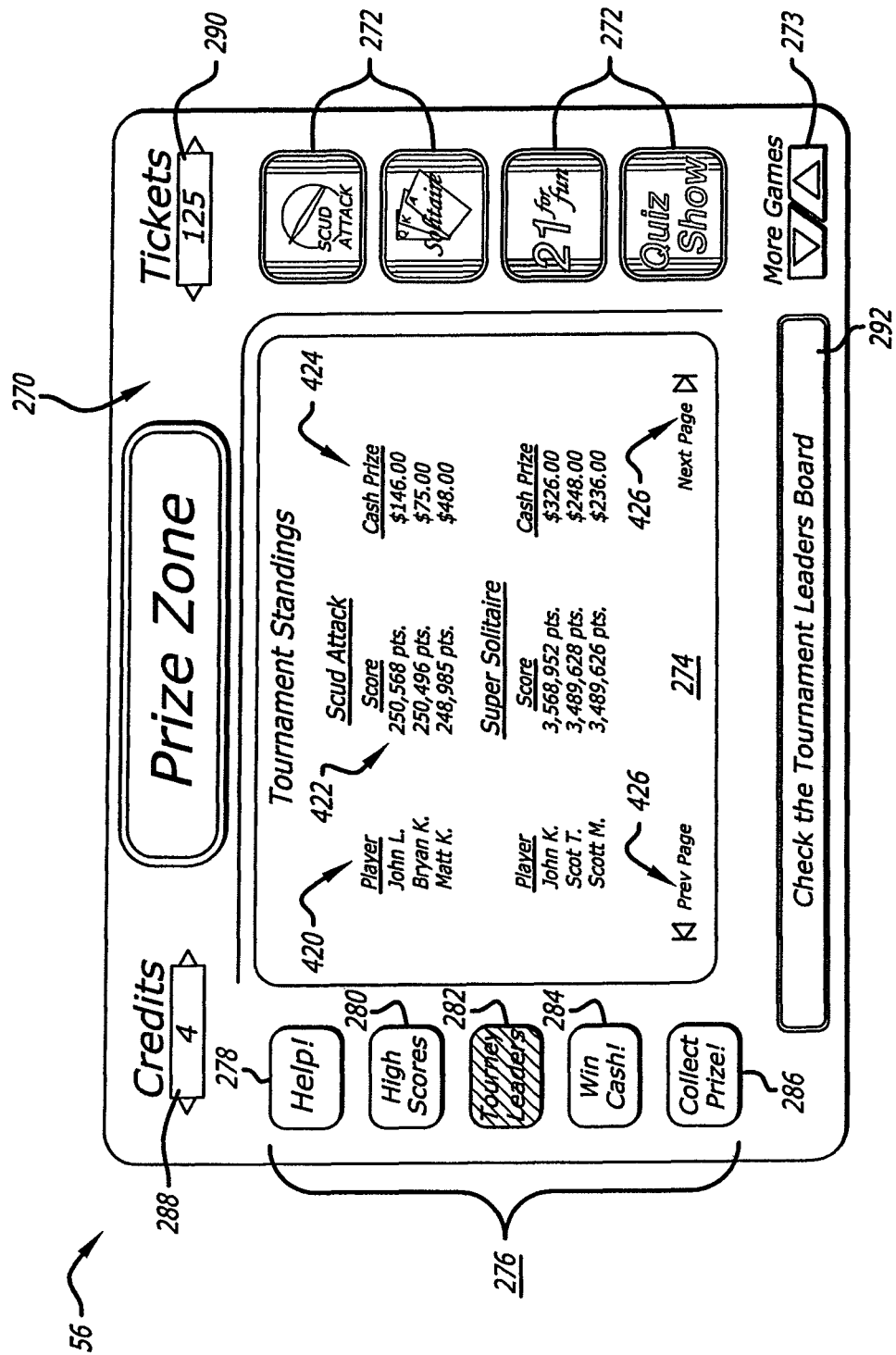
FIG. 8a is a diagram illustrating a tournament standings display screen, which is preferably displayed by the individual game unit after a selection of the tournament leaders button, or after a tournament is complete.

FIG. 8a is a tournament standings display screen, which is preferably displayed by the individual game unit after a selection of the tourney leaders' button 282 or after a tournament is complete. The tourney leaders' button 282 is shown highlighted in FIG. 8b to indicate that it has been selected. Main display window 274 displays a number of players, scores, and prizes for different games. For example, a tournament for the game "Scud Attack" is currently ongoing, and the window 274 lists the three players 420 who have so far achieved the highest scores in the tournament, the game scores 422 for each of the players, and the cash prize 424 that each player would win if the tournament were to conclude with the current standings. In alternate embodiments, winners of a tournament can win prize credits or other prizes instead of cash. When the tournament has concluded, the main window 274 preferably displays "TOURNAMENT ENDED" or similar information to indicate that a player cannot join the tournament. Similar tournament standings are displayed in window 274 for the game "Super Solitaire." Tournament standings for other games can be displayed by selecting the next and previous page indicators 426. Preferably, concluded tournaments that have ended within a previous predetermined time period (such as within the last week, month, and the like) are still available to be viewed by later players of the game unit 10 to give them an idea of what types of scores are typically achieved by players in a tournament game and the amounts or types of prizes won by players.

Figure 9:
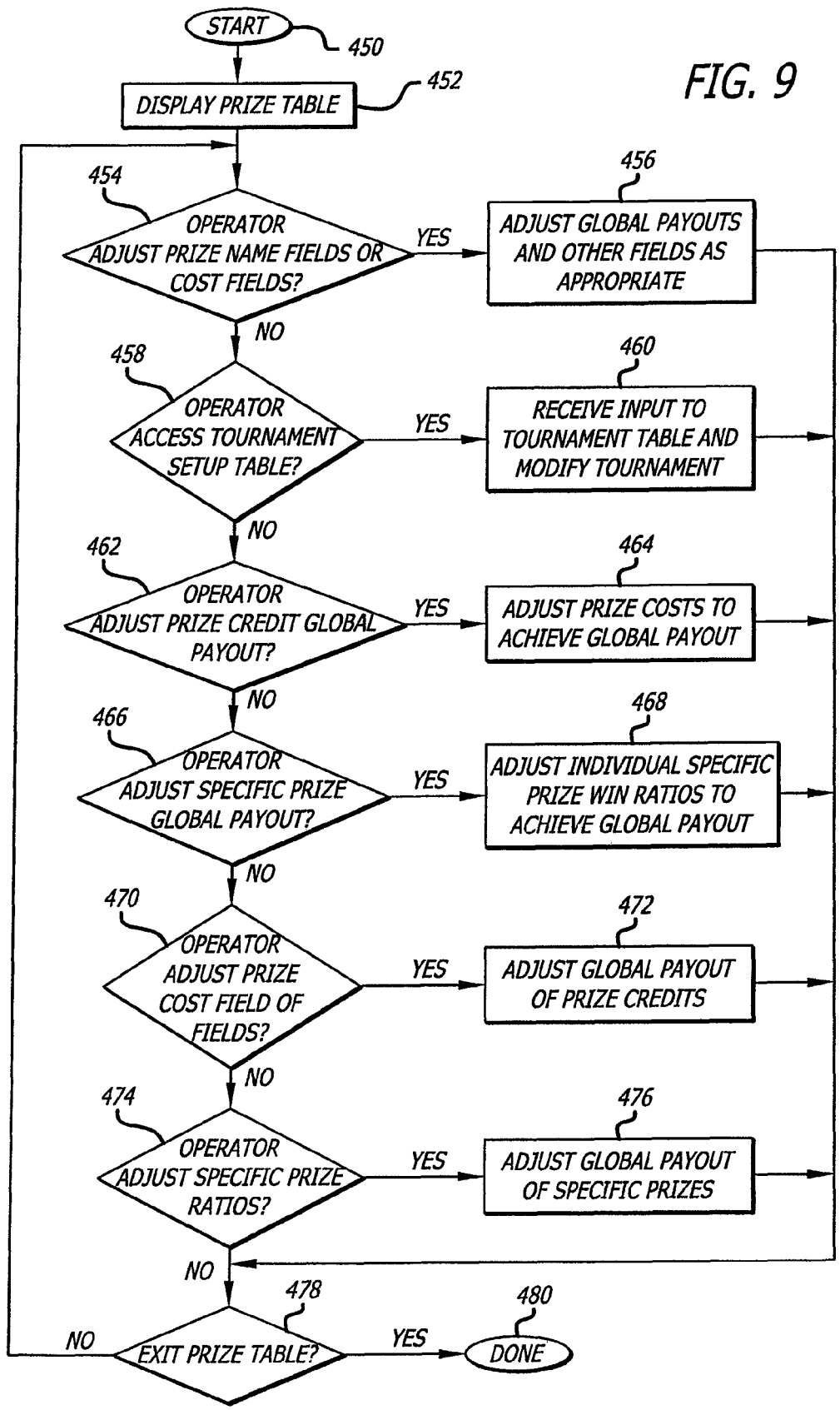
FIG. 9 is a flow diagram illustrating a process for adjusting prize characteristics of the redemption system.

FIG. 9 is a flow diagram illustrating a process 440 for allowing the operator of the game redemption system to adjust prize characteristics of the system. This process can be implemented on a game unit 10 utilizing the game processor 12 and other components; or, this process can be implemented on consoles, computers, or other terminals separate from the game unit. The separate unit can then provide the prize table and other information to individual game units 10 over a network or other communication link; or, the operator can manually transport the prize information over a medium, such as a magnetic disk or other storage medium. The process begins at step 450, and in a step 452, a prize table is displayed for the operator.

Figure 9A:
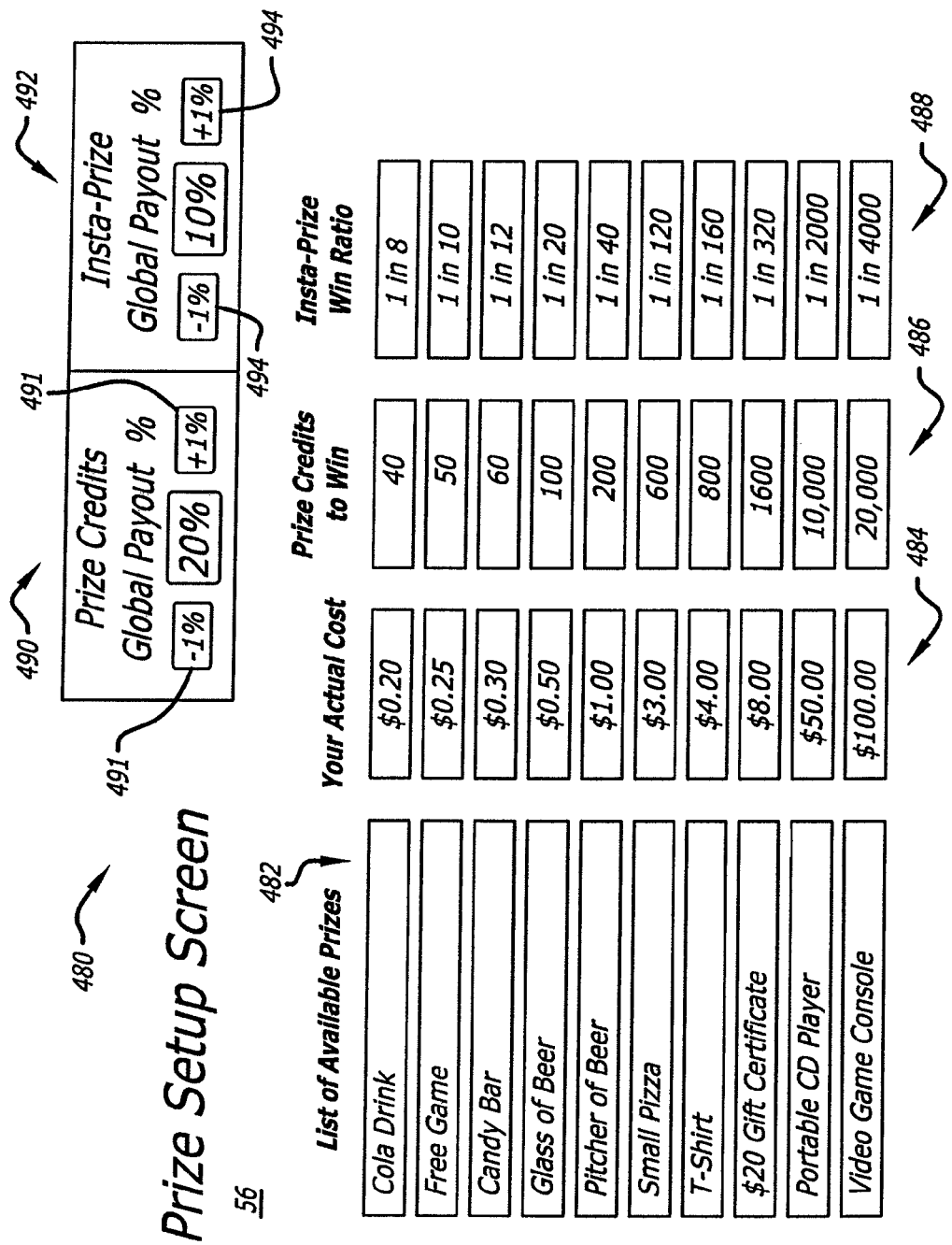
FIG. 9a is a diagram of a prize table suitable for use with the process of FIG. 9.

FIG. 9a is a diagram of an example of a prize table 480 for use with the disclosed embodiments that is displayed to the operator in step 452. The prize table 480 is preferably displayed by a display screen, such as screen 56 of game unit 10 or 50, so that the operator can adjust prize characteristics for that game unit and any linked game units, if desired. Alternatively, the prize table can be displayed on a separate operator terminal, computer, server, or game unit that may be linked to game units 10. In such a system, the operator would modify the prize characteristics as desired and send any updated characteristics to all linked (or all desired linked) game units over a network or other communication device.

Prize table 480 of the described embodiment includes a list of available prizes 482; an actual cost 484 of each prize in list 482; the prize value 486 for each prize in list 482 in terms of prize credits or tickets; the specific prize win percentage 488 for each prize in list 482, the prize credit global payout percentage 490; and the specific prize win percentage 492.

Prize list 482 includes a text name of each prize the operator wishes to include in the redemption system. Preferably, the operator can simply select a field of the table and enter a new prize name, change an existing prize name, or delete existing prize names. The operator can input this information using such input devices as a keyboard, a pointer mechanism, a stylus, a tablet, and the like. Preferably, the operator lists prizes from the least worth to the most worth; or, the system can automatically sort the prizes in a preferred order. In alternate prize table embodiments, the operator can enter an additional text description for a prize, such as physical dimensions, systems or standards with which the prize is used, the color, or other characteristics. In still other embodiments, the operator enters a graphical description of a prize, such as a bitmap or other pictorial data format. For example, the operator can upload a graphical file to the redemption system from a personal computer. This would be more suitable for a redemption system having a graphical prize selection screen for players, as shown in FIG. 6b. In some embodiments, the operator can provide descriptions of particular brands of prizes in prize list 482 in exchange for advertiser money. The operator might also input specific advertisements to be displayed on game unit 10 and associate those ads to items in the prize list 482. In such an embodiment, for example, the game unit 10 can examine each prize item in prize list 482 and check if each prize item has an associated advertisement. If so, the advertisement can be displayed between or during games, along with the prize credit cost of the associated prize, if desired.

Actual cost field 484 lists the cost of the associated prize which the operator or prize supplier has purchased and/or which the operators sells. For example, a pizza may be sold to players for $15.00 in a particular gaming environment, but the actual cost to the operator for making the pizza may be $3.00, which is the price the operator would input to the table.

Similarly, the operator or prize supplier may be able to purchase prizes in bulk for a significant discount, and that discounted price would be provided in the fields 484.

Prize cost field 486 lists the amount of prize credits that a player must pay to receive or purchase the prize associated with the prize cost. These costs are displayed directly on the prize selection screen as described above. For example, to win a small pizza, a player must have at least 600 tickets or prize credits in his or her account, and to win a video game console, 20,000 tickets are required. Thus, more expensive prizes can be won less often since they require greater amounts of prize credits to purchase. Expensive prizes such as a video game, bicycle, and the like, typically cannot be bought from prize credits won at one game session (unless, e.g., a progressive bonus score is received or they are won as specific prizes), so players will have to save up prize credits for these prizes as discussed above. In the preferred embodiment, the prize costs listed in fields 486 are determined by the redemption system based on other information that the operator has input, such as actual cost and global payout. This is described in greater detail subsequently. In addition, the operator may enter a particular prize cost he or she wants to be associated with a prize, and other appropriate fields in prize table 480 are automatically adjusted by the redemption system, as discussed below.

Specific prize win ratio fields 488 list the individual prize ratios of winning the associated prizes as a specific prize or an "instant prize" during a game implemented by the game unit 10. In one embodiment, each ratio indicates that the particular specific prize will be won every "nth" game played on the game unit in which a specific prize goal was met, where "n" is the number listed in the fields 488. For example, if a specific prize goal must be met to win a specific prize, then the specific prize is awarded every "n" games in which the specific prize goal was met. The specific prize goal may be met by skill of the player during a game (e.g., hitting a specific target or getting a certain score), by random chance (e.g., a 10% chance each time a game is played to win), or by a mixture of skill and chance.

Higher-valued prizes are won less often than lower valued prizes. For example, a small pizza will be won every 120 games played, while a video game console will be won every 4000 games. Since only one of the specific prizes should be awarded each time a specific prize goal is met, the system preferably examines each prize in turn, starting with the most valuable prize in the specific prize list 482. For example, whenever a game is played on game unit 10, a game counter is incremented. When a player wins a specific prize after a specific prize goal is achieved in a game, the video console prize is first checked, i.e., the system checks whether the current game is the 4000th game (where the goal was met) since the video game console was last awarded to a player on this game unit 10 (or the 4,000th game since console was awarded within the entire redemption system, i.e., among multiple game units 10). If so, the console is awarded. If not, the next most valuable prize in the table (e.g., the T-Shirt) is similarly checked. This continues until a prize in the table is selected. If none of the prizes are selected, then no prize can be awarded, or a default prize can be awarded as the specific prize; for example, in the described embodiment, 10 prize credits (equivalent to the average number of prize credits given out in a game) are awarded as a default prize. Alternatively, the ratios can indicate that a particular specific prize will be won every "nth" game played, regardless of whether a specific prize goal was met in the games played.

Alternatively, the selection of a specific prize from the table 480 can be based on random and/or statistical determination. For example, the individual ratios 488 may indicate the chance of winning the particular listed prize when a specific prize goal is met (the goal can be met by skill, chance, and the like). The game unit can start with the most valuable prize in the list as above and determine if that prize is to be awarded by generating a random number; for example, if a random number between 1 and 4000 is "1", then the video game console has been won and no further prizes need be checked. If that prize has not been won, the next most valuable prize on the list is randomly checked, and so on until no prizes are left in the table to check, at which point a default prize can be awarded, or no prize at all. Specific prize selection from a table of prizes is also described in co-pending parent application Ser. No. 08/628,490. In one embodiment, the random determination of whether a particular prize is to be awarded is also modified by statistical information to create a "best fit" of prizes awarded according to the operator's desired odds; this is done to offset the sometimes undesirable results that purely random (or pseudo-random) determination provides. For example, every 8,000 games, two video consoles are to be awarded. If it is randomly determined that a third video console is to be awarded within, e.g., the 3,000th game, then a different prize can be awarded so that the desired odds are better met. For example, the next most valuable prize in the list can be awarded instead of the video console, as long as awarding the next prize would fit the desired odds for that prize.

Similar to the prize cost fields 486, the specific prize ratios 488 are automatically determined by the redemption system based on other operator input such as actual cost 484 and the specific prize global win ratio 492, as discussed below. Also, the operator can enter a desired win ratio 488 for a particular prize, and other appropriate fields in the prize table 480 are automatically adjusted to take into account the entered ratio. These processes are discussed in greater detail below.

The prize credit global payout percentage 490 is a separate field of prize table 480 that allows an operator to view and to change a global payout percentage based on all of the prizes in the prize list 482, their actual cost 484, and their purchase cost 486. The term "payout", as used herein, is intended to refer to any transfer of monetary value given back to the player of the game apparatus or game system. Most commonly for redemption systems, payout is in the form of prizes, but it may also be cash, unredeemed tickets, prize credits, and the like. The overall payout from a game during a time period should be subtracted from the total revenue of the game during that time period to determine how much (net) profit the game made. Net profit can be further determined by subtracting any other costs accrued in providing the game from the gross profit, such as rental or purchase fees of the game unit, maintenance/repair costs of the game unit, and other costs.

The prize payout percentage 490 indicates the payout of the game unit 10 as a percentage of an operator's revenue from the game that the operator will pay back, on average, to players in the form of prize credits or prizes purchased using prize credits. For example, the 20% listed in FIG. 9a indicates that 20% of all base revenue from all of the games played on a particular game unit 10 will be paid back in the form of prize credits and prizes selected from prize credit winnings. In linked game embodiments, the percentage 490 can indicate that 20% of the revenue of all the games played on all of the linked game units will be in the form of payout. In the preferred embodiment, this percentage number in field 490 is entered by the operator, and the redemption system will automatically adjust the prize cost 486 to achieve that value. The operator can also select the buttons 491 to adjust the value by 1% increments. Alternatively, the operator can adjust the prize purchase cost as described above, and the global payout percentage 490 will be appropriately adjusted by the redemption system. This is discussed in greater detail below.

The specific prize global payout percentage 492 is a separate field of prize table 480, similar to field 490. Specific prize global field 492 allows an operator to view and to change a global payout percentage that is based on all of the prizes and prize ratios in fields 488. The payout percentage 492 indicates the percentage of an operator's revenue from the games that the operator will pay back, on average, to players in the form of specific prizes based on the ratios in fields 488. In the preferred embodiment, this percentage number in field 492 is entered by the operator, and the redemption system will automatically adjust the ratios 488 to achieve the percentage value. The operator can also select the buttons 494 to adjust the value by 1% increments. Alternatively, the operator can adjust the ratios as described above, and the global specific prize payout percentage 492 will be appropriately adjusted by the redemption system. This is discussed in greater detail below.

In the preferred embodiment, the operator is intended to enter desired payout percentages in fields 490 and 492. When these two percentages are added together, the resulting percentage shows what total percentage of revenue that the operator will be paying back to the players in total prize credits and prizes. The operator can thus enter desired payout percentages to fit within his or her operating expenses and desired profitability of the game units 10. Since the redemption system will automatically adjust prize costs and specific prize win ratios, the operator need not be concerned with calculating his or her own prize costs, as in previous redemption systems.

Referring back to FIG. 9, after the prize table has been displayed in step 452, the process continues to step 454, where the process checks whether the operator has adjusted the prize name list 482 or actual cost fields 484. If so, then in step 456, the global payout percentages 490 and 492 and the fields 486 and 488 are adjusted according to the relationships described below based on any new actual cost values entered by the operator, and the process continues to step 478, where the process checks if the operator desired to exit the prize table. If not, the process returns to step 454. If so, the process is complete at step 476.

If no adjustments are made in step 454, the process continues to step 458, where it is checked whether the operator wishes to access the tournament setup table (the tournament setup table can also be accessed directly, without accessing prize table 480). If so, the process receives input to any of the fields in the table in step 460 and modifies the tournament characteristics accordingly. This table is described with reference to FIG. 9b. The process then continues to step 478.

If no tournament table is accessed, the process continues to step 462, in which the process checks if the operator has adjusted the prize global payout in field 490. The operator can use a pointing device to point to the field and then use a keyboard, or select buttons 491. If such an adjustment is made, the process continues to step 464, in which the prize cost 486 is adjusted, if necessary, to achieve the global payout entered by the operator.

The prize cost 486 is adjusted as follows. A prize cost is calculated separately for each prize listed in list 482. A prize actual cost, A, which is provided by the operator, is divided by the global payout percentage entered by the operator, P, where $$R = A/P \quad (1)$$

The resulting value, R, represents the amount of revenue required to achieve the desired payout percentage. For example, a candy bar costs the operator $0.30. To achieve a 20% payout on each candy bar, the operator must take in 0.30/0.20=$1.50 on the game unit for each candy bar prize thus awarded.

Once the required revenue, R, is determined for a particular prize, then the average number of prize credits or tickets, T, that are known to be awarded per game is determined (average ticket payout). It is possible for the game's manufacturer to adjust game difficulty so that, on average, a predetermined number of prize credits will be awarded for each game played. For example, games often have a payout about 8-12 tickets game, averaging about 10 per game. The difficulty and thus the average prize credits awarded per game can be adjusted using a variety of techniques that depend on the type of game being played. For example, in an action game the speed of controlled objects, response of input devices, and the like, can be adjusted so that most players don't receive a score higher than a particular value. In card games, the frequencies of winning combinations of cards can be adjusted. In quiz games, the difficulty of the questions at various times during the game can be adjusted so that average players will typically win a certain number of prize credits per game. Durations of games, which have a fixed duration, can also be adjusted to achieve an average payout level of prize credits.

After the game unit 10 has been in use for some time, the average number of prize credits awarded per game, T, need not be estimated, but can be exactly determined and continually readjusted by monitoring each game played on the unit 10, recording the number of prize credits awarded for each game, and then averaging all the played games to obtain a precise prize credit payout average. Previous game data can be stored in a storage device local to the game unit 10 or on a separate medium or a remote apparatus such as server 108. Thus, if it were found that the average game on a game unit 10 were actually paying out 12 prize credits instead of the initially estimated 10 prize credits, the prize costs could be adjusted accordingly with the present calculation method. This provides the operator with current, accurate information about how much prizes should cost in prize credits in order for the game unit to achieve a desired profitability. By having the redemption system incorporated into game unit 10, this type of precise data gathering on actual ticket payout percentages is possible, thus allowing prize costs to be accurately adjusted.

Preferably, one average ticket payout level, "T", is calculated for all games offered by game unit 10. Alternatively, each game offered by game unit 10 can have its own "T" value tracked by the redemption system. For example, an action game might only award an average of 8 prize credits per game, but a quiz game might award an average of 14 prize credits per game. A separate "T" value can be tracked, and the prize costs can be adjusted in view of the particular game that was played by the player, e.g., if a game awarding a large average number of prize credits were played, the prize costs might be slightly higher for prizes than for games having a low-average number of prize credits awarded.

Once the average number of prize credits "T" awarded per game is known, this value can be converted to a value "V" using the cost per game "C", where $$V = T/C \quad (2)$$

For example, if the average number of prize credits awarded per game is T=10, and each game costs the player $0.25 (C=0.25), then 10/0.25=40 prize credits are awarded for each dollar inserted by the player into the game unit. "V"

can be multiplied by the required revenue, "R", to achieve the prize cost (PC) 486, such that $$PC = R*V \quad (3)$$

In the example above, a required revenue, "R", was determined to be $1.50. Thus, the desired prize cost, PC, required to achieve the desired revenue, "R", is $1.50*40=60=PC. Thus, a player must pay 60 prize credits from his or her credit account in order to receive a candy bar prize. Other prize cost results for other prizes using these example numbers and known actual costs are shown in FIG. 9a.

Combining the above relationships (1), (2) and (3) yields a succinct equation:

$$PC = (A*T)/(C*P) \quad (4)$$

Once the prize costs 486 have been adjusted in step 464, the process continues to step 478.

In step 466, the process checks whether the operator has adjusted the specific prize global payout percentage 492. If not, the process continues to step 462. If so, step 468 is implemented. In step 468, the individual, specific, prize win ratios 488 are adjusted to achieve the desired global percentage 492 input by the operator.

The individual ratios 488 are adjusted as follows. A formula can be used to determine the individual ratios, as shown:

$$B = M*A \quad (5)$$

where the B is the number that follows the "1 in" in the individual ratios 488 (e.g., "1 in 18", B=18), "M" is a multiplier, and "A" is the actual cost of the particular prize as shown in fields 484. The multiplier, "M", can be determined by another relationship:

$$M = (N*H)/(P*C) \quad (6)$$

where "N" is the number of specific prizes in the list 482, "P" is the global payout percentage entered in field 492, "C" is the cost per game on the game unit, and "H" is the hit ratio for specific prize goals on the game unit. The "hit ratio" is the fraction of games played, on average, in which a specific prize goal is met and thus a specific prize is won. The hit ratio can be an average chance that an independent skilled task will be completed by the player and a specific prize won; alternatively, if no skilled task need be completed to win a specific prize, then the hit ratio can be the random or statistical chance that a specific prize is awarded during a game. Initially, the hit ratio is determined by the game developer, since the game developer can adjust the difficulty of the specific prize goal so that a "hit" occurs after a predetermined average number of games, similar to adjusting average awarded prize credits.

An estimated hit ratio as determined, for example, by the game developer is initially used in the above calculation of equation (6). In embodiments having skilled specific prize goals, once the game unit 10 has been played one or more times by actual players (e.g., after 100 times), the system can automatically adjust the hit ratio to the actual win frequency determined from the players' use of the game unit 10 by, for example, storing the number of games played and the number of times the specific prize goal was hit. This is similar to the determination of average awarded prize credits "T" in step 456 above. For example, if it is determined that the specific prize goal was hit 11 times over 100 games, then the hit ratio is more accurately provided as 11% rather than the 10% initially estimated. This actual hit ratio would then be used in the calculation of equation (6).

As an example, the operator enters a specific prize global payout percentage, "P", of 10%. The number of specific prizes "N" in table 480 is 10, the cost per game is $0.25, and the hit ratio is 10%. The multiplier, "M", of equation (6) is thus determined as (10*0.1)/(0.1*0.25)=40. Thus, for a small pizza having an actual cost of $3.00, B=40*3.00=120. Thus, the individual ratio 488 for the small pizza would be 1 in 120. A ratio for a larger prize such as the video game console (A $100) would be 1 in (40*100)=1 in 4000.

In the preferred embodiment, each offered game is normalized to the desired specific prize ratios based on the frequency of players achieving the specific prize goal. The redemption system may perform the normalization by applying separate hit ratios for each game offered on game unit 10. For example, some games may have much different hit ratios than other games depending on the nature of the game action, randomness, and the like, and the difficulty of the specific prize goal. The hit ratio for a specific prize should thus reflect the difficulty in achieving a specific prize goal for a particular game. In a game unit system, all the types of games offered by all linked game units in the system can have a unique hit ratio used for determining an individual ratio 488.

A "base" hit ratio can be determined for one of the games offered on game unit 10. The ratios stored in fields 488 of the prize table 480 can be determined based on this base hit ratio. In addition, in the described embodiment, a "normalization factor" can be stored and used for each game offered by the game unit 10 (or for each game within the redemption system or offered all linked game units). The normalization factor indicates how much an individual ratio 488 should be adjusted based on the particular game played. For example, see Table 1.

TABLE 1

| GAME | NORMALIZATION FACTOR |
| --- | --- |
| Scud Attack | 1 |
| Solitaire | 2 |
| Quiz | 0.5 |
| Fun 21 | 0.33 |

When a specific prize goal is met by a player and the system determines the specific prize (e.g., step 338 of FIG. 6), the game unit 10 (or server) multiplies the ratios 488 in the prize table by the normalization factor for the game played. Thus, if the played game has a hit ratio equal to one-half the base hit ratio (i.e., normalization factor=0.5), such as the "Quiz" game in Table 1, then the ratios 488 are multiplied by 0.5 before the specific prize is determined. However, when a game having a hit ratio equal to the base hit ratio is played, the ratios 488 need not be adjusted.

Base hit ratio and normalization factors can be estimated initially. After a number of games have been played on a game unit 10, the normalization factor for each game can be based on the actual hit ratio determined for each game. The redemption system separately keeps track of actual hit ratios for each game offered on game unit 10 by recording the number of games (for each type of game) and the amount of the specific prize goals met.

In some embodiments, specific prize ratios 488 are only displayed to an operator in prize table 480. In other embodiments, the ratios 488 can be shown to players so that they can determine the odds of winning available prizes. After determining individual ratios 488, the process continues to step 478.

In step 470, the process checks if the operator has adjusted the prize cost field 486 of any of the listed prizes. Operators having more advanced knowledge of offered prizes, and desired prize costs are thus able to affect the profitability of the game apparatus to a fine degree. An operator may want to reduce an individual prize cost to cause that prize to be selected more often by players, thus serving to promote/advertise a prize or brand name, or reduce excess inventory of that prize. Similarly, an operator may want to increase a prize cost to cause that prize to be selected less frequently by players than other prizes. If no adjustment to prize costs is made, the process continues to step 474. If an adjustment is made, then in step 472, the global payout 490 of the prizes is adjusted in accordance with the operator-changed prize costs. In performing this step, the same mathematical relationships can be used as described above for step 464, except that the global payout percentage "P" is solved. For purposes of this step, each prize in the table can be considered to have its own payout percentage. Thus, payout percentage "P" is calculated for those prizes that the operator changed the prize cost, and the unchanged prizes are assumed to have the old payout percentage. An average global payout percentage can then be obtained by adding all the individual payout percentages and dividing by the number of prizes. This average payout percentage would then be displayed in field 490 of the prize table. The process then continues to step 478.

For example, in table 480 of FIG. 9a, the operator changes the Video Game Consol prize to cost 10,000 prize credits instead of 20,000. An individual payout percentage for the video game console is calculated, using the relationships of step 464, to be P=40%. The unchanged prizes each have a payout P=20%, so that the averaged payout percentage would be (9*20%+40%)/10=22%, which would be displayed in field 490 as the global payout percentage. This averaged payout percentage determined after an operator has changed prize costs is not as accurate as the prize cost-payout percentage relation obtained in step 464, especially if players choose the prize having the changed cost more or less often than other prizes. However, the averaged percentage provides the operator with an estimate of payout that is accurate enough for most purposes.

In step 474, the process checks if the operator has adjusted the individual specific prize ratios 488. Similarly to the prize costs of step 472, the operator may change individual specific prize win ratios to exert a greater degree of control over a game's or a prize's payout and profitability. If such a change is made, then in step 476, the process adjusts the specific prize global payout percentage 492 accordingly.

In the described embodiment, the specific prize global payout is adjusted as follows. The relationships of step 468 can be arranged to solve for an individual payout, "P" when the ratio "B" is changed for a particular prize. When "P" is solved in such a fashion, the number of prizes N is equal to 1 in Equation (6) since an "individual" payout is being calculated only for the changed prize. Once the individual payout, "P", is known for the changed prize, it is summed with the individual payouts for the other prizes in table 480 to achieve the global win payout percentage 492. For example, using the table 480 of FIG. 9a, if the operator changes the individual win ratio of the T-Shirt from 1 in 160 to 1 in 100, then the individual payout P for the T-Shirt would be (N*H*A)/(B*C)= (1*0.1*4.00)/(100*0.25)=0.016 has an individual payout of P=1% (which can be determined by dividing the global percentage 492 by the number of prizes "N," or by using the relationships of step 468). Thus, the new specific prize global payout percentage is equal to 9*1%+1.6%=10.6%, which is displayed in field 492. The process then continues to step 478.

If no operator adjustment is made to the ratios 488, or after step 476, the process continues to step 478, where it is checked if the prize table is exited. If not, the process returns to step 454, and if so, the process is complete at step 480.

It should be noted that, in the foregoing explanation, the process has been described as if the checking steps 454, 458, 462, 466, 470, 474, and 478 are serially executed. However, as will be appreciated by those skilled in the art, in practice such a serial checking method is not specifically required. Rather, in practice, the various described checking steps can be simultaneously checking for the described conditions, and functions (e.g., steps 456, 460, 464, 468, 472, and 476) can be call routines, which are executed when called.

In the described embodiment, the prizes in list 482 are eligible to be awarded both as credit prizes and as specific prizes during or after a game played on the game unit 10. In the preferred embodiment, the operator may also choose particular prizes to be unavailable as credit prize and/or to be unavailable as a specific prize. In the described embodiment, the operator inputs a flag, such as "0", "NA", or other symbol, in the fields associated with those prizes, which the operator wishes to make unavailable. For example, if the operator does not wish to allow players to buy a T-Shirt prize with prize credits on the prize selection screen of FIG. 6b, the operator can put an "NA" (Not Available) symbol or characters in the field 486 corresponding to the T-Shirt. Similarly, if the operator does not wish the T-shirt to be available as a specific prize during any game, then the operator enters "NA" in the field 488 corresponding to that prize. Alternatively, separate lists 482 of prizes can be provided for credit prizes and for specific prizes.

In an alternative embodiment, prize table 480 can receive input from servers or other computers, operators, or prize distributors (such as a "national prize center") at remote sites or nodes over a network or other communication device instead of a single operator. This received information can include the prize list 482, actual cost 484, and/or any other information in prize table 480. For example, the list of prizes 482 can be sent periodically as a "prize catalog" from a prize distributor or supplier, which offers an up-to-date listing of all available prizes and thus reflects the current prize inventory of the prize distributor. After receiving the list of prizes, the operator could then enter the desired global payout percentages 490 and 492; or this payout information can be received from a central location as well, such as a franchise headquarters. Information in prize table 480 can be stored locally, or by the central location and be downloaded when needed. After the player selects a prize from the prize selection menu, the selection information can be sent to the prize distributor over the network, and the player can be mailed his or her selected prize from the prize supplier. This may be more convenient for operators, especially when large prizes, such as bicycles, are won by players. If the prize is mailed, the prize supplier would typically require an address of the player where the selected prize can be sent to. The player can manually enter the requested address information in game unit 10 using an input device, or the address information might automatically be entered when the player provides monetary input to game apparatus 50 through the use of a credit or a debit card or a similar electronic identification. Alternatively, the prize can be mailed to the gaming environment, where the player can pick up the prize from the operator.

Such a system of receiving the list of prizes and other information from a remote source also is suitable for redemption systems having multiple linked games, such as the embodiments of FIGS. 3 and 4. The same prize list can be provided to all games in the redemption system from a central prize database stored on a server or other storage device, thus providing uniformity of the types of prizes offered to games in a gaming environment or over a larger region.

In alternate embodiments, each type of game offered on game unit 10 can be associated with its own distinct prize table 480, having its own desired level of payout and profitability, its own list of available prizes, and the like.

The ability of the operator to change the prizes available to be won on a game apparatus provides the operator with a great deal of flexibility in offering and coordinating a redemption system, which can be tailored to a specific type of location. For example, an operator can provide a different set of available prizes for each different type of offered game or game apparatus in one location or at different locations. Thus, a player of a card type game oriented for adults might be able to select from prizes including a deck of cards, cash, an alcoholic drink, or other related prizes, while a player of a game oriented for children might be able to select from prizes including toys, candy, or stuffed animals. Furthermore, the operator can designate particular game apparatuses in a gaming environment as "special" games that offer a specialized prize list having prizes of greater value, more selection, and the like, that are different from other prizes available from other games at the gaming environment. This type of wide-ranging and differing prize availability on different games and game units in a single game environment would be far too time-consuming and complex to implement using traditional redemption systems.

FIG. 9b is a diagram showing a tournament setup table 490 for entering tournament characteristics by the operator, prize distributor, or other source. Table 490 includes a column 492 of the available games on the game unit 10 or in the redemption system. For each of these games, there are several characteristics of listed fields in table 490 which are receptive to operator input and adjustment. Tournament On/Off field 494 allows the operator to provide a tournament option for designated games, and to turn "off" the tournament for specified games when desired. Some games may not ever be suitable or desired for tournament play, and can have a "not available" selection. Games required field 496 indicates the number of non-tournament game credits, which the player is required to insert before being eligible for a tournament for that game. For example, after three game credits are inserted, the player has the option to participate in a "Scud Attack" tournament (if offered). The operator can provide a zero value in field 496, if desired to allow players to participate in tournaments at will. Cost per game field 498 indicates the number of coins (or cents, dollars, game credits, and the like) that each game normally costs to play.

Percentage field 500 indicates the percentage of income from the player to the game unit 10 will be used as a contribution to the tournament prize. In effect, this is a "payout" percentage similar to the percentages 490 and 492 of prize table 480 showing how much of the revenue of a tournament is paid back to players, and thus allows and operator to designate a desired level of payout and profitability of the tournaments. (The seed money in field 502 should also be added to the payout value to determine total payout.) In the described embodiment, this percentage is the amount of cash that is contributed to the tournament prize, where the tournament prize is cash. In other embodiments, the tournament prize can be prize credits, specific prizes, or other prizes having a value, where the value of the tournament prize depends on percentage value 500.

Seed money field 502 provides the operator with a starting value of the tournament prize and may be adjusted as desired. Thus, if only a few players participate in a tournament, and few contributions are made to the tournament prize, there will still be some incentive to win since the player can win the seed tournament prize. Place percentage fields 504 allow the operator to designate how the value of the tournament prize is to be divided up among the top players in the tournament. The operator can designate the percentage of the prize going to the first place winner, second place winner, and the like. Additional place winners past 5th place can also be designated, if desired.

Start date field 506, start time field 508, end date field 510, and end time field 512 indicate when the designated tournaments will be held. The operator can designate particular time periods for tournaments; when the end date and time have expired, no further players can participate in the tournament, and the tournament prize is divided up among the top players. In other embodiments, additional description fields can be provided to allow the operator to designate holiday periods, sports seasons, a certain time period of every day, month, or year, or other periods that cannot be conveniently specified in a single time range. Repeat tournament field 514 allows the operator to select whether a particular game's tournament will be automatically repeated once the previous tournament has ended. Alternate fields might also be provided to designate further conditions concerning when or how tournaments will repeat.

Of course, additional fields can be provided in tournament table 490 to allow the operator to designate further characteristics of tournaments, such as additional conditions to cause a tournament to conclude (as discussed above in FIG. 7), participation based on predefined characteristics (age, member of a group or club, "preferred customer" status, whether they have achieved a "tournament goal" in a game, and the like), providing various skill levels or handicaps, and providing special tournaments with different prizes and conditions. As for the prize table 480, some or all of the fields can be manually input by the operator, or remotely input by operators, a linked server, or other source.

The tournament table 490 allows the operator further control in determining available prizes, options, and profitability of the redemption system. Furthermore, the ease of use of the tournament table 490 allows the operator to spend a minimal amount of time defining desired tournament characteristics and profitability.

While this invention has been described in terms of several embodiments, it is contemplated that alterations, permutations, and equivalents thereof will become apparent to those skilled in the art upon a reading of the specification and study of the drawings. For example, many types of games can be provided for use with the disclosed redemption system. The redemption system can be implemented on a single game unit or among multiple connected game units, with or without use of a server. Various goals can be attempted by players in a game to win prize credits, specific prizes, or tournament prizes. The provision of prizes to players can be achieved in many ways, including specific prize tickets or coupons, sending a prize to a player, or electronically indicating to an operator the prizes won and/or selected by a player. It is therefore intended that the following claims include all such alterations, permutations, and equivalents that fall within the spirit and scope of the disclosed embodiments.

Figure 10:
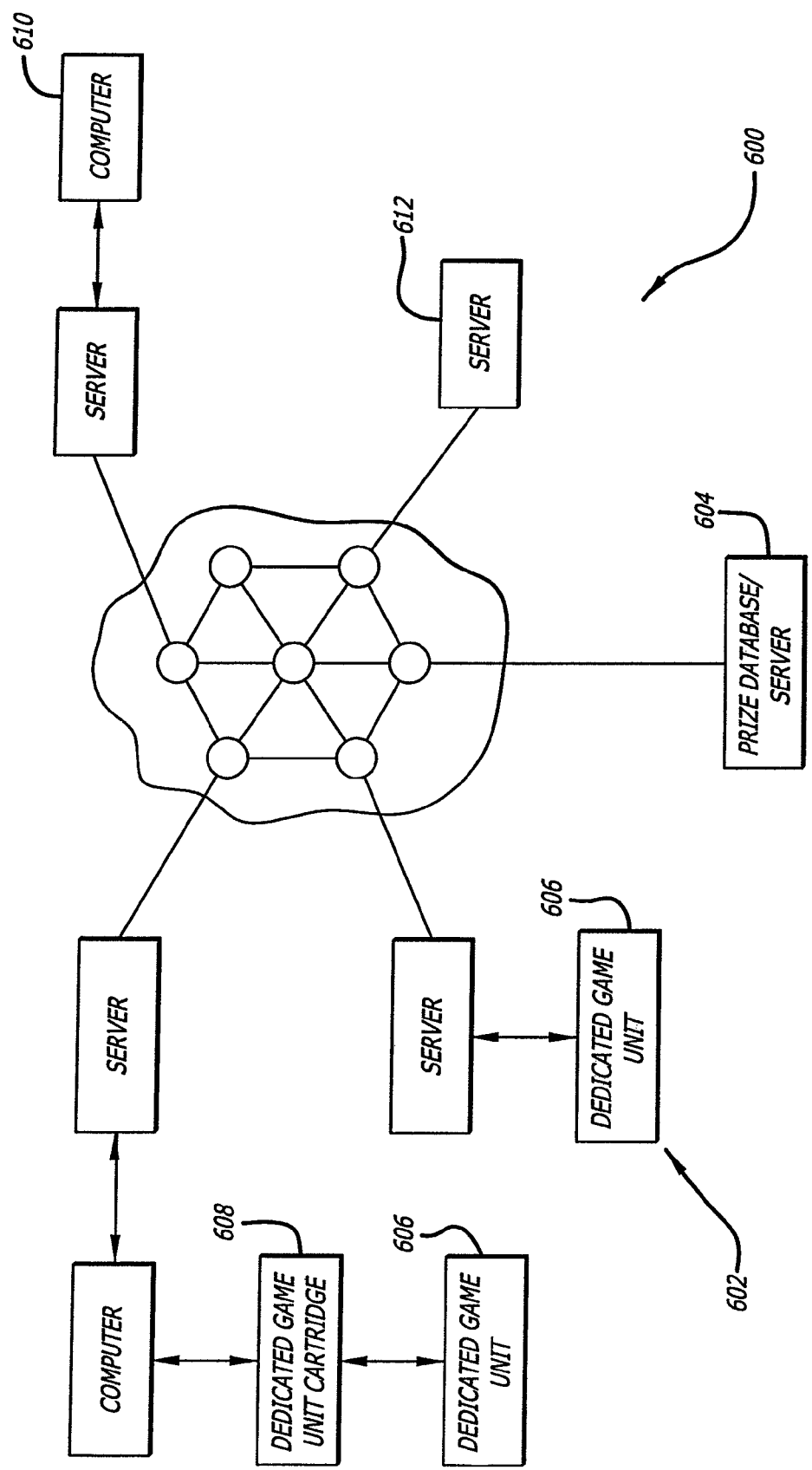
FIG. 10 is a schematic diagram of a wide-area network, which interconnects a plurality of game apparatuses for facilitating a prize redemption system in accordance with one embodiment.

FIG. 10 is a schematic diagram of the disclosed embodiments, which is adapted for allowing redemption of prizes won while playing games on a plurality of networked game apparatuses. As shown in FIG. 10, a wide area network 600, i.e. the Internet, interconnects a plurality of game apparatuses 602 for facilitating a prize redemption system. Such game apparatuses 602 are each adapted for displaying a user interface, which in turn allows a user to play a plurality of games. Also included is a prize database server 104, adapted for connecting to the game apparatuses 602 via the wide area network 600 for communication via a protocol such as TCP/IP or IPX. As an option, the prize database server 604 may also function at least in part as a game apparatus 602.

In use, a user identification code is received by the prize database server 604 from the game apparatuses 602 that corresponds to the user. After play of a game is complete, an indication of an outcome of the game is also received by the prize database server 604. The prize database server 604 also tracks a number of prize credits awarded the user based on the outcome of the present game and/or previous games. Further, the prize database server 604 functions to allow redemption of the prize credits for a prize. With continuing reference to FIG. 10, at least some of the game apparatuses 602 include dedicated game units 606 which are commonly used in combination with televisions or are portable in nature for the sole purpose of playing various games. Such dedicated game units 606 may include a NINTENDO, SEGA or SONY game unit, or a game implemented on a personal digital assistant, such as a PALM PILOT.

In one embodiment, the dedicated game units 606 each include a modem to connect with the wide-area network for communication purposes. In the alternative, the dedicated game units may each include a removable cartridge 608 which may or may not contain one or more specific games, and also allow storage of information, i.e., an identification code and an indication of an outcome of the game. Such cartridges 608 may further be adapted for being releasably received in a specially-adapted port such as a DEXDRIVE connected to a computer which is in turn connectable with the wide-area network 100 for communication purposes. In the case of a personal digital assistant such as a PALM PILOT, a HOTSYNC module may be used to communicate information with the computer.

In another embodiment, at least some of the game apparatuses 602 include desktop or laptop computers 610 each having a modem to connect with the wide-area network 600 for communication purposes. In still yet another embodiment, at least some of the game apparatuses 602 include servers 612 for allowing communication with a plurality of computers 610 via the wide-area network 600.

As an option, some of the game apparatuses may include stand-alone units capable of printing prize credits in the form of tickets, coupons, magnetically-readable cards, cards with bar-codes, or any other type of "smart" card, which may be redeemable at the site of the game apparatus. More information on such game apparatuses may be had by reference to U.S. Pat. No. 5,292,127, by Kelly et al., which is hereby incorporated by reference herein in its entirety. It should be noted that the various aforementioned game apparatuses may be used in any combination.

Figure 11:
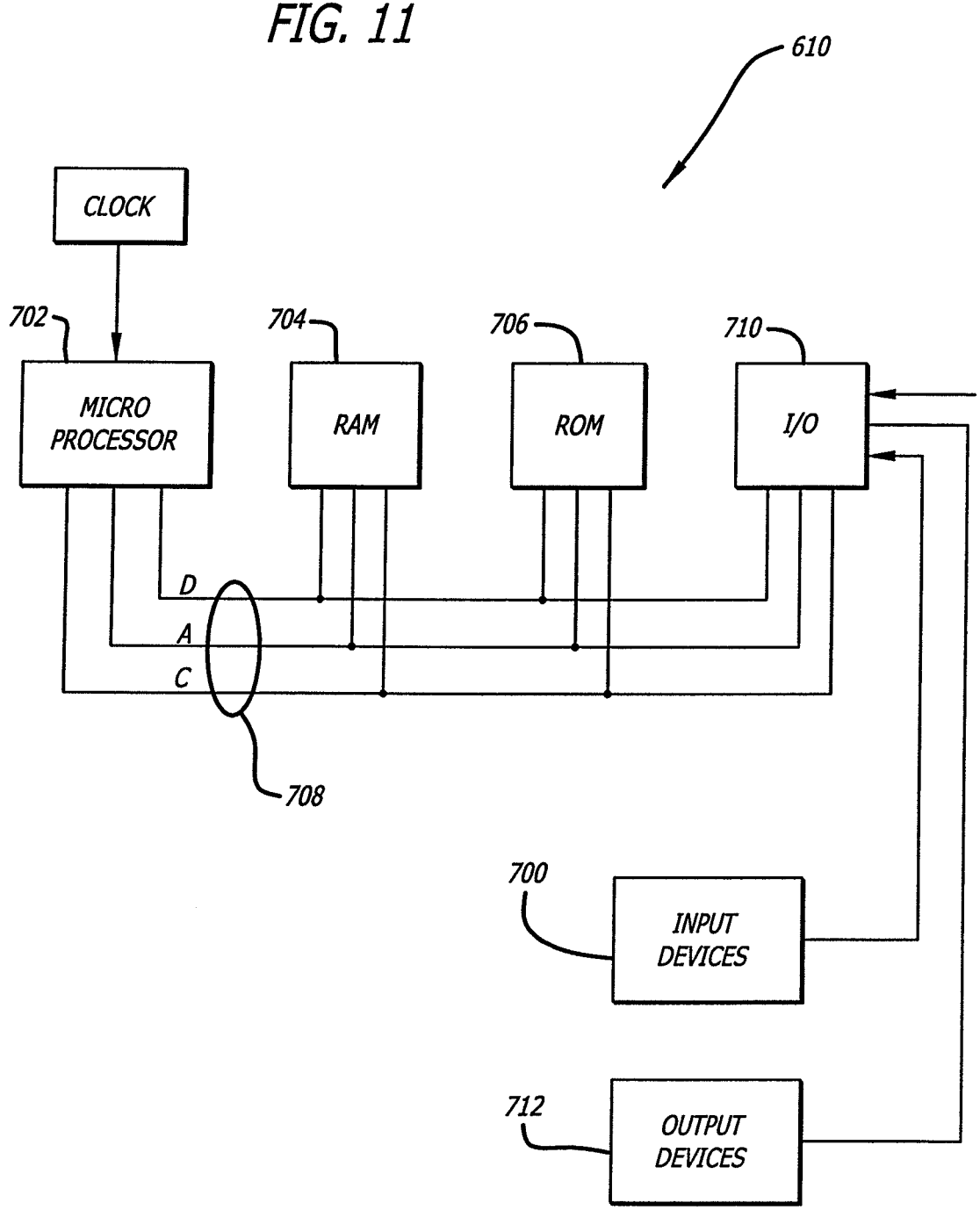
FIG. 11 is a block diagram of various components used in one of the game apparatuses of FIG. 10.

FIG. 11 is a schematic diagram of one of the aforementioned computers 610. As shown, input devices 700 may be used by a player or user to provide input to the game unit to influence game events during a game process and to achieve one or more predetermined goals or tasks for scoring points and winning prizes or other types of awards. The input devices 700 can also be used to select prizes within the redemption system. Alternatively, separate input controls can be used for the prize functions of the game unit.

Player input typically includes game commands provided by controlling devices such as buttons, a keyboard, dials, a joystick controls, a touch screen, a track ball, a mouse, a gun device, a steering wheel, foot pedals, speech input through a microphone, or any other input used in playing a game and providing selections. For example, the player can move a joystick to control a graphical object displayed on a video screen. Each type of user input can provide a particular game command to the computer, and the computer interprets the commands and influences game states and game events in the game process accordingly.

With continuing reference to FIG. 11, the computer 610 receives signals and commands from the player input devices 700 and translates/interprets those signals and commands so that the game process can be updated. The computer 610 preferably includes a microprocessor 702, random access memory (RAM) 704, read-only memory (ROM) 706, and input/output (I/O) 710. Microprocessor 702 can be any processor or controller with features sufficient to control the game apparatus. For example, a suitable microprocessor 702 for many mechanical game applications is the Intel 8031 8-bit microprocessor, which includes eight data lines and sixteen address lines. Alternatively, more powerful microprocessors, such as Pentium-class/Power PC class microprocessors, or specialized graphical or digital signal processors, can be used. Microprocessor 702 executes a process, described by software instructions stored in memory, which recognizes a game command from player input devices 700. The software instructions can be stored in a "computer readable medium," which, by way of example, includes memory, such as RAM and ROM, magnetic disks, a magnetic tape, optically-readable media, such as CD ROMs, semiconductor memory, such as memory chips or PCMCIA cards, and the like. In each ease, the medium may take the form of a portable item such as a small disk, a diskette, a cassette, a memory module, and the like, or it may take the form of a relatively larger or immobile item, such as a hard disk drive.

Microprocessor 702 is coupled to RAM 704 by a data (D)/address (A)/control (C) bus 708 to permit the use of the RAM 704 for scratch-pad memory and other functions during a game process. ROM 806 is preferably an erasable, programmable read-only memory (EPROM) that contains the start-up instructions and operating system for the microprocessor 702. Methods for coupling RAM 704 and ROM 706 to the microprocessor 702 by bus 708 including data, address, and control lines are well-known to those skilled in the art.

I/O 710 includes buffers, drivers, ports, registers, and other analog and/or digital circuitry to interface inputs and outputs with the bus 208. Game output devices 712 and input devices 200 can be coupled to I/O 710. For example, a display screen can be coupled to I/O 710 so that the microprocessor or another video processor can control the display of images on the display screen, as is well known to those skilled in the art.

The computer can include plug-in interface cards such as video cards, 3-D graphics cards, sound cards, controller cards, and the like. Standard peripherals can be coupled to the I/O 710 as input devices 700 and output devices 712, such as a CD-ROM drive, a storage device (floppy disk drive, hard disk drive, and the like), PCMCIA card, a printer, a stylus and tablet, a microphone for voice recognition, a camera, or a communication device.

Figure 12:
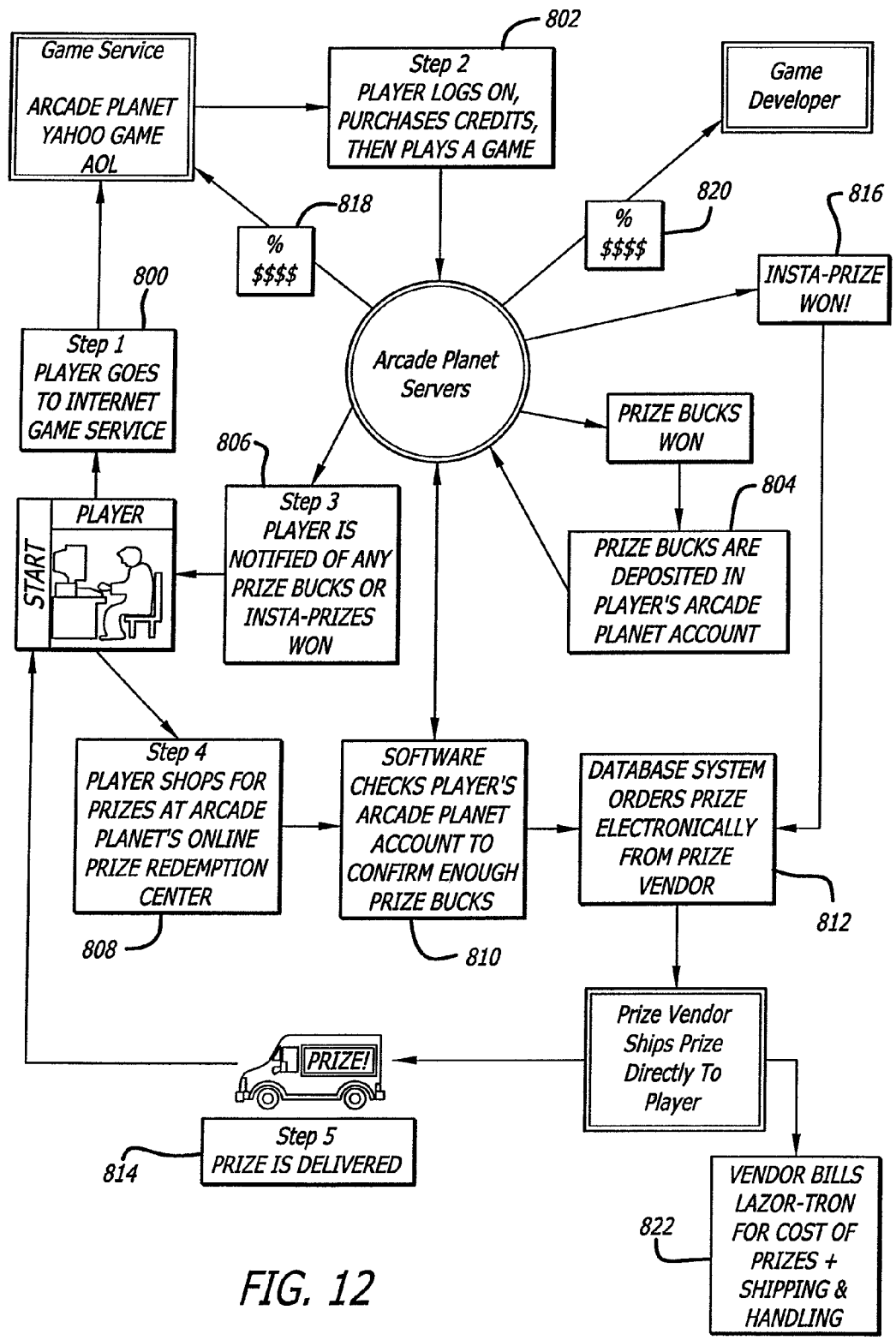
FIG. 12 is a general functional diagram of the prize redemption system of FIG. 1 in accordance with one embodiment.

FIG. 12 is a functional diagram illustrating an overview of the interaction among various users, computers, servers, business entities, and the like during the course of use of the disclosed embodiments. As shown, in one embodiment, a user utilizes a game apparatus, i.e. a computer, for directly or indirectly accessing a server, which provides a plurality of games in operation 800. In one embodiment, the user may access the game server via any particular related or unrelated hosting web site. Next, in operation 802, the user logs on, purchases credits (optional), and plays a game provided by the server. During the course of the game, any prize credits earned are deposited in an account of the user, as indicated in operation 804.

With continuing reference to FIG. 12, the user is notified of any prize credits that may have resulted from the play of the game, as indicated in operation 806. Thereafter, in operation 808, the user may again use the game apparatus to access the prize database server, which may or may not be separate from the game server. An account of the user is then checked to verify a current number of prize credits available. (See operation 810.) Then, in operation 812, the game database orders any prizes selected by the user from a prize vendor. The prize is then delivered to the user in operation 814. In the case where a prize credit that represents a specific prize is awarded in operation 816, the prize database server does not require any selection prior to ordering in operation 812.

Any monetary gain resulting from the method of the disclosed embodiments may be distributed in various ways. For example, an owner of a hosting web site may be compensated for providing access to the games via the hosting web site. (Note operation 818.) Further, a developer of the games may be compensated in operation 820. The prize vendor may also receive funds for cost of prizes, shipping, handling, and the like in operation 822.

Figure 13:
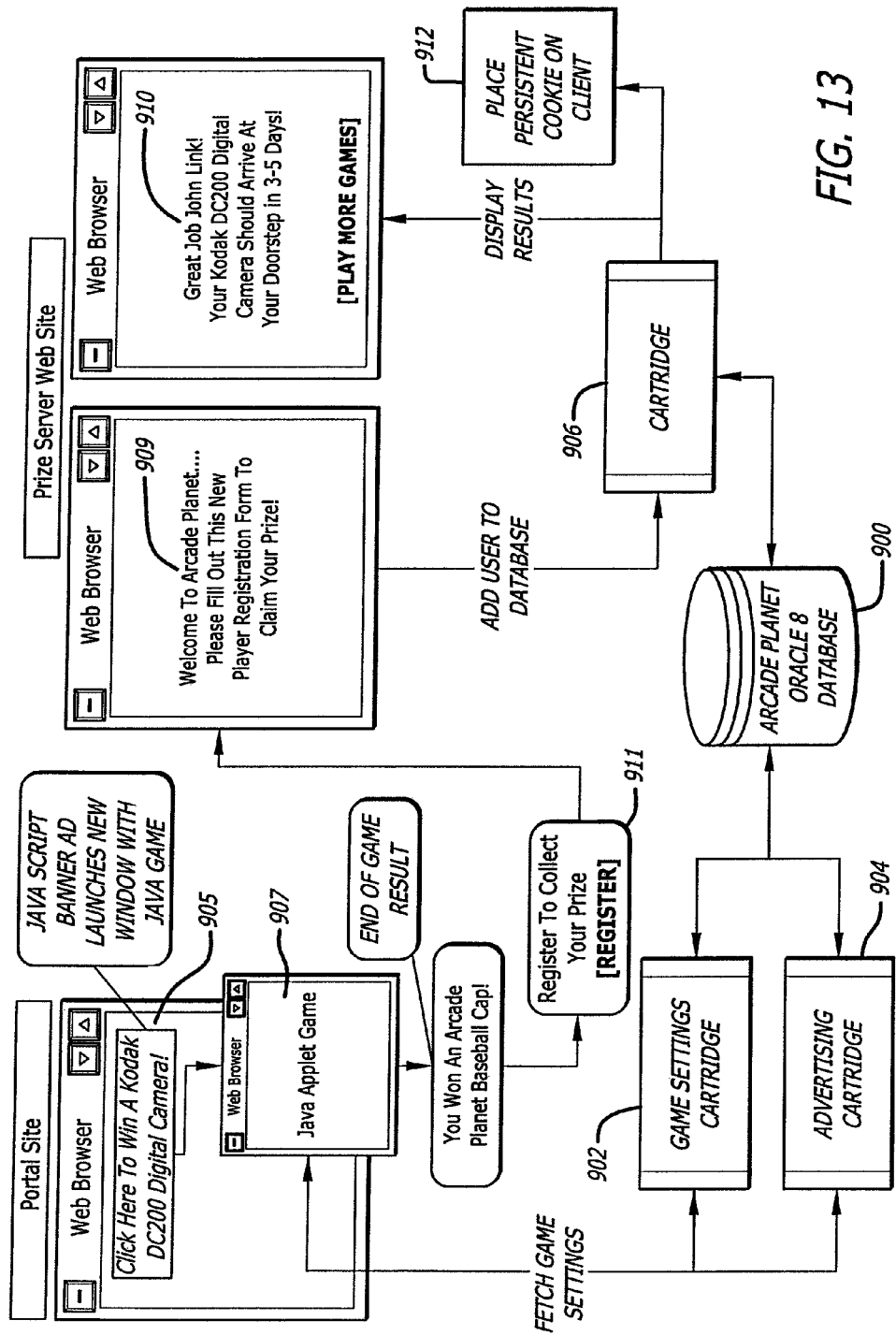
FIG. 13 is a functional diagram illustrating various interfaces accessed during the course of use in addition to underlying supporting components of such interfaces.

FIG. 13 illustrates a functional diagram showing some of the user interfaces, supporting software, and hardware associated with an alteration of the flowchart in FIG. 12. In terms of hardware, a server 900 is shown to include software having a game settings cartridge 902, an advertising cartridge 904, and a prize redemption cartridge 906. It should be understood that any of the foregoing cartridges may be executed from separate servers.

In use, a user interface 905, i.e. web page, of a hosting web site allows access to a game interface 907 via the game settings cartridge 902 of the server 900. In contrast to operation 802 of the method of FIG. 12, the present alternate method does not require the user to log on or purchase credits. Instead, funding is afforded by advertising that is provided during the course of the game by way of the advertising cartridge 904. Upon winning a number of prize credits, the user is then forwarded to a prize redemption interface 909 governed by the prize redemption cartridge 906.

When access is gained to the prize redemption interface 909, the user is required to log on via a log-on interface 911, unless, of course, the user is already logged on. Thereafter, a confirmation interface 910 is displayed for indicating that the prize has been delivered. As an option, a "cookie" may be placed on the computer of the user in operation 912.

Figure 13A:
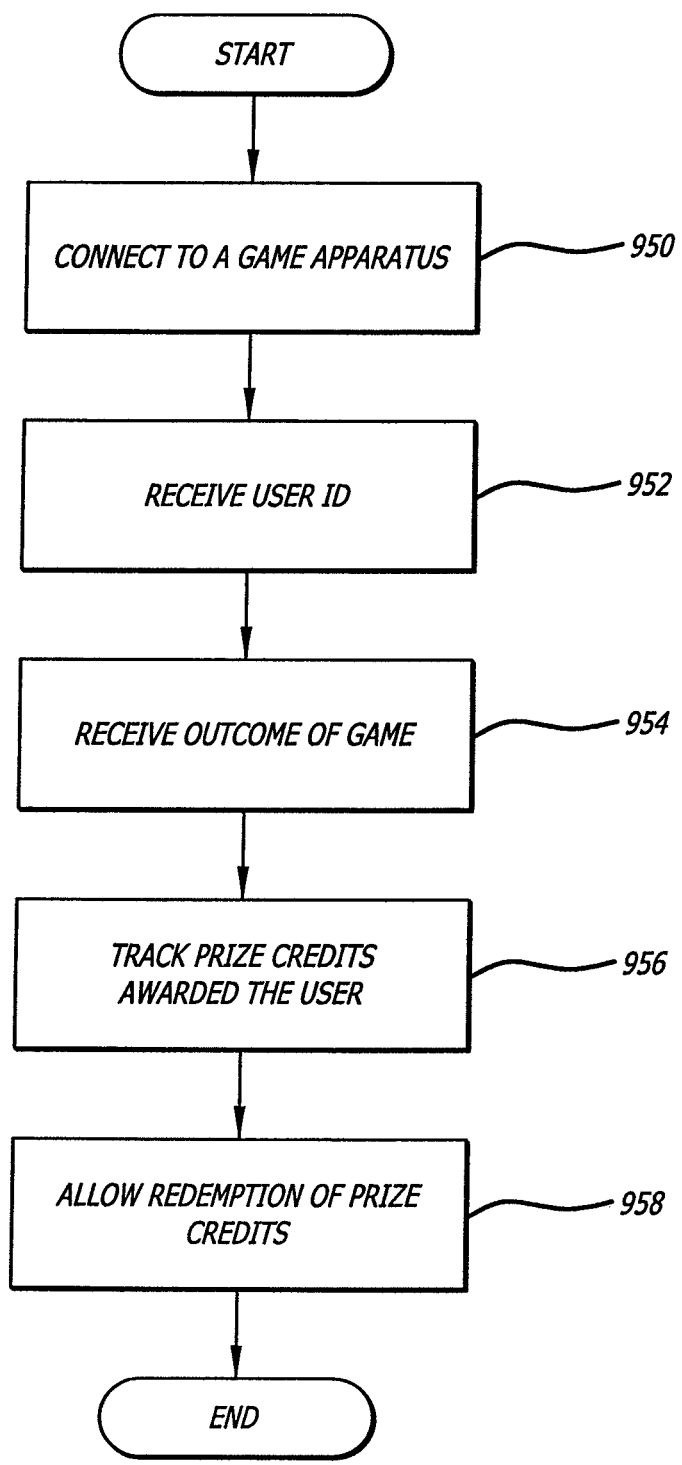
FIG. 13A is a functional diagram illustrating the operation of the prize database server.

FIG. 13A is a general functional diagram illustrating the operation of the prize database server. Irrespective of whether the disclosed embodiments are implemented in the manner shown in FIG. 12 or FIG. 13, or any other manner, the prize database server may carry out fundamental operations. In particular, the prize database server is adapted for allowing redemption of prizes resulting from playing games on a plurality of networked game apparatuses.

To accomplish this, the prize database server is capable of connecting to the game apparatuses via a wide-area network, i.e., the Internet, or any other communication system in operation 950. Upon the connection being established, the prize database server receives a user identification code from the game apparatuses that corresponds to the user in operation 952. Also received is an indication of an outcome of a game or games upon the user playing the game(s). (Note operation 954.) The prize database server also tracks a number of prize credits awarded the user based on the outcome of the game in addition to allowing redemption of the prize credits for a prize, as indicated in operations 956 and 958, respectively.

Figure 14:
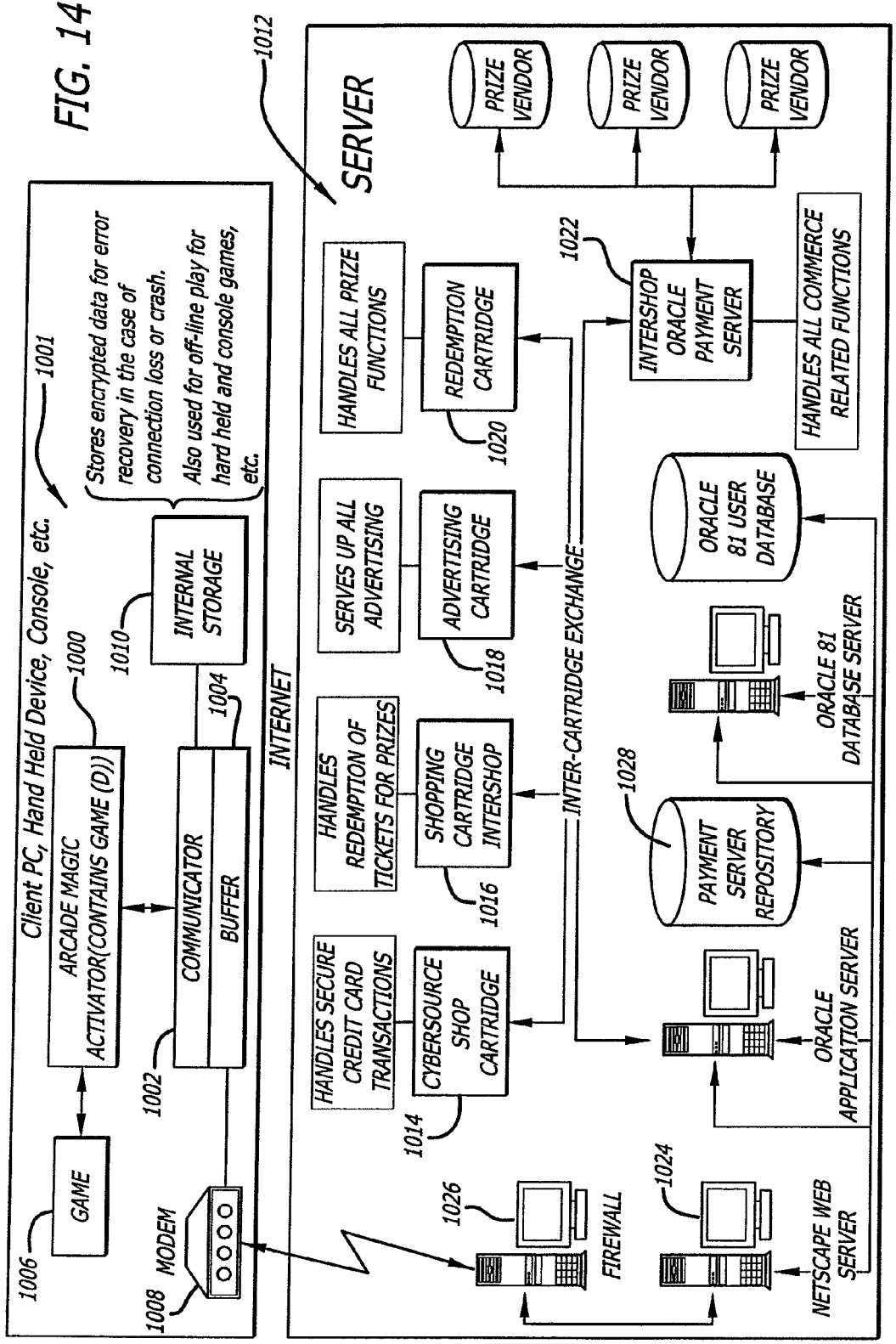
FIG. 14 is a schematic diagram illustrating various software components of one of the game apparatuses and further multiple servers associated therewith.

FIG. 14 illustrates software that may be resident in one of the game apparatuses mentioned hereinabove. Client-side software 1001 is shown to include an activator module 1000, a communicator module 1002, and a buffer module 1004 which are adapted to interface with a game module 1006, a modem 1008, and internal storage 1010 among other components of the game apparatus. Together, the foregoing software components constitute an application program interface (API) that may be accessed via a C++ dll for Win32 games and obfuscated Java class(es) for Java applet games.

Also shown is server-side software 1012. The server-side software is shown to include a secure credit card transaction module 1014, a shopping module 1016, an advertising module 1018, a redemption module 1020, and a payment server 1022 which may be interconnected with any of the game apparatuses via a web server 1024 and an associated firewall 1026. A plurality of supporting servers 1028 may also be included per the desires of the user.

In order for the process of FIG. 12 to be effectively carried out, variables, or game settings, must be transmitted to the game apparatuses from the server and further identification codes and game outcomes must be transmitted to the server from the game apparatuses.

Examples of the game settings include a table of prize credits awarded in terms of various game outcomes possible on the game. For instance, 10 prize credits may be awarded for every 1000 points earned during play of the game. Yet another example of game settings may include the enabling or disabling of various features of the game based on the geographic location of the user as indicated by the identification code. It should be noted that the transmission of the identification codes and game outcomes to the game server is critical for tracking the prize credits awarded a user when prize redemption is desired. Further examples of game settings, identification codes, and other information that may be exchanged for various purposes will be set forth hereinafter in greater detail.

To accomplish the foregoing exchange of information, the activator module 1000 is adapted to interface with the game module 1006 and request information from the communicator module 1002 as needed. At the time of each request, the activator module 1000 identifies the game module 1006 to the communicator module 1002 for purposes that will soon become apparent later. As such, the activator module 1000 is specifically tailored for use with the corresponding game. For security purposes, additional information relative to the game developer may be stored on the game server.

The communicator module 1002 in turn makes numerous calls for information from the server. Such calls are made over the modem. In order to accommodate situations where a connection cannot be made with the game server or a connection is lost temporarily, various features are afforded. First, upon the receipt of information from the server resulting from a call, such information is stored in internal storage, which may constitute any type of memory. As such, when a connection to the server cannot be made, the game settings may be retrieved directly from the internal storage. Further, the communicator module 1002 may be adapted to manually or automatically connect with the server periodically or on any other time frame for synchronization purposes.

Since the disclosed embodiments may be used with many types of games and communication with the game server may some times be compromised, it is preferred that a minimum amount of calculations be performed on the game apparatus itself. Instead, information is received from the game apparatus by way of the API, calculated by the game server, and transmitted back to the game apparatus. Further, the communicator module 1002 may be capable of requesting core assets from the game server for storage on the client computer. Such core assets may be used universally with any type of game and include universal graphics, playing cards, sound affects, mahjongg tiles, sound effects, graphics, and the like. The core assets would only need to be downloaded once and may be updated, deleted or supplemented, as needed.

The calls that may be executed by the API in order to communicate necessary information will now be discussed. Such function may actually include a plurality of URL-based calls. The calls may correctly format the data, connect to the server, send information to the game server using secure sockets layer (SSL), and then correctly format the return code and any data that was returned to it from the server. The communication layer is responsible for formatting parameters and for maintaining as many internal variables as possible. This shields the game module 1006 from continuously having to pass the same parameters. The game module 1006 is responsible, however, for appropriately handling return codes returned from the server.

Some examples of calls will now be set forth:

getGameSettings: This function takes a few different forms. First, if it is called from a Java applet game, then it is safe to assume the player is connected to a network, i.e. the Internet, in which case it is safe to retrieve game settings from the game server regardless if the game is being played in a demonstration (play-for-fun) mode or a pay-to-play mode. Any other kind of game requires default game settings to be used if in the demonstration mode. Any game in the pay-to-play mode assumes it is safe to query the server to get game settings. The data is specific to each game and is returned in the form of name-value pairs (e.g. "PointsLevel 1=10"). The game apparatus is responsible for extracting the value for each known piece of data. This call is also used to validate the game version. Games are not allowed to continue if they are not the latest version. This helps to ensure reliable redemption play.

beginGame: The present call may or may not be available in games played in the demonstration mode. With this call, the server is given the number of credits to be played and attempts to debit the player's account. Prior to doing so, however, the server determines whether the player has any specific business rules that prevent him from playing. When the player has been successfully validated and his account has been debited, the server adds a row to a table in a database indicating that he has started the game, and then returns the appropriate return code to the game apparatus.

endGame: The present call may or may not be available in games played in the demonstration mode. The present call is sent to the prize database server to provide game data including end time and score. This data is used to update the database row that was added when the game was started. The score is fed into the points-to-prize credits conversion table to determine if any award should be given. The present call also prompts the prize credits in the player's account to be appropriately changed.

getNextInstaPrizes: The present call may or may not be available in games played in the demonstration mode. The present call is sent to the prize database server to obtain a description and unique prize ID of the next specific prize. The redemption engine on the server generates this data. All next specific prizes are predetermined based on the previous prize and reside locally on the game apparatus. The server notes the prize ID in order to validate against the wonInstaPrize call.

wonInstaPrize: The present call may or may not be available in games played in the demonstration mode. The present call is used when a specific prize is won at which time the prize ID of the specific prize is sent to the server for validation within the redemption cartridge.

This effects at least one of three occurrences:

If game credits were won, such game credits are added to the account of the player.

If prize credits were won, such prize credits are added to the account of the player.

If merchandise has been won, such merchandise is added to the player's shopping cart. Procurement is delayed until the player checks-out.

getAvailableCredits: The present call may or may not be available in games played in the demonstration mode. In use, this call is used prior to each game as a way of displaying to the player a number of credits that are available.

canPlay: The present call may or may not be available in games played in the demonstration mode. This call serves as a separate function to check business rules preventing game play (parental controls, bad account, available credit, and the like).

getAdvertisements: This call may be available in the demonstration mode depending upon the game platform. The present call serves to retrieve the latest advertisements, which are to be played. This may be accomplished by calling the advertisement in the form of an advertisement ID and checking to see if the appropriate advertisement has already been downloaded. If the appropriate advertisement has not already been downloaded, default advertisements are used that were downloaded previously during which downloading begins to obtain the latest advertisements while the player is playing the game or browsing a related site.

postGameStatus: The present call sets a persistent game state in the event of a failure of the game apparatus, connection loss, and the like.

getGameStatus: This call gets the persistent data (see postGameStatus) from the game apparatus.

getErrors: The present call retrieves any error information that was generated during use of the game apparatus.

In terms of security, the various variables that are passed may be named in a counter-intuitive, obfuscated manner. For example, a variable relating to a personal identification code may be named "prize_credits_awarded." Further, digital signing may be employed where feasible. Even if security is breached, the disclosed embodiments inherently prevent significant fraud since the value of prize credits awarded is always a fraction of the value of game credits required to play the game. In addition to the foregoing features, when requests start flooding the server from one particular location, the disclosed embodiments may lock out all future requests from that location.

Figure 15:
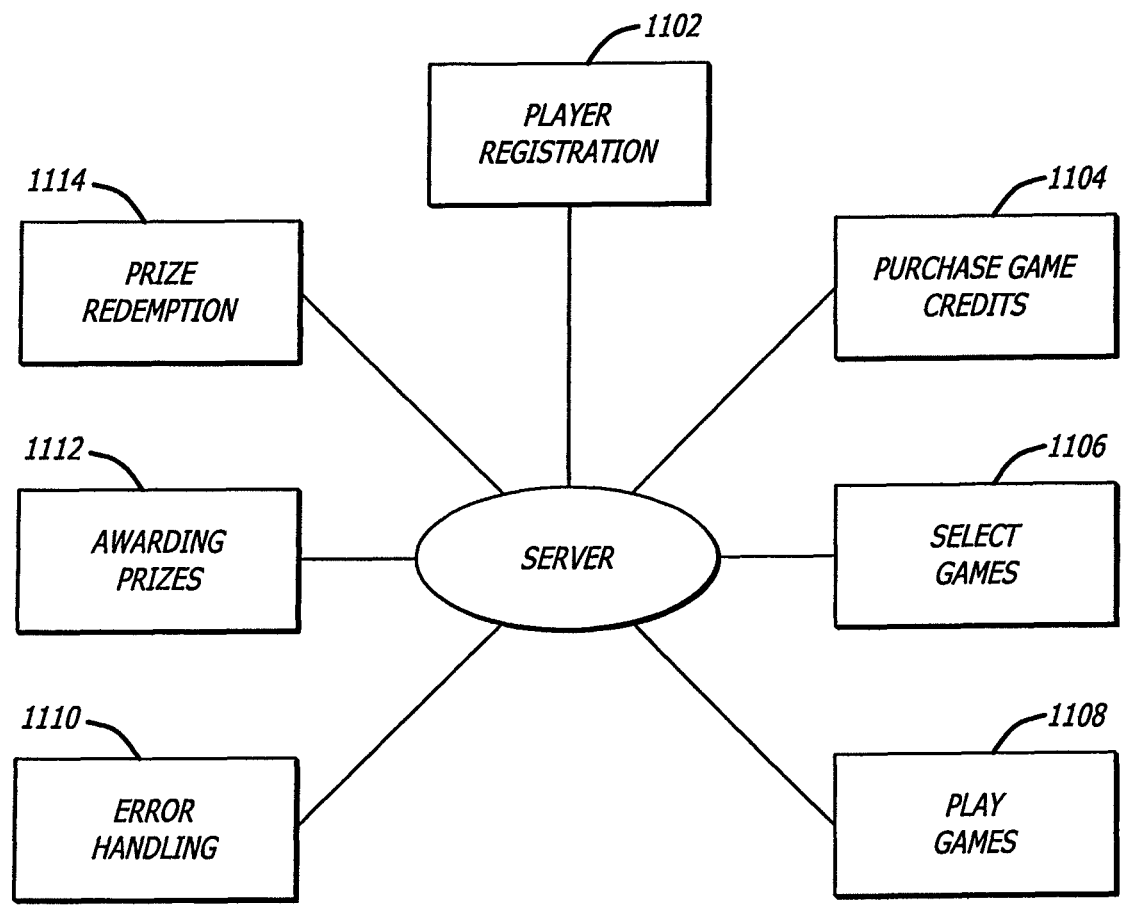
FIG. 15 is a flowchart illustrating various operations.

FIG. 15 illustrates a functional diagram showing the various aspects of the method associated with use of the disclosed embodiments. The various operations shown in the functional diagram of FIG. 15 include a player registration operation 1102, a purchase game credits operation 1104, a select game operation 1106, a play game operation 608, an error handling operation 1110, an award prizes operation 1112, and a prize redemption operation 1114. It should be noted that the foregoing functional aspects of the disclosed embodiments may be carried out in any order or not at all.

For example, in demonstration mode, the purchase game credits operation 1104 is not necessary, and the awarding prizes and prize redemption operations 1112 and 1114 are optional. Further, the player registration operation 1102 is only necessary if the prize redemption operation 1114 is executed. Still yet, the select games operation 606 is required only if multiple games exist and the error handling operation 1110 is optional.

Figure 16:
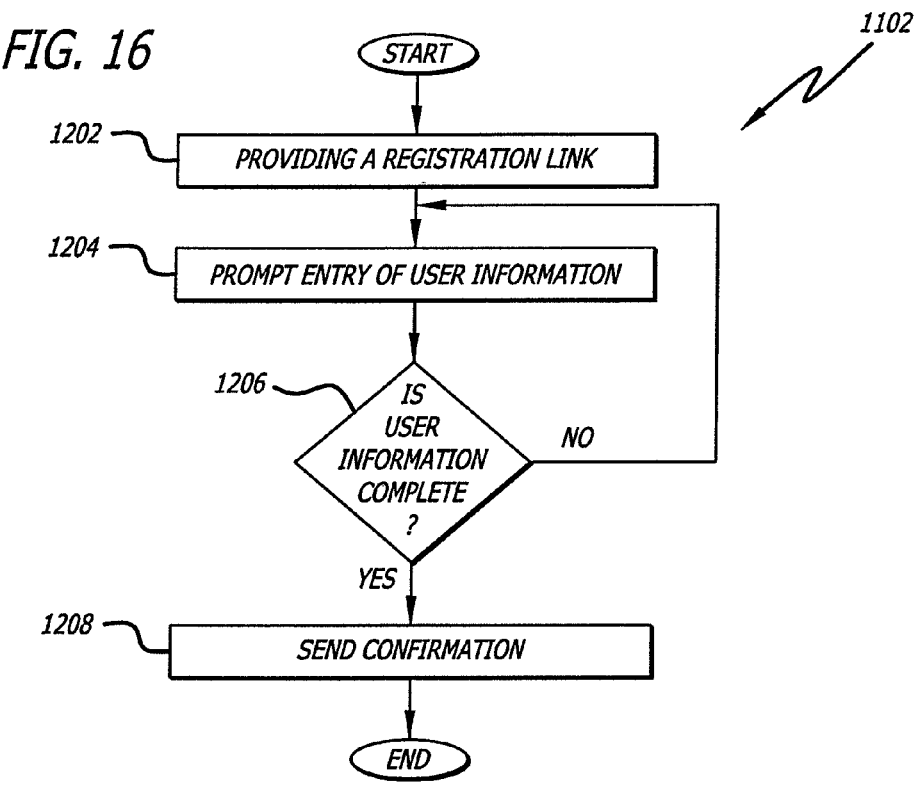
FIG. 16 illustrates the process by which the player's registration operation of FIG. 6 is executed.

FIG. 16 illustrates the process by which the player registration operation 1102 of FIG. 15 is carried out. Player registration may be executed at any time by the prize database server or not at all in some embodiments where a game is being played in demonstration mode. In one embodiment, player registration is required only upon redemption of prize credits for prizes. In such embodiment, the registration process makes it clear that in the event the user does not register, the user forfeits any prize credits that have been won.

When registration is required, unregistered players are provided a registration link in operation 1202. Such link affects the display of an interface such as a web page which prompts the user to create a personal user name, or user identification code, and a password. (Note operation 1204.) Further, the registration interface requires entry of minimal necessary information such as a name and an e-mail address. Optional information such as demographics, game preferences, and the like may also be entered if desired by the user. It is then determined if the necessary information has been entered and is complete in decision 1206. Upon entry of at least the necessary information, a confirmation may be sent to the user in operation 1208.

At anytime, the user may update any of the foregoing profile information. As an option, the user may be precluded from altering the user identification code for security purposes. As a further option, a hint may be provided in order to facilitate remembering the user identification code, and/or the password.

In one embodiment, a person registering, or a primary account holder, may establish a plurality of secondary accounts for secondary account holders. Such features allow a parent to assume a primary account holder role and control various aspects of the secondary account holders who may include children of the parent. Examples of aspects which may be varied independently or simultaneously for each player include a duration or specific range of time a secondary account holder may play games, a dollar amount of game credits that can be purchased in a specified amount of time, and/or the types of games that may be played. The control of the type of game permitted to be played may be based on a current game industries rating system.

In addition to limiting the ability of the secondary account holders to use the disclosed embodiments, the primary account holders are also given exclusive authority to modify and/or delete a current account, and transfer game credits, prize credits, and prizes to and from the various secondary accounts. This allows pooling of prize credits for obtaining desired prizes, and the like. In order to add secondary accounts, a primary account holder may be required to enter at least one valid credit card number as a way to establish eligibility. It should be noted that a credit card may not be used to create two separate main accounts during use of the disclosed embodiments. Further, game credits, prize credits, and prizes may not be transferred between main account holders to inhibit fraud.

Figure 17:
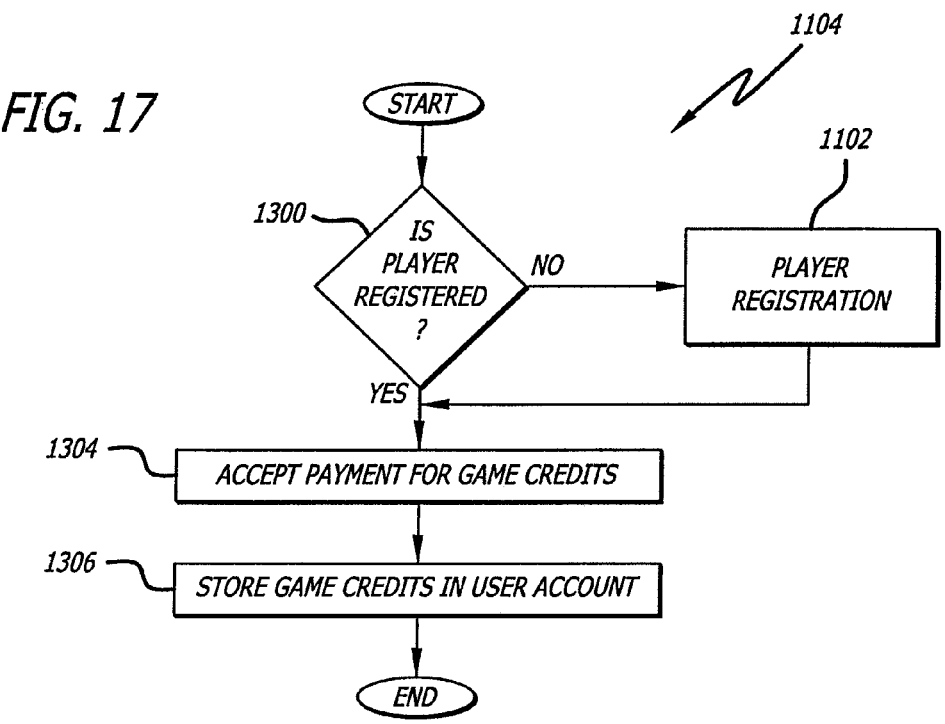
FIG. 17 illustrates the process by which the purchase game credits operation of FIG. 6 is executed.

FIG. 17 illustrates the process by which the purchase game credits operation 1104 of FIG. 15 is carried out. Such game credits are used to play games in order to win prize credits. It should be noted that in some embodiments, purchase of game credits is unnecessary due to the presence of advertisements or because the game is merely being played in a demonstration mode.

The process of FIG. 17 begins by determining whether the player is registered in decision 1300. If not, the player registration operation 1102 (see FIG. 16) is executed. Once it is ascertained that registration is complete, the purchase of the game credits is permitted in operation 1304.

Upon purchase, the game credits are automatically stored under the corresponding account in operation 1306. The system may have the capability to provide a non-linear purchasing scale, giving players incentives to purchase larger quantities of credits at a lower per unit cost. For example, when purchasing credits the player might be offered 10 game credits for $1.00, 30 game credits for $2.50, 60 game credits for $4.75, and 120 games for $8.50.

While the prize database server handles all of dollar-to-game credit conversion, the conversion factors may be also dictated by managers of the game apparatuses. When a player makes a purchase request, the prize database server validates the account and checks business rules to verify that the user is qualified to make the purchase. In the event that a user is either restricted by parental controls or his or her account has been flagged, the user may be notified of such with the appropriate messages on how to correct the situation, i.e., contacting support personnel.

The prize database server may also be designed to support "incentive suppliers." Entities which desire to provide free game plays to their customers may present various customers with a URL and a key code to be able to use a predetermined amount of game credits. The customer, or user, would then go to the URL, enter the key code, and receive a predetermined number of free game credits. In the present embodiment, the incentive supplier would be responsible for all costs related to the key codes that are distributed.

In operation 1106 of FIG. 15, a selection of a game to be played occurs. Two optional types of games that are available include games played in exchange for payment and free games including games played in a demonstration mode. The payment games require the prior execution of operations 1102 and 1104 of FIG. 15. In the case of free games, however, player registration in operation 1102 may be delayed until prize redemption is required.

The free games may include games supported by Java Applets, ShockWave, Flash, and the like, without communication of identification codes or the like. Further free games may be created to entice users to register with the prize database server. It should be noted that free games may award only a limited amount of prize credits, if any. As an option, the free games may only simulate winning. In any case, the user may be required to register before a prize is redeemable after which future prize credits awarded to the registered use may be limited or prevented. Further, the free games may be supported by advertising.

Payment games may be supported by Java Applets, ShockWave, Flash, Windows95/98/2000, macros, and the like. It is imperative that it is understood that payment games may include any type of advertising-supported game or a game that is supported by any type of compensation scheme. In one embodiment, the payment games may be played in a tournament mode. Ideally, tournament games present all tournament players with the same exact game settings so that all players have the same odds. In one type of tournament game, i.e., a duration-type game, a variable number of games are to be played in a fixed amount of time.

In each of the previous embodiments, the games may include a "game of skill" that requires a predetermined goal, task, or objective for a game to be accomplished in a skillful manner such that an outcome of the game is determined primarily by the amount of skill of the player. The greater the player's skill, the closer or more easily a desired goal in the game can be reached by the player. Points associated with the predetermined goals or objectives can be added to a game score such that a higher game score, on average, indicates a greater amount of skill by the player. In the alternative, the games may include a "game of chance" where the outcome of the game is determined primarily on chance. It should be noted that games of chance may be restricted based on an age of the user and/or a geographic location where the user resides.

Figure 18:
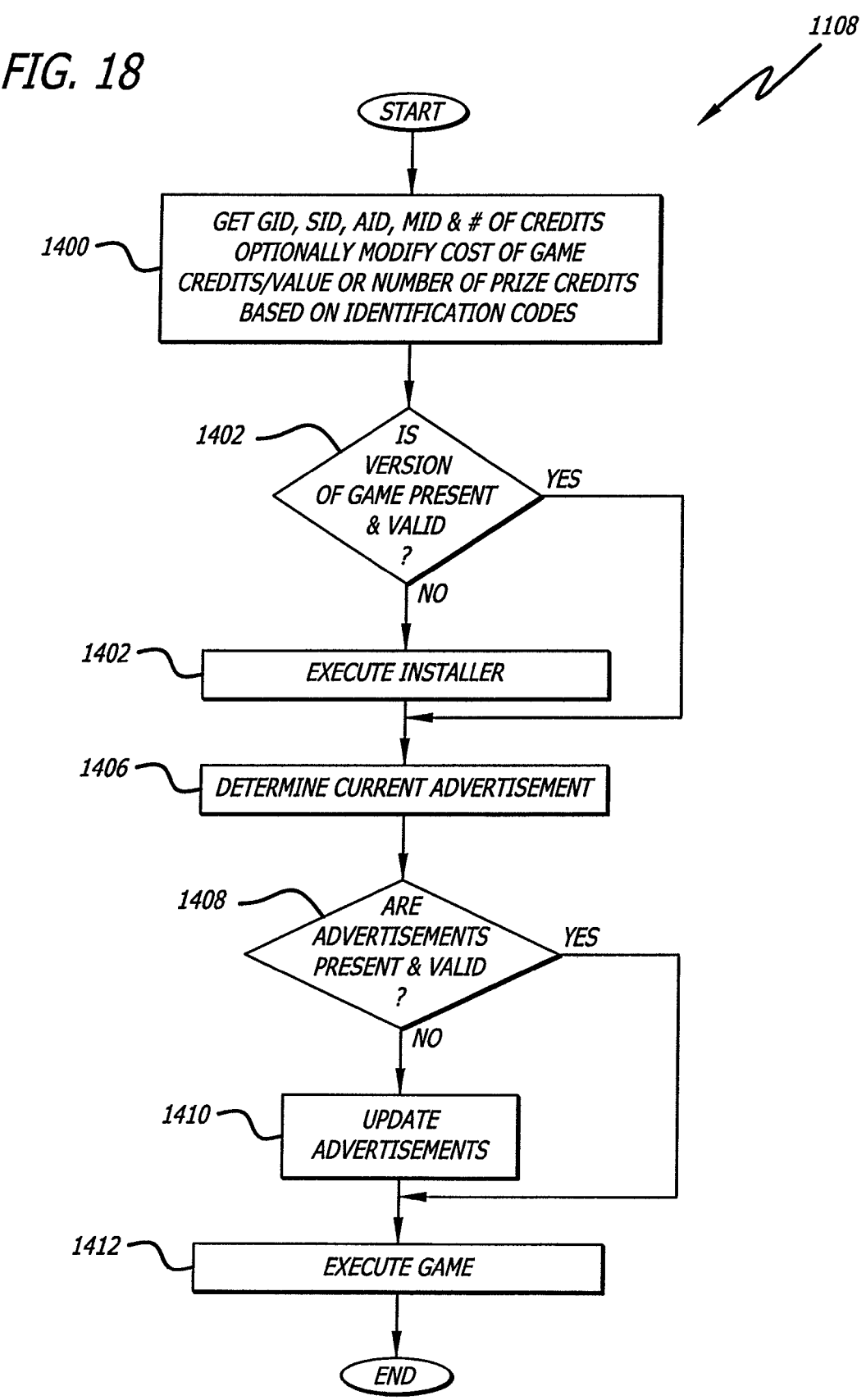
FIG. 18 illustrates the process by which the play games operation of FIG. 6 is executed.

FIG. 18 illustrates the process by which the play games operation 1108 of FIG. 15 is carried out. As shown, the prize database server is adapted for receiving a plurality of identification codes in operation 1400. For example, a site code may be received which is representative of a web site, or game apparatus, which is supporting a game. In addition to the site identification code, a game identification code, a user identification code, a prize credit identification code, a mode identification code, or any other type of identifier may be received by the prize database server.

As an option, the prize or any other feature associated with the disclosed embodiments may be determined based on any of the foregoing identification codes. Further, other aspects of the disclosed embodiments may be specifically tailored for a particular profile. For example, the cost of game credits, a prize, a name, a number or value of the prize credits awarded; advertising, sounds, graphics, and/or limited access may be altered based on any of the aforementioned identifiers. In each of the foregoing cases, such tailored aspects may be handled by the game server.

One objective of the use of identifiers is to allow for partnerships, especially between the prize database server and other game servers. One game server, for example, may allow all its players to play a specific game for free thus modifying the value of credits, but only for that particular site. Accordingly, each game server may have settings specific to that site and thus when a player launches a game, the prize database server must know the originating location of the game in order to return the appropriate game settings. In addition, players will be able to register with the prize database server at partner game servers, or sites. Further, the interfaces provided by the prize database server may be modified in accordance with the interface of the partner game servers. This creates the perception that a user is still interfacing with the partner game server when actually he or she is interfacing with the prize database server. As an option, activity for all players may be maintained for each of the game servers as a way to track site traffic and thus be able to pay commissions of the game credits revenue, sale advertising, and collect advertising revenue.

In addition to facilitating partnerships, the identifiers may be used to control the experiences of particular users. As mentioned earlier, an age of the user or account status, i.e., a secondary account holder, may affect the user's ability to perform various functions of the disclosed embodiments. Further, the user identification code may be used to indicate a location of the user. This may be accomplished by referencing registration information of the user or tracking an IP address by which the user has gained access to the server. Given the identity of such geographic location, the disclosed embodiments may preclude access to certain games in accordance with local jurisdiction laws. This may be particularly beneficial in the case of "games of chance" as discussed hereinabove. It should be noted that alternate game settings may be changed for each particular jurisdiction.

Upon the receipt of the identification codes, it is then determined in decision 902 whether a current version of the game is present and valid. If the current version is unacceptable, an installer may be executed in operation 1404. Such an installer may be downloaded from the prize database server and subsequently executed on the game apparatus.

When it is verified that the current version of the game on the game apparatus is valid, advertisement software may be executed. Prior to execution, however, the advertisement software may be identified in operation 1406 after which it is determined in decision 1408 whether a version of the advertisement software is present and valid. If not, the advertisement is updated in operation 1410 by downloading, and the like. Finally, the game is executed in operation 1412.

Advertising software may be executed between or during games. Such advertisements can include still shots, animation, movies, sound, and the like. Advertisements sponsored by companies, prize providers, game providers, or other sources can be displayed and, in another aspect of the disclosed embodiments, can be directly related to prize or game information. For example, a sponsor may have contributed to prizes available to players on the advertising game apparatus, so that the advertisement has a direct relation to prizes and can thus increase the effectiveness of such advertising. A sponsor might also supply free games for players in exchange for displaying advertisements, or may simply pay the game or prize database server for advertising time. Still yet, a player can play an advertiser-sponsored game and directly win an advertiser's prize if a task is accomplished. Thus, using the linked advertising and prize redemption system disclosed herein, multiple revenue streams from advertisers are offered to a game operator and also offer the sponsors more effective advertising.

Figure 19:
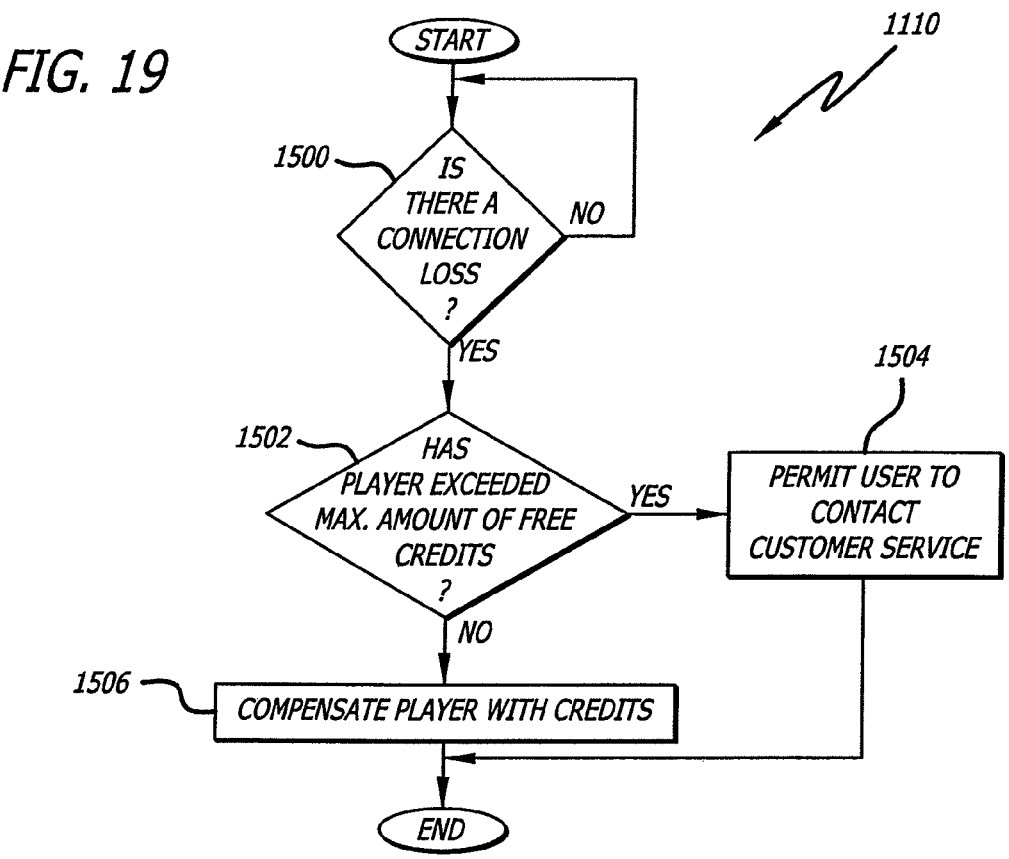
FIG. 19 illustrates the process by which the error handling operation of FIG. 6 is executed.

FIG. 19 illustrates the process by which the error handling operation 1110 of FIG. 15 is carried out. Error handling is executed upon a loss of connection between the prize database server and the desktop or laptop computer, as determined by decision 1500. If a loss of connection is detected, the game parameters in the prize database server will not have had the chance to be updated at game end-time. As such, in order to compensate the user, a predetermined number of game or prize credits may be awarded to the user in operation 1506.

Since awarding of game or prize credits in response to connection loss may provide an incentive for intended connection loss during game play, certain precautions are necessary. In one embodiment, a method may be implemented for tracking players who regularly 'drop' connections. The software on the game apparatus, i.e. the communicator module, may try to solve the problem when communication is re-established, but if it cannot fix the problem, the player may be given the opportunity to play the game again for free as long as they have not exceeded a predetermined maximum number of free game or prize credits. Such predetermined maximum number of free games may be established in predetermined time intervals, i.e., 10 credits/month, to limit the negative affects of fraud.

In the event that a user has exceeded the predetermined maximum number of free games in decision 1502, the user may be notified and given a customer service number to call in operation 1504. Customer service will have the ability to give the user some more credits on a discretionary basis. Once connection has been re-established, the communicator module will update the server with any data cached prior to the connection loss.

In the awarding prizes operation 1112 of FIG. 15, prizes of various types may be awarded. The term "prize", as used herein, is intended to generically refer to any merchandise, souvenir, food item, game credits or other physical goods or services which can be offered to players of redemption games and which may have value other than as a medium of exchange for use in the gaming environment. A radio, stuffed animal, toy model, coupon for monetary value outside the gaming environment, gift certificate, cash, and free games to be played on game apparatus are all examples of "prizes." A prize might also be a promotional coupon or cash prizes, which can encourage players to return to the current gaming environment more quickly in the future.

"Prize credits" differ from a "prize" since they can be used to redeem other types of prizes. In one embodiment, the prize credits that are awarded represent a type of universal currency that may be used for prize redemption purposes. In use, prizes may be made available for various amounts of the universal prize credits.

The amount of prize credits awarded to the player may be based upon a game score or other result of a game process. In addition, special or progressive goals may be achieved by the player to win an additional or specified number of universal prize credits. In the preferred embodiment of the redemption system, "prize credits" are used as a medium of conversion from game score to a prize value.

As an option, specific prize credits may be awarded which may be redeemed for specific prizes awarded to the user. Specific prize credits are to be distinguished from the universal credits described above. A "specific prize" or "instant prize," as referred to herein, is a particular prize or type of prize that a player can be directly and immediately awarded and, in most cases, can immediately receive due to a particular winning result on a game apparatus. A "specific prize credit," as referred to herein, is thus an electronic voucher that can be exchanged for the specific prize only.

The prize credits, as described hereinabove, may be awarded by any one of various methods. In the case of the specific prize credit, the same may be downloaded prior to beginning play of the game. This prevents complications if a connection with the prize database server is lost during play. Further, such a feature allows the player to know the prize(s) at stake prior to play for legal purposes, and also allows the specific prize credit to be immediately displayed upon being awarded without delay due to downloading. As an option, the specific prize credit may even be displayed during play prior to being awarded for enticement purposes.

In another embodiment, an ordered list of specific prize credits may be displayed during play. Ideally, such list of specific prize credits may be generated based on business rules on a periodic, i.e., a 24-hour basis. Such business rules may include a current total number of specific prize credits a current player has been rewarded in the past, a desired payout percentage, a current average number of game credits that the current player spends per game, a current total number of specific prize credits available, and a value of a game credit. It should be noted that the foregoing business rules may vary based on other factors such as a web site through which the game was accessed, a profile of the player, and the like. If such information is not available for any reason, the disclosed embodiments may employ default values to generate the appropriate specific prize credits. Additional information on such business rules may be had by reference to U.S. Pat. No. 5,292,127, by Kelly et al., which is incorporated herein by reference.

In yet another embodiment, a "frenzy" is afforded by listing a plurality of specific prize credits along with a current number of such specific prize credits that are remaining, or have not yet been awarded. Rules governing how the specific prize credits are awarded in the present mode are similar to those discussed previously. However, the types and number of specific prize credits awarded are predetermined. It should be noted that when the quantity of any given specific prize credits reaches zero, such specific prize credit may remain on the list but will graphically indicate that it is no longer available.

As an option, the previous embodiment may be modified by increasing the variety and/or number of specific prize credits under certain circumstances. This number may be increased based on the amount of times a particular game is played, the number of times that different games are played, or by achieving a game-related goal, thus affording a "frenzy"-type situation.

In still yet another embodiment, the prize credits may be awarded in a "progressive" manner. In such embodiment, each user contributes to a collective progressive pool. The progressive pool, for example, can be incremented with every game credit spent on any game apparatus, incremented based on an amount of advertisement impressions that are served (ideal for when advertiser is paying or supporting the progressive score), automatically incremented over time at regular or random intervals, manually incremented by an operator of the prize database server, calculated in real-time, and the like. The progressive pool is accumulated from the current and previous games that have been played on any linked game apparatus. In one embodiment, the increment rate of the progressive pool can be determined independent of the number of players playing or advertisements viewed.

The first player that achieves a predetermined progressive goal on any of the linked game apparatuses wins the progressive prize credits pool, where the progressive amount of prize credits is added to that player's prize credits count. It should be noted that a progressive bonus number of prize credits may also be awarded in lieu of a bonus score, thereby avoiding the need for conversion. Once the progressive bonus score is won, the process is restarted at a default value for continued play. Progressive goals, scores, and bonus apparatuses are described in additional detail in U.S. Pat. No. 5,292,127, by Kelly et al., which is hereby incorporated by reference herein in its entirety.

Figure 20:
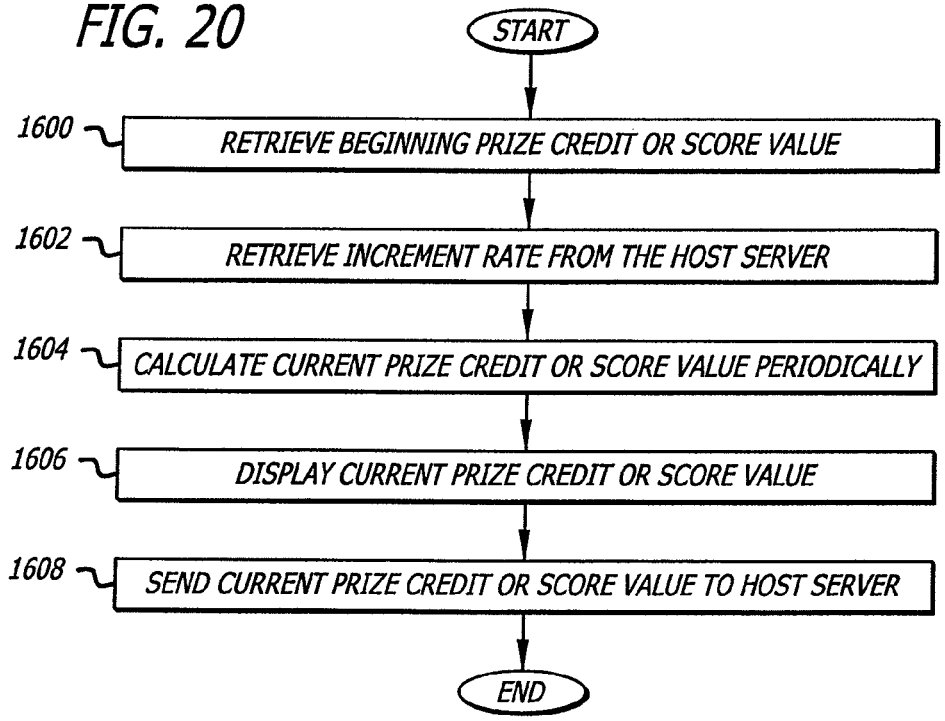
FIG. 20 illustrates the process by which the awarding prizes operation of FIG. 6 is executed.

FIG. 20 illustrates the process by which the awarding prizes operation 1112 of FIG. 15 is carried out in order to contend with the possibility of losing a connection with the prize database server. Specifically, FIG. 20 illustrates the process associated with awarding a progressive score or prize credit amount.

As shown in FIG. 20, prior to the beginning of each game, information including a current progressive prize credit or score amount is retrieved along with a current predetermined increment rate from the server in operations 1600 and 1602. During use, the progressive prize credit or score amount is periodically incremented at the increment rate in operation 1604 for the duration of the game.

During the course of the game, the current prize credit or score amount may be displayed, as indicated in operation 1606. If the player achieves the high score or some other related goal, all of the current progressive prize pool or score amount is awarded the user. At the end of the game in operation 1608, information including the current prize credit or score amount is sent to a host server for redemption purposes. By downloading both an increment rate and a progressive prize credit or score amount, communication with the server need only be established once at the beginning of the game.

In one embodiment, a particular method may be used to calculate a dynamic progressive score increment rate during the course of the game. In such an embodiment, a calculation is made periodically to determine the current increment rate, which is, in turn, used to calculate the current progressive pool that is to be displayed. In one embodiment, such calculation may be carried out every 2 minutes. It should be noted that the increment rate reflects the amount of time required for the progressive prize credit pool to be incremented by one prize credit, e.g., a prize credit is incremented every 1.824 seconds.

To calculate the current increment rate, a current total number of games played is first determined. The current total number of games increments each time a game is begun at a certain site on the network and in a certain mode, i.e. progressive mode, tournament, and the like. Next, a previous total number of games is subtracted from the current total number which, of course, will be larger. The previous total number of games is the total number of games that was retrieved when the increment rate was last calculated. Thereafter, a difference between the current total number of games played and the previous total number of games played is multiplied by a prize credit fraction that determines a desired pay-out of the progressive game, thus rendering a prize credit increment product.

Next, an amount of time that has elapsed since the last calculation of the increment rate is determined by subtracting a last counter read time from a current time. This elapsed time is then converted into milliseconds and divided by the prize credit increment product. This renders the current increment rate.

In another embodiment, a client computer may store a time when the player achieves the high score or other related goal. Subsequently, upon reconnection with the host server, information including such time may be communicated thereto. This time may then be used in conjunction with tables on the host server that have different progressive scores based on different times and dates. For example, as time progresses from a designated start time of the progressive scoring, the amount of the awarded progressive score increases.

Further information including a cap or maximum progressive score may be retrieved from the host server prior to the game or any other time to prevent such score from exceeding a predetermined amount. In the alternative, such information may be stored and utilized on the host server. These features aid in preventing fraudulent activity.

As an option, the games may be played in a tournament-type fashion. During tournament play, various users may play against each other. To ensure fairness, various aspects of the games played may be maintained constant. For example, in the case of card games, the electronic virtual playing deck may be made to deliver similar results in the games of each of the players. To enhance tournament play, top scores of tournament players may be tracked over a period of time for the purpose of awarding a particular prize pool or a portion thereof to the highest score, and the like. More information on tournament play may be had by reference to U.S. Pat. No. 5,292,127, by Kelly et al., which is hereby incorporated by reference herein in its entirety.

Figure 20A:
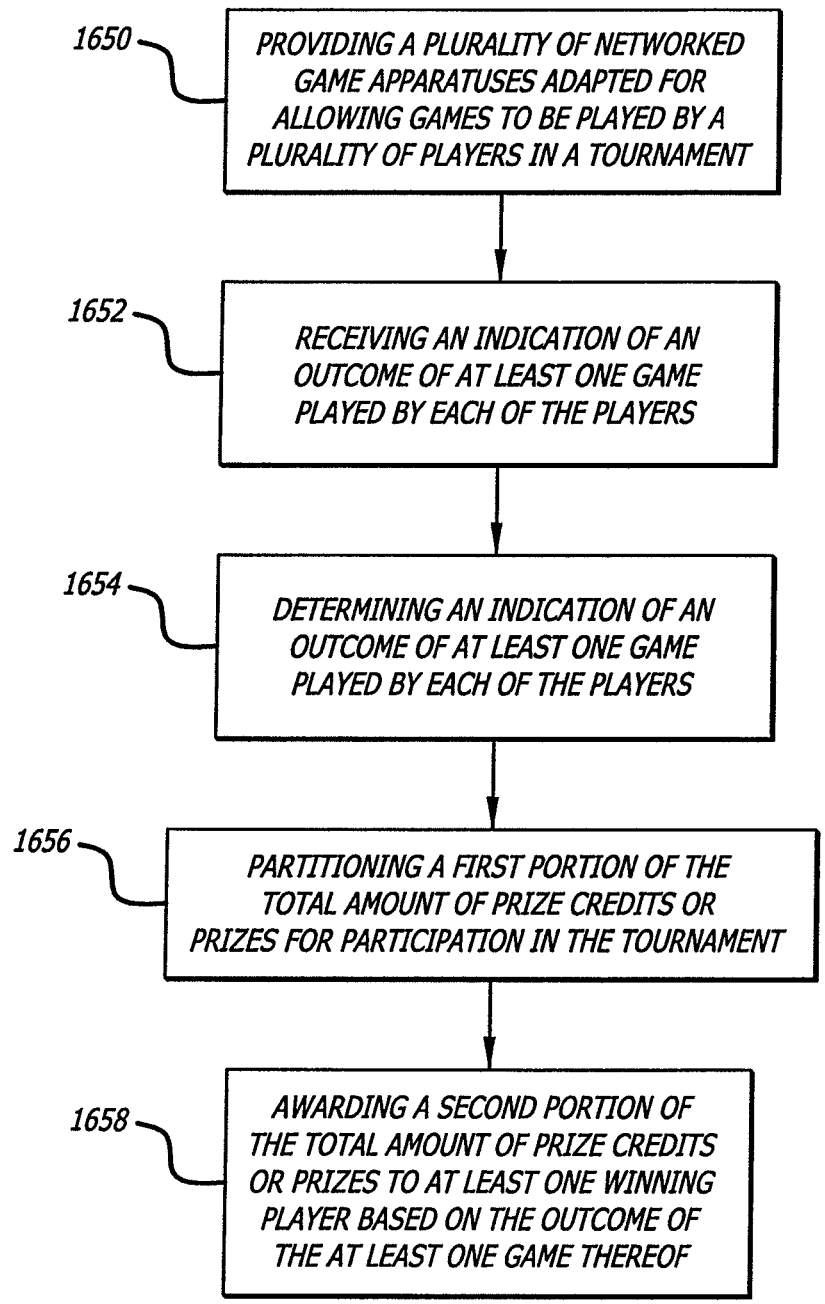
FIG. 20A illustrates a method for determining payment for participating in a network gaming tournament.

FIG. 20A illustrates a method for determining payment for participating in a network gaming tournament. As shown, a plurality of networked game apparatuses are first provided in operation 1650 for allowing games to be played by a plurality of players in a tournament. Such game apparatuses allow the play of games in exchange for game credits, or rely on funding provided by advertisers or the like.

After the play of game(s) during a tournament, an indication of an outcome, i.e. score, of at least one game played by each of the players is then received in operation 1652. Such outcome may be manually sent by the player, or automatically sent. Based on a sum of the outcomes of the games of all of the players, a total amount of prize credits or prizes is determined in operation 1654. It should be noted that the game apparatuses are already equipped with the ability to convert between outcomes of the games and a number of appropriate prize credits or prizes. Such ability is necessary for the games to be played during non-tournament play.

Subsequently, a first portion of the total amount of prize credits or prizes is partitioned for payment for participation in the tournament, and a second portion of the total amount of prize credits or prizes is awarded to one or more winning players based on the outcome of at least one game thereof.

(Note operations 1656 and 1658.) As an option, a first predetermined part of the second portion may be allocated for a first winner, a second predetermined part of the second portion may be allocated for a second winner, and so on.

In one embodiment, at least one winning player may be indicated on a list accessible on a site on the network. Such list may be updated upon receiving an indication of an outcome of at least one game played by another one of the players. This process may continue until all of the outcomes are received. As an option, a notice may be sent to at least one player each time the list is updated. Such a notice, i.e., an e-mail, may be given only to those players whose winnings are affected, or anybody desired.

In another embodiment, the total amount of prize credits or prizes may be determined by receiving a total sum of outcomes of the games for each of the players. Such total sum may then be divided by a number of the games played by each player. Such process renders an average outcome value per game for each player. The total amount of prize credits or prizes may be then determined based on a sum of the average values of the players. For additional incentive purposes, each of the players may be awarded a predetermined number of prize credits or prizes irrespective of an outcome of the games.

It should be noted that the game experience of each of the players may be set to be the same. Further, the network gaming system may tailor the experience upon each game. In a trivia game example, the network gaming system may track each time a tournament trivia game is played. Thereafter, each consecutive time the trivia game is played, a different line of questions may be provided. In operation, all players in the tournament may be given the same set of questions depending on whether it is their first, second, third, and the like entry. After the database of questions is exhausted, the questions may be "wrapped back" around to the first set of questions.

FIG. 21 illustrates the process by which the prize redemption operation 1114 of FIG. 15 is carried out. In order to accomplish this, the prize database server is adapted for displaying at least one prize redemption interface page in operation 1700 to allow redemption of the prize credits. As an option, the user interface of the game apparatuses may include a link to the prize redemption interface page of the prize database server.

Once the prize redemption interface page, or "shopping center", has been accessed, the user is required to register in operation 1102 (see FIG. 7) if it is determined that he or she is not already registered in decision 1702. After an identity of the user is verified, selection of a desired prize may be executed in operation 1704. In the case where the prize credit is a specific prize credit, which corresponds with an undesired prize, the user may have the option of replacing the specific prize credit with universal prize credits. Upon selection of the desired prize, shipping information may be verified in operation 1706. Subsequently, the prize may be delivered by any capable means and the account of the user may be adjusted to reflect the current available prize credits accordingly. (Note operation 1708.) It should be noted that user registration may not be required for merely browsing the prize redemption interface page.

In an alternate embodiment, a user may elect for the prize database server to automatically deliver a prize corresponding to any specific prize credit awarded. In such case, the prize database server may use the player's default account settings for shipping. During the course of delivery, the users may receive emails indicating that a delivery has been confirmed and also when the prize is to be shipped. As an option, the user may be notified of a back-order.

In addition to the foregoing capabilities, the prize redemption interface page and prize database server may include a virtual shopping cart function, a checkout capability, shipping address, modification module, and the like. If the virtual shopping cart function is employed, any specific prize credit that is awarded may be immediately deposited therein. At any desired time, prizes depicted on the prize redemption interface page may be added and removed. Optionally, the prize redemption interface page may display advertisements, notification of specials, legal disclaimers, and the like.

Figure 22:
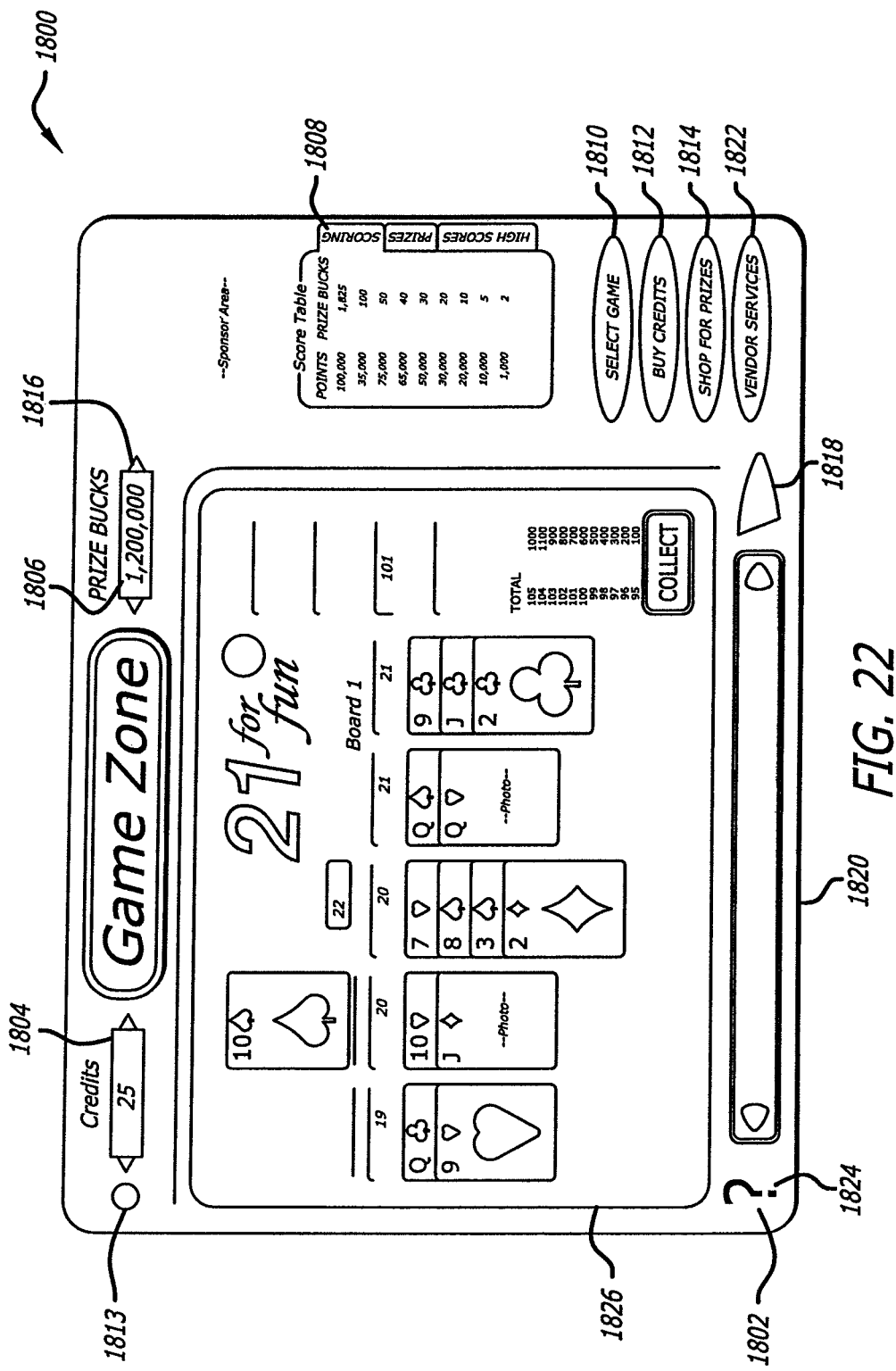
FIG. 22 is an illustration of a graphical user interface.

FIG. 22 is a graphical user interface 1800 for allowing play of a game that is "prize-enabled" in accordance with the disclosed embodiments. As shown, a frame 1802 is shown to include a first display 1804 for depicting a current amount of available credits of a particular user based on the user identification code. A second display 1806 is provided for depicting a number of prize credits that are currently awarded to the user. Also positioned on the frame 1802 is a third display 1808 for indicating either a point-to prize credit conversion table, a list of possible prizes, or a list of high scores.

The frame 1802 is also equipped with links including a select game link 1810 for allowing selection of a game to play and buy credits links 1812 and 1813 for purchasing additional game credits. Upon selection of either the select game link 1310 or the buy credits links 1812 and 1813, both the user identification code and the site identification code is transmitted to the prize database server for the reasons set forth earlier. Shop links 1814 and 1816 are also provided for linking to the prize redemption user interface of the prize database server. Upon selection of one of the shop links 1814 and 1816, a site identification code is transmitted in order to allow the prize redemption user interface to be equipped with specifically tailored insignias and other "look and feel" features.

With continuing reference to FIG. 22, a start button 1818 may be included to execute the game that is currently selected. A display bar 1820 may also be shown for advertisement, informative, or any other purposes. Further, a member link 1822 and a help link 1824 may be included for providing various miscellaneous services. Positioned in the frame is a game interface 1826 that is to be executed. Ideally, the game is configured with dynamic HTML.

FIG. 23 illustrates an optional advertisement feedback capability. Such feature is adapted for reporting interest in an advertisement displayed during use of a network system, and in particular, a network gaming system. This system enables a provider of the network gaming system to focus advertising towards particular users of the network system and also report the interest shown by particular users towards particular advertisers and advertisements.

As shown in FIG. 23, the advertisement feedback system stores user profiles of a plurality of users of a network system in operation 1900. After a user logs onto the network system in operation 1902, an advertisement by a sponsor of the network system is displayed on a visual display of the particular user in operation 1904.

In response to an action by the user, the network system sends the particular user's profile to the sponsor. (Note operation 1906.) The user's profile may contain a great deal of previously collected information. Thus, this system allows a network system provider to strategically pass on a wealth of marketing information of the users of the network system. As an option, the method by which the marketing information is delivered may be selected by the user and may include modes of communication such as electronic mail, ground mail, and the like. This selection may be affected during log-on, registration, or at any other time. Also, the user may be connected to a site on the network associated with the advertisers upon a user selecting, or "clicking" on the advertisement. If the marketing information is sent by a network provider, the advertiser may be informed of the delivery of the appropriate information.

The advertisement may relate to an offered prize or a particular game capable of being played on the network gaming system. As an option in this network gaming system embodiment, the user profile of the user may be sent to the advertiser as a result of the user being awarded a prize.

In one embodiment, the user action may occur while the advertisement is being displayed. As one option for this embodiment, the user action may comprise the user actually selecting the displayed advertisement. This way, the provider has a way to identify immediate user interest in a particular advertisement. With such an embodiment, the network system provider is able to easily relay user interest in a particular sponsor at the time that the user actually experiences the sponsor's advertisement. This embodiment also provides a way for a network system provider to determine which advertisements their users are more interested in. With this information, the provider is then able to arrange and time the display of advertisements in a manner to optimize the effectiveness of the advertisements towards the users of the network system.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed:

1. A gaming system that provides game play in a tournament in exchange for monetary input per game played, the gaming system comprising:
   a game server;
   a plurality of game units, wherein each game unit is a game of chance that provides linked game play in a tournament, and wherein the linked game units enable the play of linked wheel games; and
   a tournament administration controller, wherein the tournament administration controller enables an operator to designate tournament characteristics; wherein the gaming system utilizes websites or web pages to provide redemption of prize credits or merchandise prizes earned in a tournament game selected from a plurality of tournament games.

2. The gaming system of claim 1, wherein designated tournament characteristics include alterable conditions that cause a tournament to conclude, and wherein tournament conclusion conditions further include enabling players to compete in successive tournament rounds, and wherein players are eliminated from the tournament after losing a predetermined number of games.

3. The gaming system of claim 2, wherein designated tournament characteristics are predefined characteristics including group or club membership, preferred customer status, achievement of a tournament goal, or combinations thereof.

4. The gaming system of claim 1, wherein designated tournament characteristics are special tournaments with different prizes and conditions.

5. The gaming system of claim 1, wherein the tournament administration controller enables at least some tournament characteristics to be remotely input by an operator.

6. The gaming system of claim 1, wherein the tournament administration controller enables eligibility to enter a tournament to be altered.

7. The gaming system of claim 1, wherein the gaming system enables tournament characteristics and payouts to be tuned by an operator using a tournament set-up table.

8. The gaming system of claim 1, wherein the network is at least partially a wireless network, and wherein the gaming system enables tournament play over a wireless network on a mobile phone.

9. The gaming system of claim 1, wherein the network is at least partially a wireless network, and wherein the gaming system enables tournament play over a wireless network on a personal digital assistant.

10. The gaming system of claim 1, wherein the gaming system randomly sends out tournament eligibility offers.

* * * * *

UNITED STATES PATENT AND TRADEMARK OFFICE
CERTIFICATE OF CORRECTION

PATENT NO.         : 8,641,507 B2
APPLICATION NO.    : 13/568062
DATED              : February 4, 2014
INVENTOR(S)        : Bryan M. Kelly et al.

It is certified that error appears in the above-identified patent and that said Letters Patent is hereby corrected as shown below:

In the Specification

Column 2, In line 44, insert -- - -- after "above"

Column 3, In line 52, after "prizes to" insert --be--

Column 4, In line 9, after "methods" delete "for"

Column 5, In line 21, replace "." with --;--

Column 5, In line 25, after ";" delete "and"

Column 5, In line 27, replace "." with --;--

Column 11, In line 25, after "that" delete "the"

Column 11, In line 26, add --s-- to "reset"

Column 14, In line 44, after "have" insert --game--

Column 15, In line 15, after "many" delete "of"

Column 23, In line 47, insert --.-- after "like"

Column 25, In line 28, after "other" delete "an"

Column 32, In line 64, delete "s" from "operators"

Signed and Sealed this
Thirtieth Day of September, 2014

Michelle K. Lee
*Deputy Director of the United States Patent and Trademark Office*

CERTIFICATE OF CORRECTION (continued)
U.S. Pat. No. 8,641,507 B2

Column 43, In line 61, after "dials," delete "a"

Column 54, In line 67, delete "s" from "games"